(12) United States Patent
Zapata et al.

(10) Patent No.: US 7,698,392 B2
(45) Date of Patent: Apr. 13, 2010

(54) METHOD AND SYSTEM FOR ESTABLISHING A USER-FRIENDLY DATA TRANSFER SERVICE APPLICATION EXECUTING WITHIN A HETEROGENEOUS DISTRIBUTED SERVICE APPLICATION EXECUTION ENVIRONMENT

(75) Inventors: Charles Zapata, Redmond, WA (US); Daniel Shapiro, Redmond, WA (US); Brian Schultz, Seattle, WA (US)

(73) Assignee: Photobucket Corporation, Seattle, WA (US)

( * ) Notice: Subject to any disclaimer, the term of this patent is extended or adjusted under 35 U.S.C. 154(b) by 105 days.

(21) Appl. No.: 11/540,497

(22) Filed: Sep. 28, 2006

(65) Prior Publication Data

US 2007/0112944 A1    May 17, 2007

Related U.S. Application Data

(60) Provisional application No. 60/721,262, filed on Sep. 28, 2005.

(51) Int. Cl.
*G06F 15/177*    (2006.01)
(52) U.S. Cl. .................................................... 709/220
(58) Field of Classification Search ................ 709/220, 709/221; 717/104
See application file for complete search history.

(56) References Cited

U.S. PATENT DOCUMENTS

| | | | |
|---|---|---|---|
| 6,628,965 | B1 | 9/2003 | LaRosa et al. |
| 7,068,643 | B1 | 6/2006 | Hammond |
| 7,173,651 | B1* | 2/2007 | Knowles .................. 348/207.1 |
| 2002/0113879 | A1 | 8/2002 | Battle et al. |
| 2002/0174206 | A1* | 11/2002 | Moyer et al. ................ 709/221 |
| 2003/0229667 | A1* | 12/2003 | Pedersen et al. ............ 709/206 |
| 2004/0199614 | A1 | 10/2004 | Shenfield et al. |
| 2004/0230670 | A1 | 11/2004 | Schmidt-Karaca |
| 2005/0036034 | A1* | 2/2005 | Rea et al. .................. 348/207.1 |
| 2005/0050043 | A1* | 3/2005 | Pyhalammi et al. ............ 707/6 |

(Continued)

FOREIGN PATENT DOCUMENTS

WO    WO-2007/038766    4/2007

OTHER PUBLICATIONS

International Search Report and Written Opinion issued for PCT/US2006/038207; Dated: Jul. 31, 2008; 14 Pages.

(Continued)

*Primary Examiner*—Asad M Nawaz
*Assistant Examiner*—Jason Recek
(74) *Attorney, Agent, or Firm*—Fulbright & Jaworski L.L.P.

(57) ABSTRACT

Various embodiments of the present invention are directed to methods and systems for data transfer between electronic, hand-held devices, including cell phones, and computer systems, including servers and PCs, as well as component methods and systems of these data-transfer methods and systems. Component methods and systems of the present invention include secure links between various devices, enhancements to electronic hand-held devices that enable service applications to run continuously or intermittently on the devices, deployment of dynamically created service applications to electronic, hand-held devices, and various additional component methods and systems that facilitate the above-mentioned component methods and systems. One embodiment of the present invention is a robust, efficient, secure, and user-friendly method and system for transferring data between cell phones and personal computers.

32 Claims, 37 Drawing Sheets

U.S. PATENT DOCUMENTS

2006/0059202 A1* 3/2006 Niimura ................. 707/104.1
2006/0206592 A1* 9/2006 Fujii et al. ................. 709/220
2007/0006150 A9* 1/2007 Walmsley ................. 717/120
2007/0061487 A1 3/2007 Moore

OTHER PUBLICATIONS

International Search Report and the Written Opinion issued for the International PCT Application No. PCT/US2008/77439, issued on Dec. 11, 2008; 10 pages.

* cited by examiner

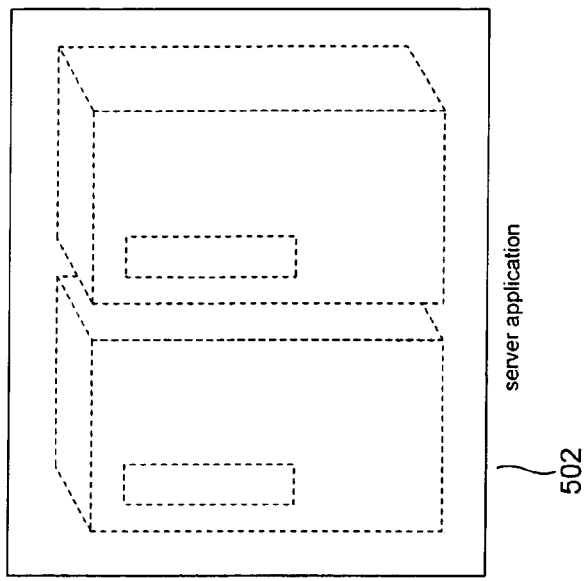
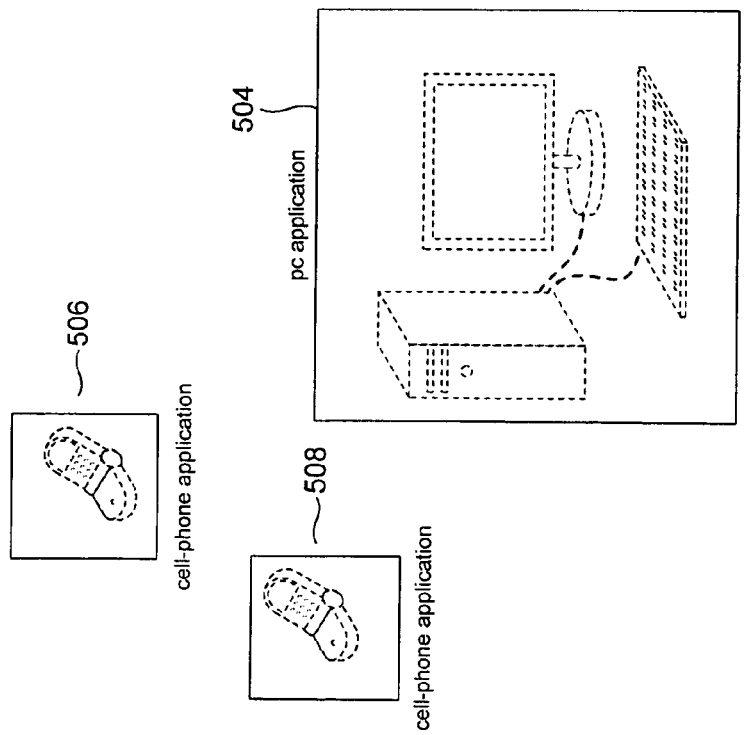
Figure 5

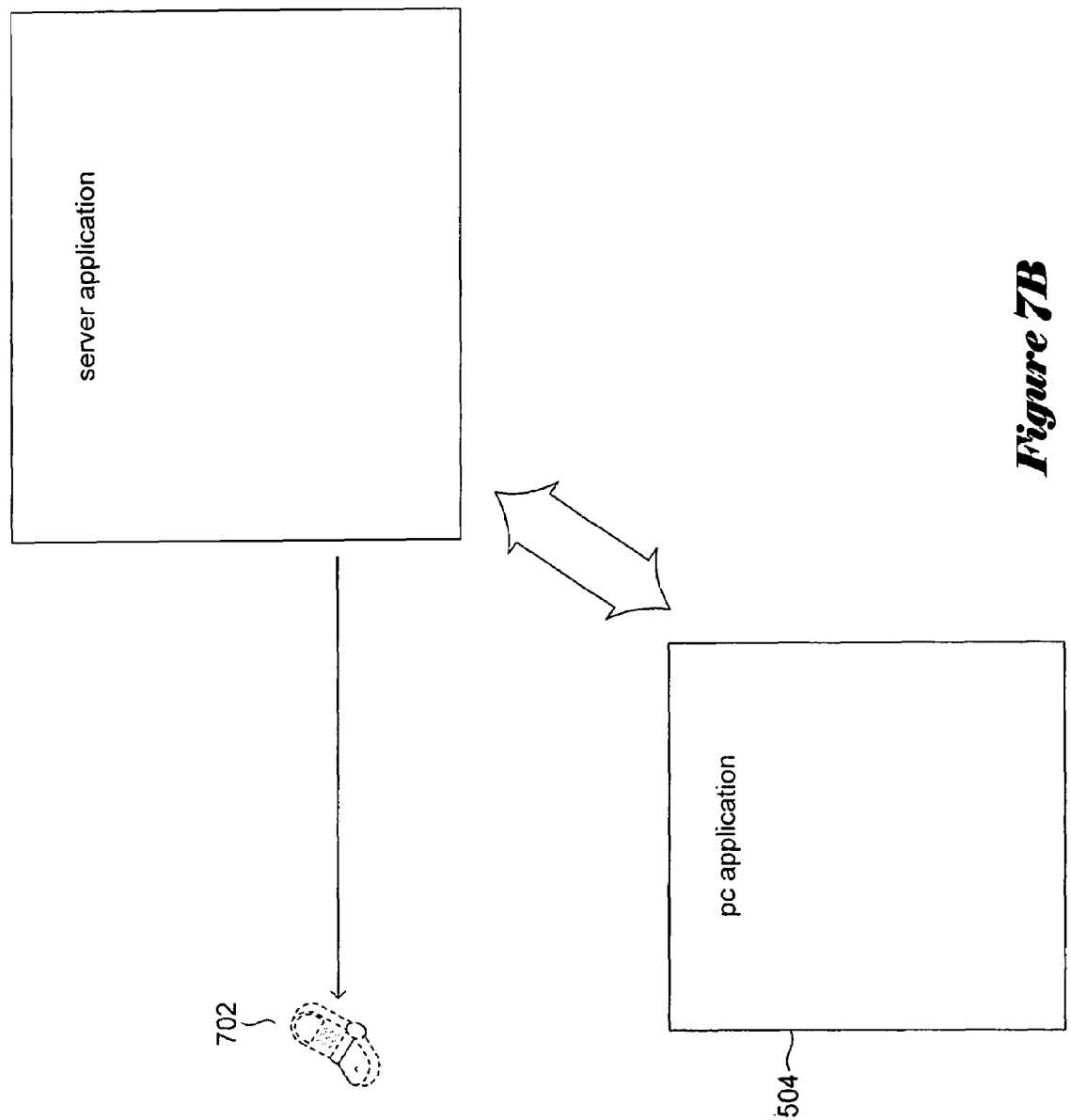

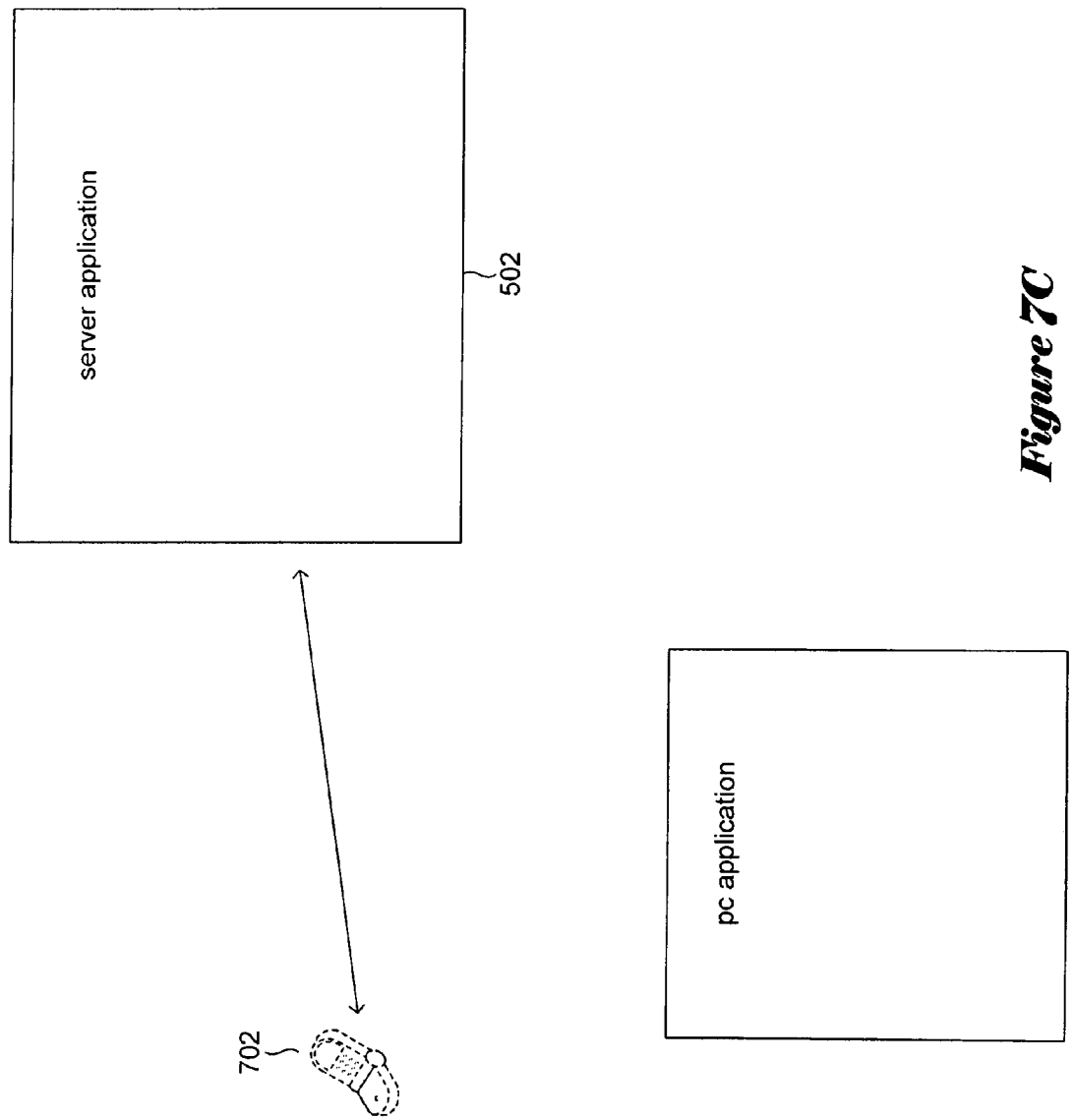

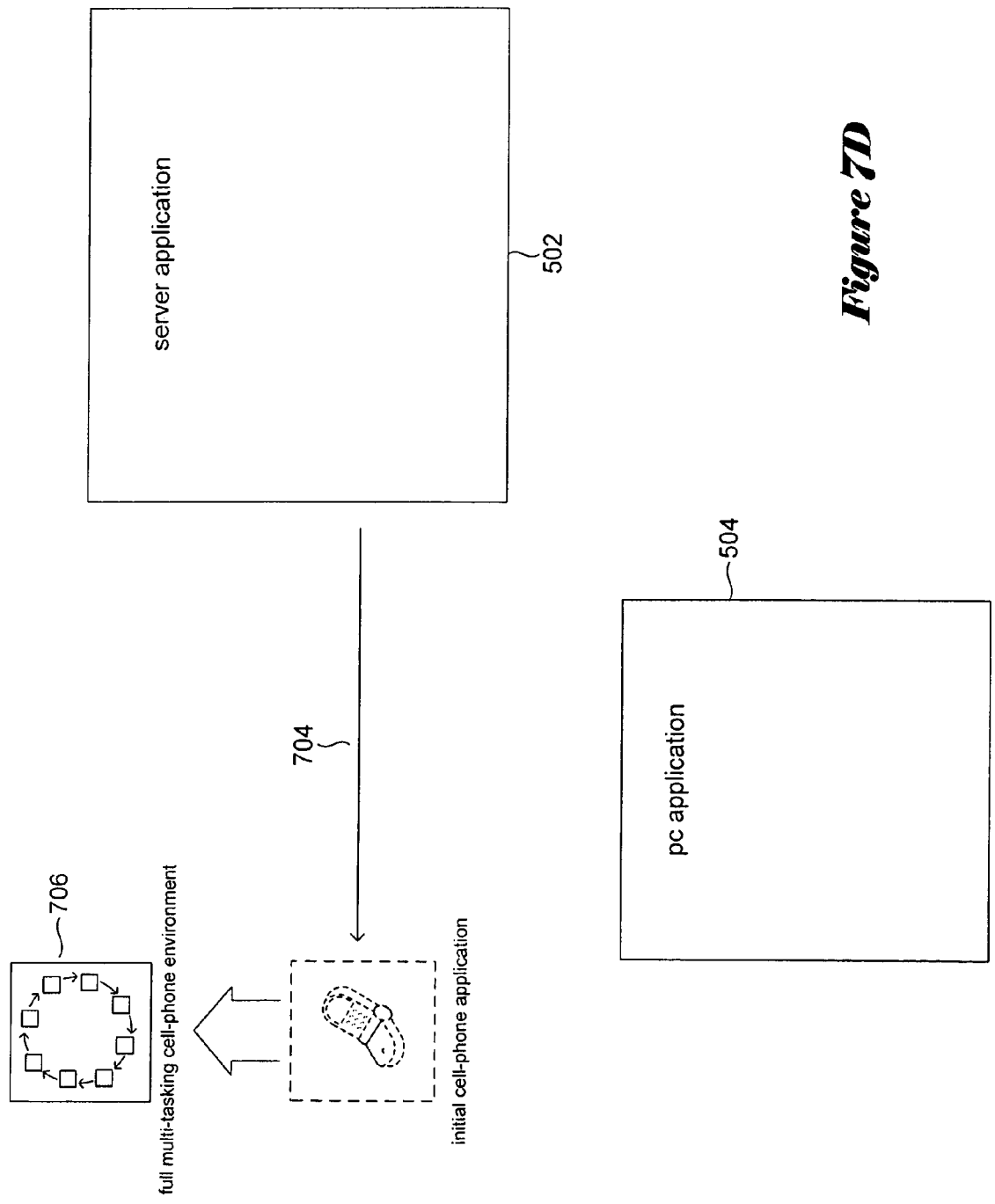

METHOD AND SYSTEM FOR ESTABLISHING A USER-FRIENDLY DATA TRANSFER SERVICE APPLICATION EXECUTING WITHIN A HETEROGENEOUS DISTRIBUTED SERVICE APPLICATION EXECUTION ENVIRONMENT

CROSS-REFERENCE TO RELATED APPLICATIONS

This application claims the benefit of Provisional Application No. 60/721,262, filed Sep. 28, 2005, the disclosure of which is hereby incorporated herein by reference.

TECHNICAL FIELD

The present invention is related to data transfer and data management in electronic systems and, in particular, to a method and system for executing service applications in heterogeneous environments, including a service application for securely transferring data between a wide variety of different types of electronic devices, with varying capabilities and capacities, interconnected by multiple communications media.

BACKGROUND OF THE INVENTION

In the early days of computing, data was transferred between computers by physically transferring the data encoded in physical media, including punch cards and, later, magnetic disk platters. With the advent of sophisticated, high-bandwidth electronic communications media, data-transfer protocols, and various higher-level protocols, such as HTTP over TCP/IP, data transfer between various types of computer systems, including main frames, high-end servers, and PCs has become routine and extremely economical. For example, during the span of a second, enormous amounts of textual, graphical, audio, and video data are transferred across the world between web servers and PCs via the Internet.

During the past ten years, there has been a spectacular increase in the availability and use of wireless, hand-held electronic devices, including cell phones, email devices, personal digital assistants ("PDAs"), and other such devices. Although the sophistication and capabilities of these small, hand-held devices have increased significantly, they are still generally far less sophisticated, and have far less computational power than, personal computers and computer systems. Moreover, these devices are generally interconnected through different communications infrastructures than those used to interconnect computer systems, although, in certain cases, both computers and hand-held electronic devices may be interconnected through common communications media.

FIG. 1 illustrates a typical computer, hand-held-device, server, and communications environment. In FIG. 1, a high-end server system 102 is interconnected with a remote personal computer ("PC") 104 via the Internet 106. The Internet 106 transfers data packets through various physical communications media, including high-bandwidth optical lines, telephone lines, a variety of routing computer systems, and other communications media, including local networks and local wireless networks, using a complex, hierarchically organized set of protocols. Cell phones 108 and 109 are connected through the phone network 110. The phone network employs different protocols and different physical communications media, although, as pointed out above, the phone network and the Internet may share certain physical communications media. Communication between cell phones 108 and 109 via the phone network 110 is robust, user-friendly, and extremely economical, just as data transfer by file-transfer protocols, email, and Internet browser applications through the Internet is extremely robust, user friendly, and economical. However, in many cases, data transfer and communication between cell phones 108-109 and server computers 102 and PCs 104 is difficult, not user friendly, time consuming, and relatively expensive.

FIG. 2 illustrates, using the illustration conventions of FIG. 1, a scenario in which economical and user-friendly data transfer from a cell phone to a personal computer would be desirable. As shown in FIG. 2, the cell phone 109 may be used to record a digital image of a scene 202 via a digital camera commonly included within cell phones. However, most cell phones have only limited capacity for storing these digital images, and currently, there are few practical services available for transferring digital images from cell phones to other devices and systems. It may be possible to physically transfer the image from cell phone 109 to PC 104 via a removable memory device, and it may also be possible to transfer the digital image from cell phone 109 to PC 104 using a physical cable for electronically interconnecting 204 the cell phone to the PC. Of course, while direct electronic connection through cables requires that the cell phone be brought to the location of the personal computer, or vice-versa, it is often a relatively cumbersome, not-user-friendly, and slow procedure, involving loading special software, purchasing cables compatible both with the cell phone and the personal computer, and other such tasks. While removable memory-storage devices can be used to store digital images transferred from the cell phone until the removable storage devices can be, in turn, physically transferred to the location of the personal computer, purchasing removable storage devices with sufficient storage capacity that are compatible both with the cell phone and the personal computer may represent a challenge for many users, and removable storage devices may be lost, damaged, or intermingled with other removable storage devices containing other types of data. It is also possible, in certain cases, to transmit digital images from the cell phone 109 to the phone network 110, and from the phone network to the Internet 106 for final transfer to a PC or server using specialized multimedia messaging protocols. However, acquiring access to such protocols may require installation of applications on the cell phone and relatively cumbersome data entry to the cell phone in order to install the transferred applications and to direct transfer of digital images to a desired server or personal computer. Moreover, in many cases, the transfer is not secure, and may not be reliable. The occurrence of various types of errors during transfer, for example, may result in loss of the digital image.

The difficulties associated with transferring digital images from cell phones to personal computers, from a first cell phone to a second cell phone, and difficulties associated with transferring other types of data from cell phones and other types of electronic, hand-held devices to personal computers and remote electronic, hand-held devices are becoming more noticeable and annoying to consumers as the capabilities of electronic, hand-held devices increase, and as consumers become more familiar with the existing, highly robust, and user-friendly data-transfer systems for transferring data between and among personal computers and servers. Therefore, users, manufacturers, vendors, and developers of cell phones and cell phone-related technologies have all recognized the need for a more robust, user-friendly, efficient, and economical method and system for transferring data between cell phones and computer systems, between various types of electronic hand-held devices, from personal computers to electronic hand-held devices, and other such data transfers in heterogeneous environments.

BRIEF SUMMARY OF THE INVENTION

Various embodiments of the present invention are directed to methods and systems for data transfer between electronic, hand-held devices, including cell phones, and computer systems, including servers and PCs, as well as component methods and systems of these data-transfer methods and systems. Component methods and systems of the present invention include secure links between various devices, enhancements to electronic hand-held devices that enable service applications to run continuously or intermittently on the devices, deployment of dynamically created service applications to electronic, hand-held devices, and various additional component methods and systems that facilitate the above-mentioned component methods and systems. One embodiment of the present invention is a robust, efficient, secure, and user-friendly method and system for transferring data between cell phones and personal computers.

One embodiment of the present invention is a method and system for transferring images from a camera-equipped phone to a personal computer through a file server. The camera-equipped phone generates a digital image, for example by taking a digital photo with a built-in or attached camera, and transmits the digital image over a standard wireless network, for example the cellular GSM/GPRS network, to a file server. The personal computer is connected to the internet. The file server is connected both to the standard wireless network and to Internet, and receives digital images from a camera-equipped phone over the network and transmits digital images to the personal computer through the Internet. Both the camera-equipped phone and the personal computer run an image-transfer software program, and use unique addresses to enable the camera-equipped phone to direct images through the file server to the personal computer.

BRIEF DESCRIPTION OF THE DRAWINGS

FIG. 5 illustrates the conceptual, intercommunicating applications that together comprise one view of the virtual communications medium and network that represents one embodiment of the present invention.

FIGS. 7A-D illustrate, at overview level, the steps involved in creating the virtual communications medium and network (302 in FIG. 3) to allow for peer-to-peer interaction between PC applications and cell phone applications.

DETAILED DESCRIPTION OF THE INVENTION

The present invention is directed to methods and systems for robust, efficient, secure, and user-friendly data transfer between electronic, hand-held devices and personal computers. The present invention is described, below, in the context of a method and system for transferring digital-image data from cell phones to personal computers, personal computers to cell phones, and between cell phones, but the present invention is directed to a much broader and more general transfer method for transferring many different types of data between many different types of electronic devices, as well as for establishing a service-application environment and virtual communications medium and network to support the data-transfer application. In a first subsection, below, an overview of one approach to transferring data between electronic hand-held devices and personal computers is provided. In subsequent subsections, individual component methods and systems that enable implementation of the data-transfer method and system outlined in the first subsection are discussed, in detail, with reference to control-flow diagrams and other technical presentations. In a final subsection, a more detailed discussion of the exemplary data-transfer method and system outlined in the first subsection is provided.

Figure 2:
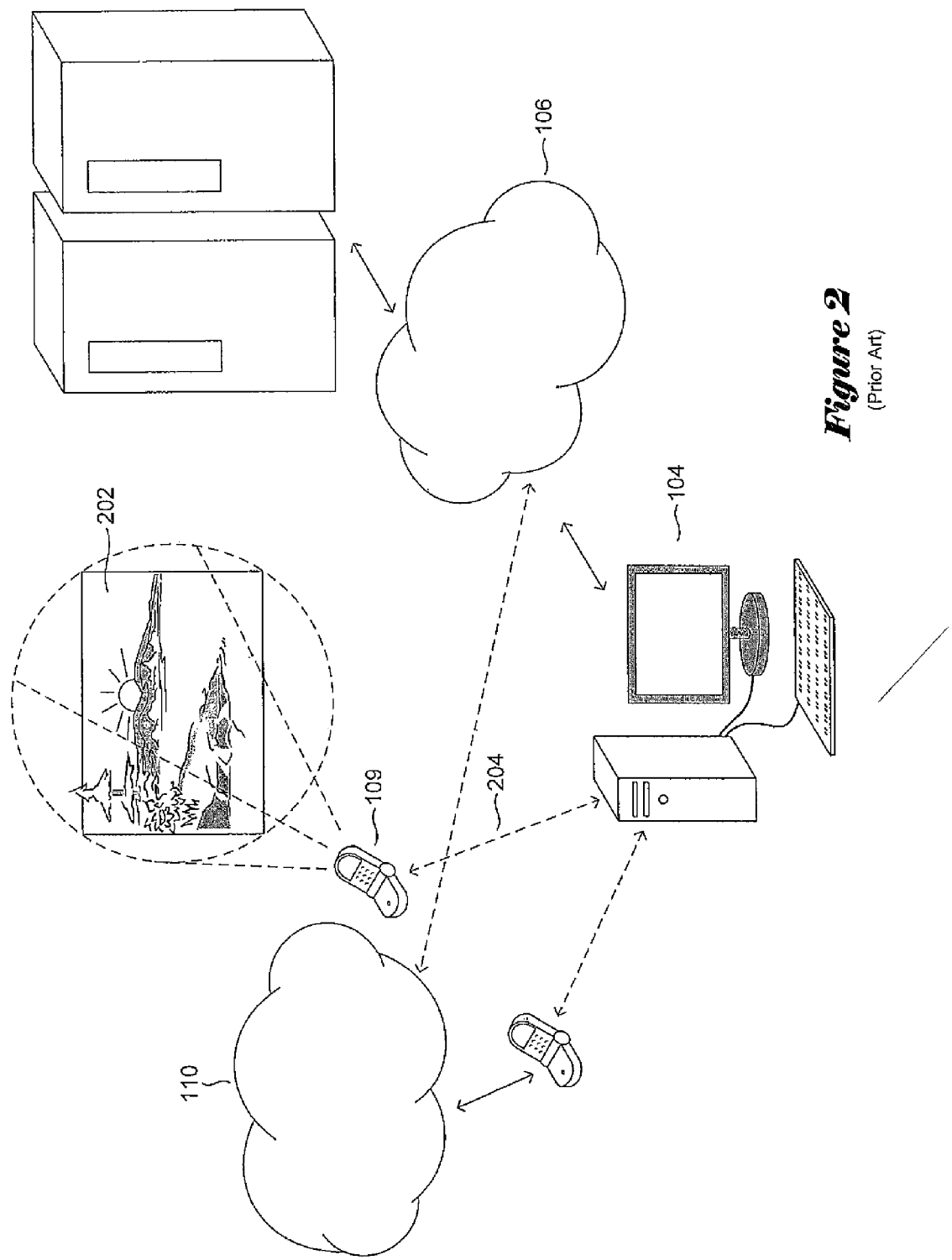
FIG. 2 illustrates, using the illustration conventions of FIG. 1, a scenario in which economical and user-friendly data transfer from a cell phone to a personal computer would be desirable.
Figure 3:
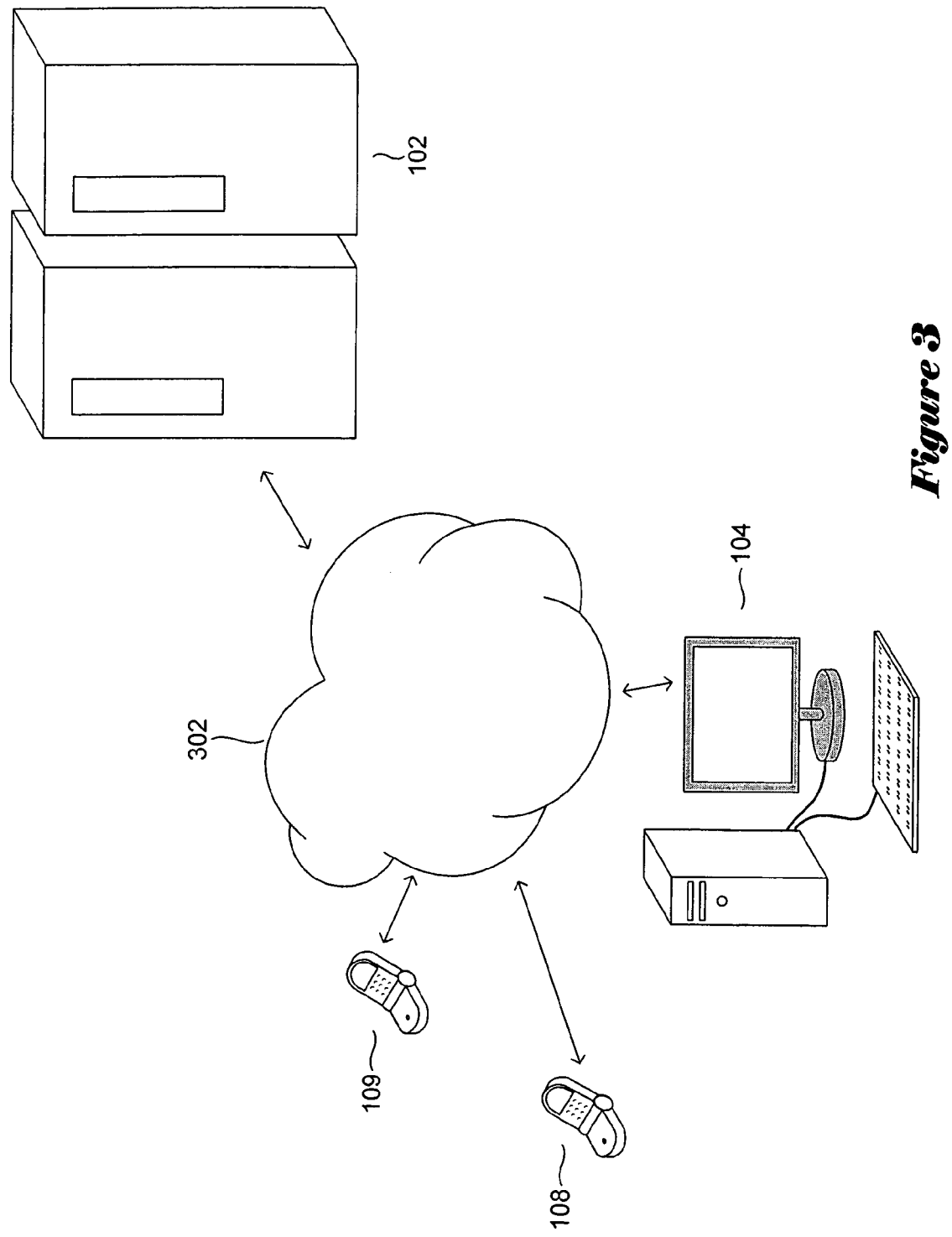
FIG. 3 illustrates a high-level overview of one embodiment of the present invention.
Figure 4:
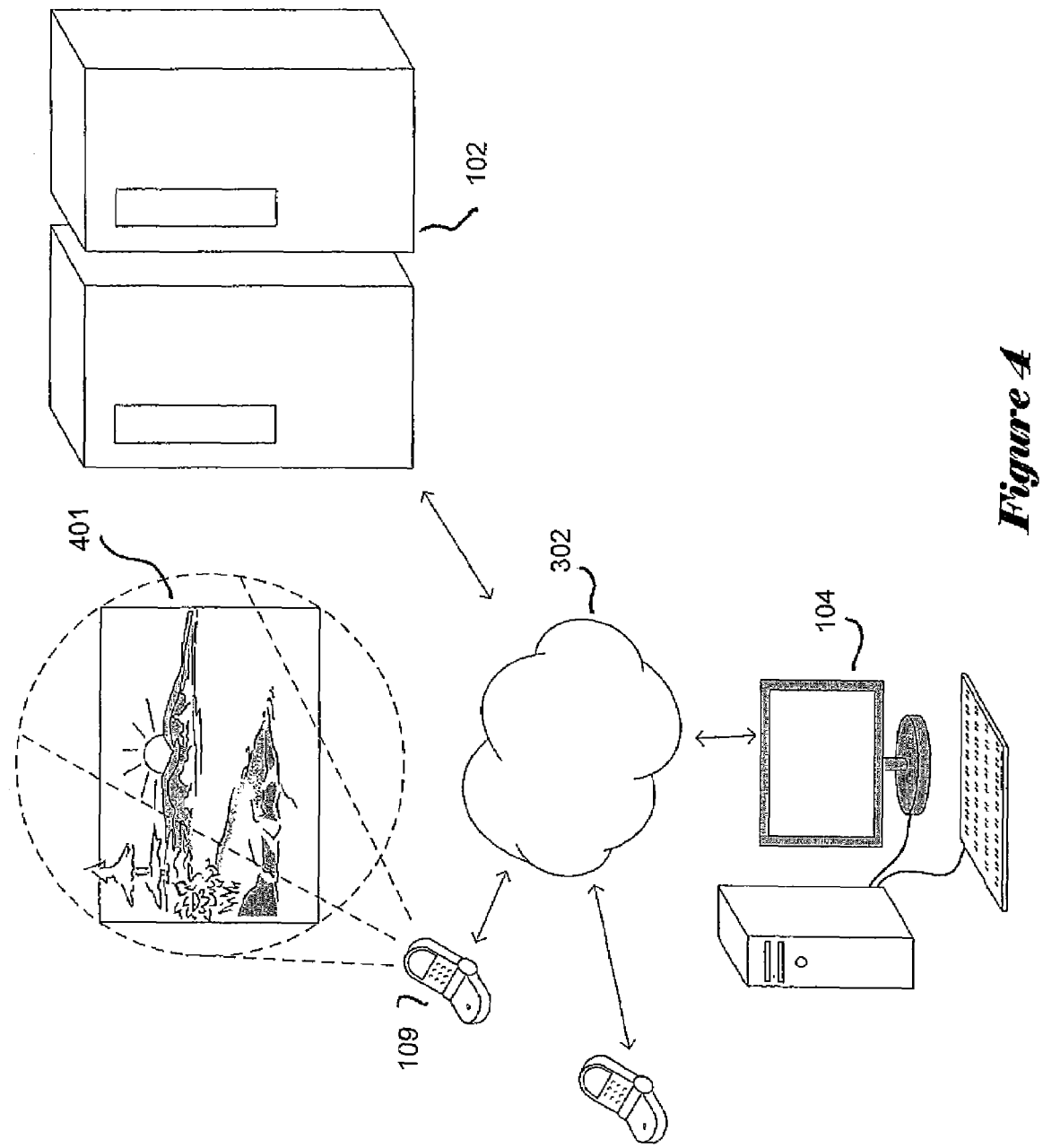
FIG. 4 illustrates the capture of a digital image and secure, seamless transfer of the digital-image data from the cell phone to the personal computer according to one embodiment of the present invention.

Overview of a Data-Transfer Method and System That Represents One Embodiment of the Present Invention FIG. 3 illustrates a high-level overview of one embodiment of the present invention. FIG. 3 uses the same illustration conventions as used in FIGS. 1 and 2. In FIG. 3, the server system 102, PC 104, and cell phones 108 and 109 are shown to be linked, and in communication with one another, through a virtual communications medium and network 302. At the highest level, the present invention is directed to creating a virtual communications medium and network 302 that allows personal computers, servers and main frame computers, cell phones, and other electronic, hand-held devices to intercommunicate efficiently, reliably, economically, and securely. At a second level, method and system embodiments of the present invention are directed to service applications that execute in the context of the virtual communications medium and network to provide for data transfer, including transfer of digital images. FIG. 4 illustrates the capture of a digital image and secure, seamless transfer of the digital-image data from the cell phone to the personal computer according to one embodiment of the present invention. A user can transfer a digital image, for example, from the user's cell phone to the user's personal computer automatically, without user intervention, or via any number of user interfaces as intuitive and easy to use as those employed to connect a first cell phone to second cell phone through the phone network.

The virtual communications medium and network (302 in FIG. 3) created according to one embodiment of the present invention may make use of the phone network, the Internet, a variety of different physical communications media, protocols, and other complex layers of software and hardware. It would be impossible to describe, in detail, the organization and operation of all of these communications media and software and hardware layers in this document, and such a description is unnecessary, since these communications media, software layers, and hardware layers are generally well known to those skilled in the art of communications, cell phones, and computer systems. Rather than viewing the virtual communications medium, or network, as a complex, multi-layered combination of existing technologies, software, hardware, and communications media, it is conceptually easier to view the virtual communications medium as a collection of intercommunicating applications or as one or more distributed applications. FIG. 5 illustrates the conceptual, intercommunicating applications that together comprise one view of the virtual communications medium and network that represents one embodiment of the present invention. As shown in FIG. 5, the virtual communications medium 302, and interfaces supported by the virtual communications medium, can be viewed as a separate, intercommunicating server application 502, a PC application 504, and cell phone applications 506 and 508. Alternatively, these separate, intercommunicating applications can be viewed as a single distributed service application composed of device-side and server-side service applications.

Figure 1:
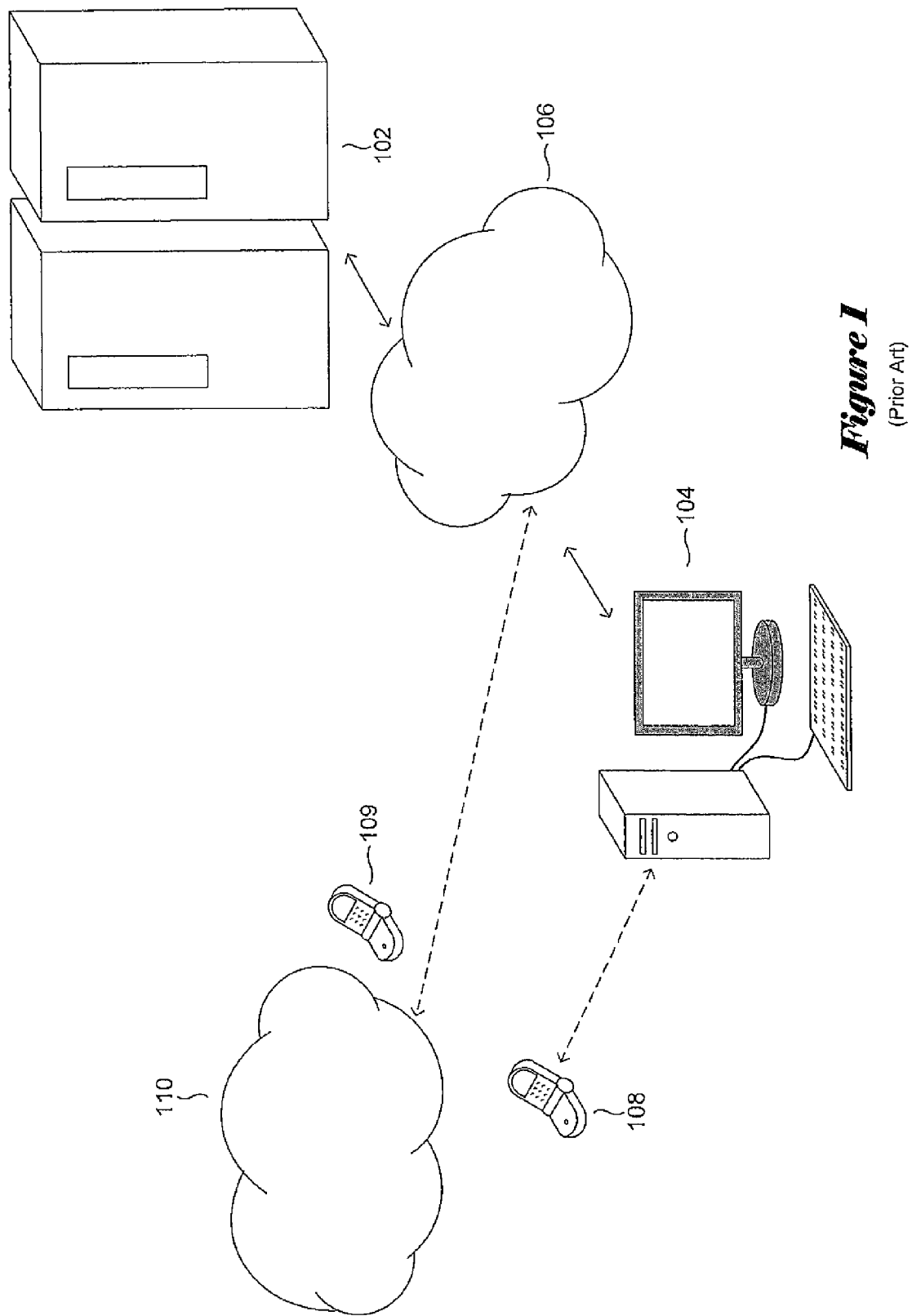
FIG. 1 illustrates a typical computer, hand-held-device, server, and communications environment.
Figure 6:
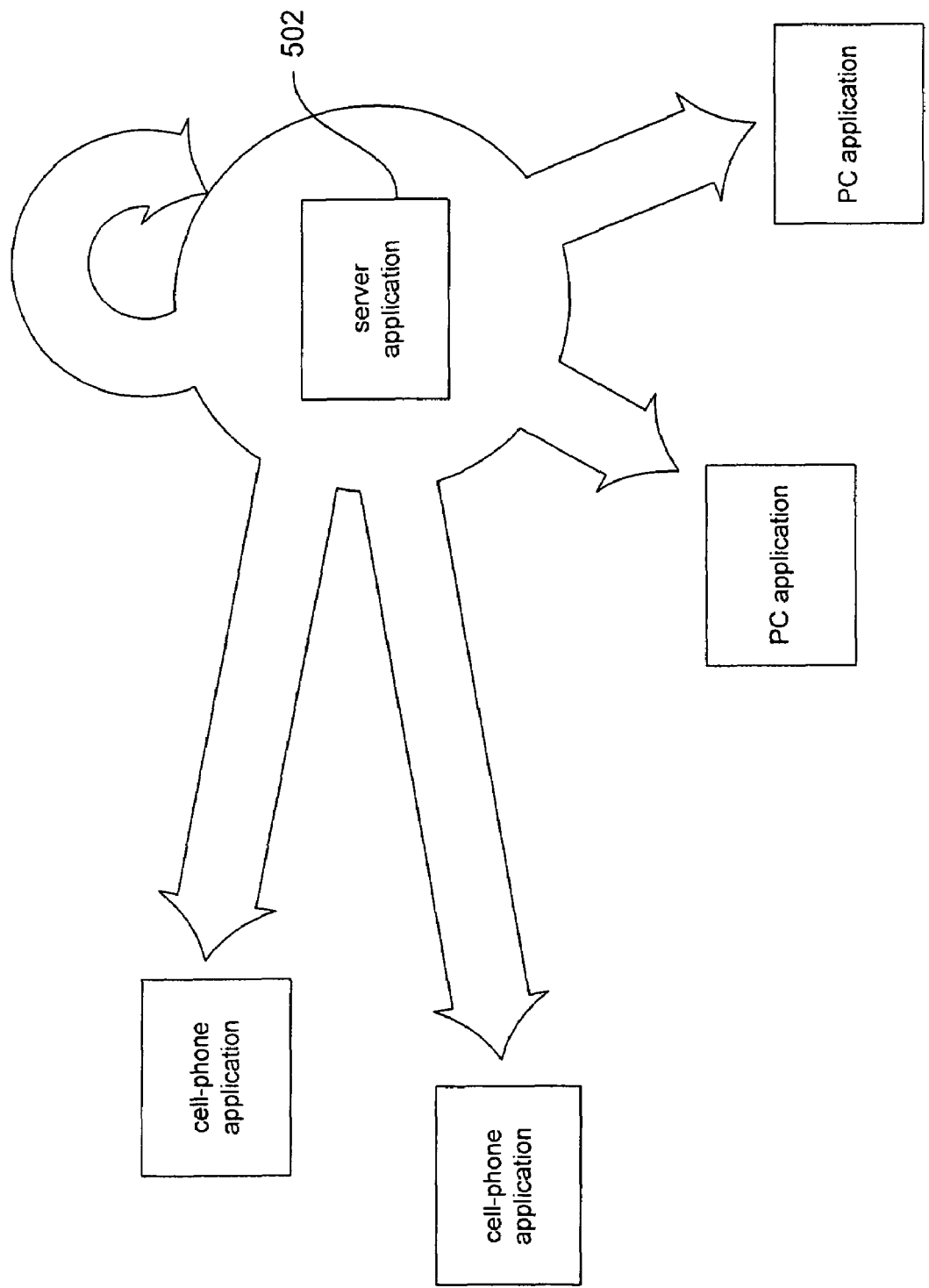
FIG. 6 illustrates intercommunication provided by the virtual communications medium and network.

FIG. 6 illustrates intercommunication provided by the virtual communications medium and network. As shown in FIG. 6, PC applications, cell phone applications, and server applications can transfer data among one another via the virtual communications medium, with the server and server application 502 acting as a central switch through which data transfers are routed. Unlike in current environments, as shown in FIGS. 1 and 2 and described in a previous section, the virtual communications medium created according to the present invention allows PC applications and cell phone applications to intercommunicate as peers, with both PC applications and cell phone applications providing user-friendly interfaces, when user-interfaces are desired.

Figure 7A:
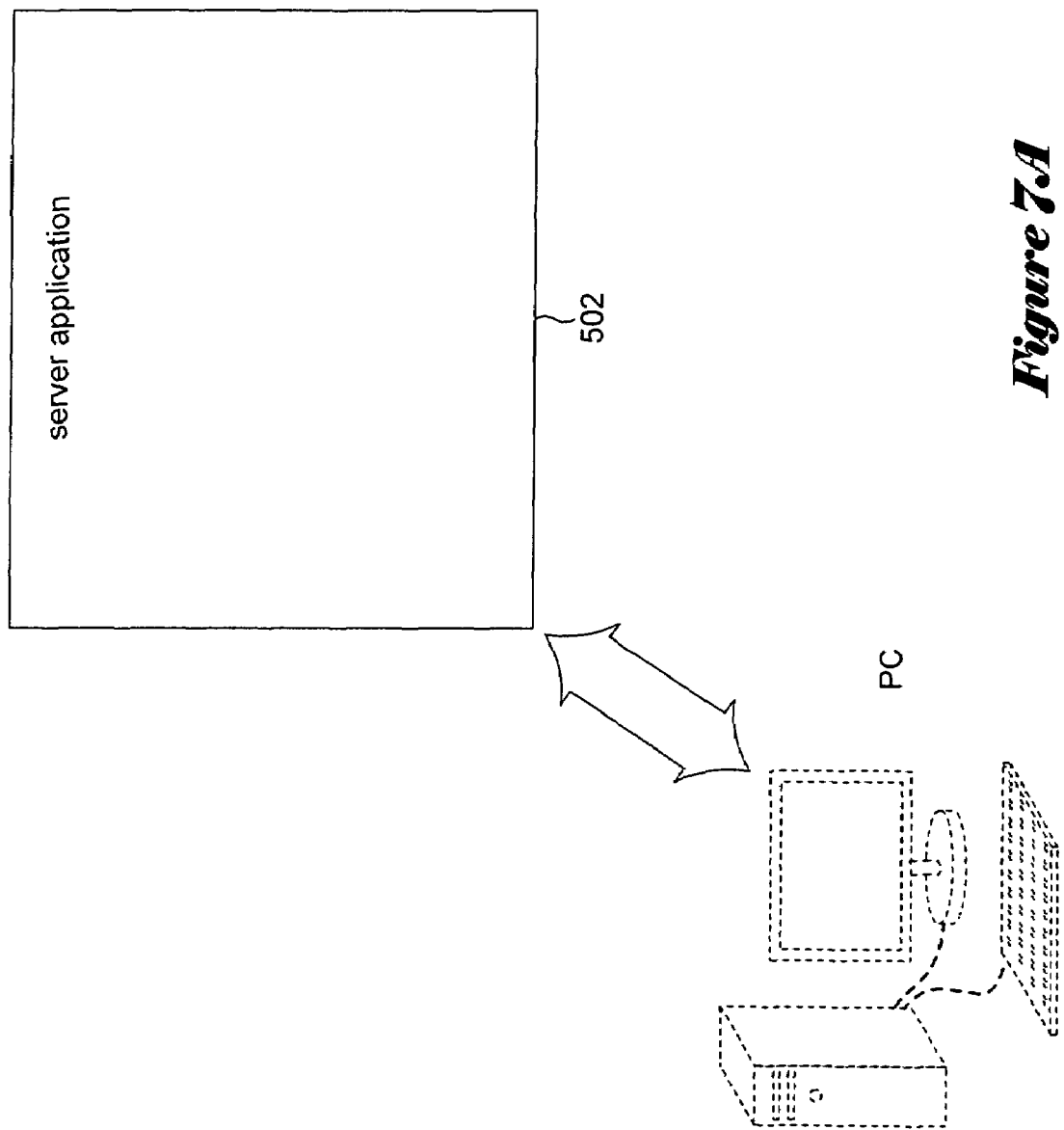

FIGS. 7A-D illustrate, at overview level, the steps involved in creating the virtual communications medium and network (302 in FIG. 3) to allow for peer-to-peer-like interaction between PC applications and cell phone applications or within a distributed service application. First, as shown in FIG. 7A, a PC user interacts with a server application 502 running on a server system to download the PC application to the PC. Once downloaded, as shown in FIG. 7B, the PC can be viewed, at high level, as a PC application 504. Next, as also shown in FIG. 7B, a PC user interfaces with the PC application to direct the server application to deploy a service on a particular cell phone 702. Then, as shown in FIG. 7C, the server application 502 communicates with the cell phone 702 in order to determine the type of cell phone and other parameters related to, and characteristics of, the cell phone. Then, as shown in FIG. 7D, the server application 502 creates an initial cell phone application and transfers the initial cell phone application to the cell phone 704. The cell-phone application is preconfigured with account credentials to facilitate subsequent communication with the PC and server, so that subsequent configuration of the cell-phone application is not necessary. The initial cell phone application is launched, either automatically or by a separate signal sent from the server application, and transforms the cell phone into a multi-tasking cell phone environment 706 in which the cell phone application can run as a service application. Once the cell-phone application is running as a service application, the cell-phone application can communicate with both the server application 502 and PC application 504 in a peer-to-peer-like fashion, as illustrated in FIGS. 5 and 6.

Dynamically Created Service Application

As discussed in the previous section, with reference to FIGS. 7C-D, an important step in configuring the virtual communications medium and network (302 in FIG. 3) that allows for secure, robust, and user-friendly intercommunication between cell phones, servers, and PCs is deployment of a service application specifically tailored for the hand-held electronic device, in the context of a user-requested service related to the electronic, hand-held device. Deployment of dynamically created service applications ("DCAs") is described in the current subsection. It should be noted that, while a specific embodiment of the present invention is discussed in this subsection, and in subsequent subsections, there are a myriad of alternative embodiments that can be implemented according to the present invention within the large variety of different contexts for which service applications intercommunicating through a virtual communications medium and network can be crafted and configured. Although, in the following discussions, the steps undertaken to accomplish various tasks and subtasks are presented in particular orders, many of the steps may be alternatively carried out in different orders, depending on implementation strategies and the context of the problem domain addressed by the implementations. A description of one or a few embodiments of the present invention may address only a small subset of the possible techniques and strategies for accomplishing the set of tasks which together comprise the goals and specification for an implementation of the present invention. Thus, the following description of particular embodiments of the present invention is in no way intended to limit the scope of implementations and strategies that may be undertaken according to the present invention.

Figure 8:
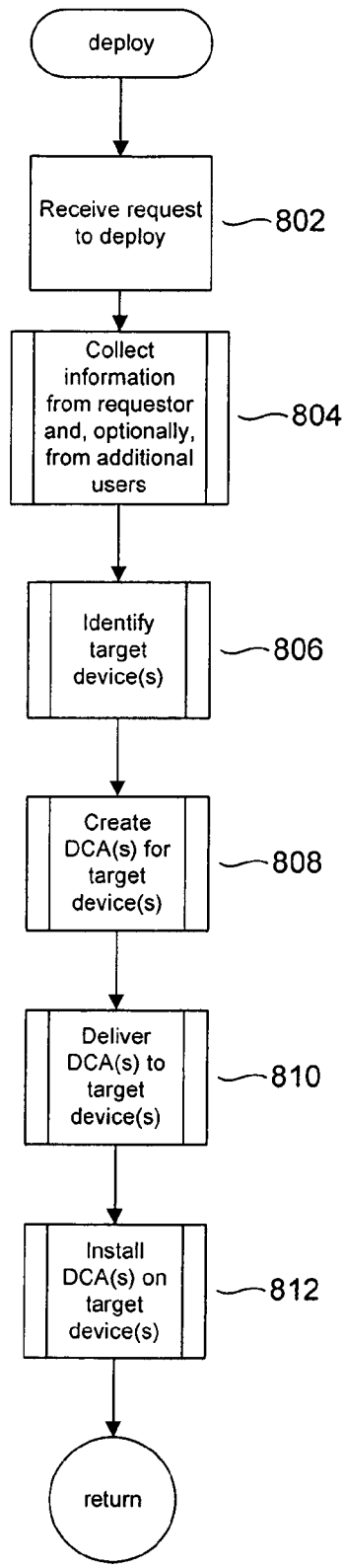
FIG. 8 is a control-flow diagram for a routine "deploy" that represents one embodiment of the present invention.

FIG. 8 is a control-flow diagram for a routine "deploy" that represents one embodiment of the present invention. The control-flow diagram of FIG. 8 provides a highest-level overview of a DCA creation and deployment method of the present invention. In step 802, the routine "deploy," running on a server in the described embodiment, receives a request from a user device, typically a PC, to deploy a particular service to a different user device, such as a cell phone. In general, a particular user requests deployment of services to electronic devices owned and controlled by the user, although, in more general cases, service applications may be deployed to electronic devices automatically, at the request of third parties, or in response to alternative types of invocations. When deployment is requested to electronic devices by third parties, or to electronic devices not owned or controlled by the requester, various techniques and strategies may be employed to ensure that services are deployed only with the implicit or explicit permission and authorization of the device owners and/or users.

In step 804, the routine "deploy" collects information from the requester and, optionally, from additional users identified in the request, needed for establishing and configuring the requested service with respect to the target electronic devices. In step 806, the routine "deploy" undertakes a process to identify and characterize each target device to which the service application is to be deployed. In step 808, the routine "deploy" creates a DCA for each target device. Service applications are dynamically created for each target device in order to, at the least, incorporate target-device-specific information into each service application, and, more generally, to tailor the service application for the specific target device. In step 810, the routine "deploy" delivers the DCAs created in step 808 to their respective target devices. Finally, in step 812, the routine "deploy," when necessary, undertakes installment of the delivered DCAs within their respective target devices. These final two steps are commonly combined and interleaved, but are shown separately in FIG. 8 for conceptual clarity.

Figure 9:
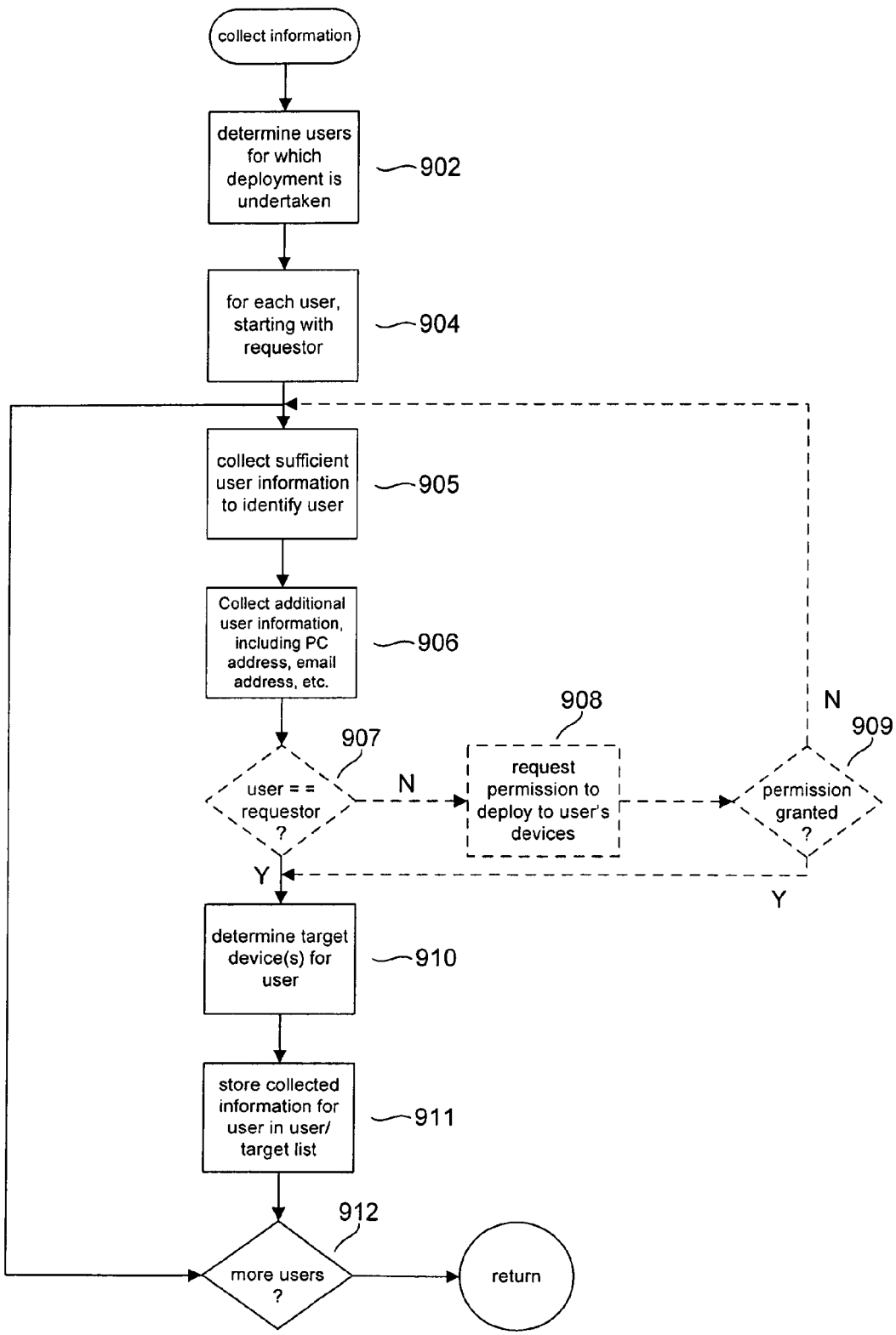
FIG. 9 is a control-flow diagram for the routine "collectInformation" invoked in step 804 of the routine "deploy" shown in FIG. 8.

FIG. 9 is a control-flow diagram for the routine "collectInformation" invoked in step 804 of the routine "deploy" shown in FIG. 8. In step 902, the routine "collectInformation" determines the users for which deployment of a service application is undertaken. In the most common case, a single user requests deployment of a service to one or more of the user's electronic devices, but, in a more general case, the request may specify deployment of a service for a set of users. The users may be fully identified in the request received in step 802 of FIG. 8, or may be only partially identified, requiring the routine "collect information" to access additional information sources or to further interact with the requester in order to fully identify all users of devices to which the service application is to be deployed. In the for-loop of steps 904-912, the routine "collectInformation" collects needed user and user-device information for each user identified in step 902. In step 905, the routine "collectInformation" collects sufficient information to identify the currently considered user. In this step, for example, the routine "collectInformation" may query a user or application running on a user's PC for information needed to identify that the user or user application is the user for which deployment is requested. Queries may involve request and receipt of passwords, user identifiers, and other information that may be matched to previously acquired information stored by the server on which the routine "collectInformation" runs, and may alternatively involved a wide variety of other user-identification techniques, including biometric analysis of user-supplied data, or alternative methods of identifying the user.

Next, in step 906, the routine "collectInformation" may collect additional user-related information, including the PC network address for the user's PC, the user's email address, billing information, if the billing information has not been previously stored, characteristics and capabilities of the user's PC or other device, and other such information. If the user is not the entity requesting deployment, as determined in step 907, then the routine "collectInformation" may optionally request permission of a user for deployment of the service application to the user's devices in steps 908 and 909. Next, in step 910, the routine "collectInformation" determines the target devices for the currently considered user to which the service application is to be deployed. This information may be included in the request received in step 802 of FIG. 8, or may involve additional queries or access to previously stored information. In step 911, the information collected for the user and for the user's target devices is stored in a user/target list that directs creation and deployment of DCAs in subsequent steps of the routine "deploy."

Figure 10A:
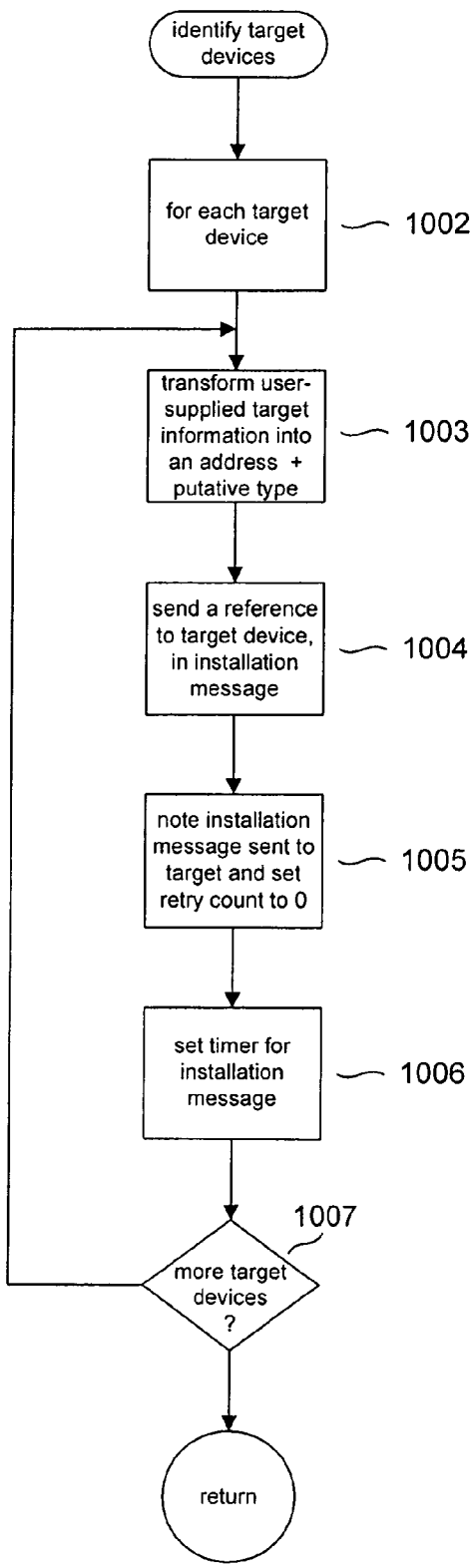
FIGS. 10A-D describe one embodiment of the target-device identification step 806 of the routine "deploy" shown in FIG. 8.

FIGS. 10A-D describe one embodiment of the target-device identification step 806 of the routine "deploy" shown in FIG. 8. FIG. 10A is a control-flow diagram for the routine "identifyTargetDevices" called in step 806 of FIG. 8. The routine "identifyTargetDevices" comprises a for-loop of steps 1002-1007 in which each target device included in the user/target list prepared in step 911 of FIG. 9 is identified and characterized. In step 1003, the user-supplied information characterizing the currently considered target device is transformed into an address and putative device type, generally by accessing stored information concerning general device types, device-related information, and perhaps specific information regarding the devices owned and used by users previously collected and compiled by the server. Certain data tables that can facilitate this step are discussed in a subsequent subsection. Then, in step 1004, the routine "identifyTargetDevices" sends a reference, such as a URL, to the target device, in certain cases in the form of an installation message. When the installation message is received by the target device, a prompt may be displayed on the target device that, when accepted or acknowledged by a user of the target device, or automatically, generates a request directed to the reference, such as a URL, that is received and processed by the server. The device's response to the installation message is then used by the server, as described below, to identity the type of device and characterize the device. In step 1005, the routine "identifyTargetDevices" notes that an installation message was sent to the target device and sets a retry count for the target device to 0. In general, the routine "identifyTargetDevices" stores a record indicating that the installation message was sent in memory or in a database. Then, in step 1006, the routine "identifyTargetDevices" sets a timer for the installation message, in order to detect failure of the target device to respond, as described subsequently.

Figure 10B:
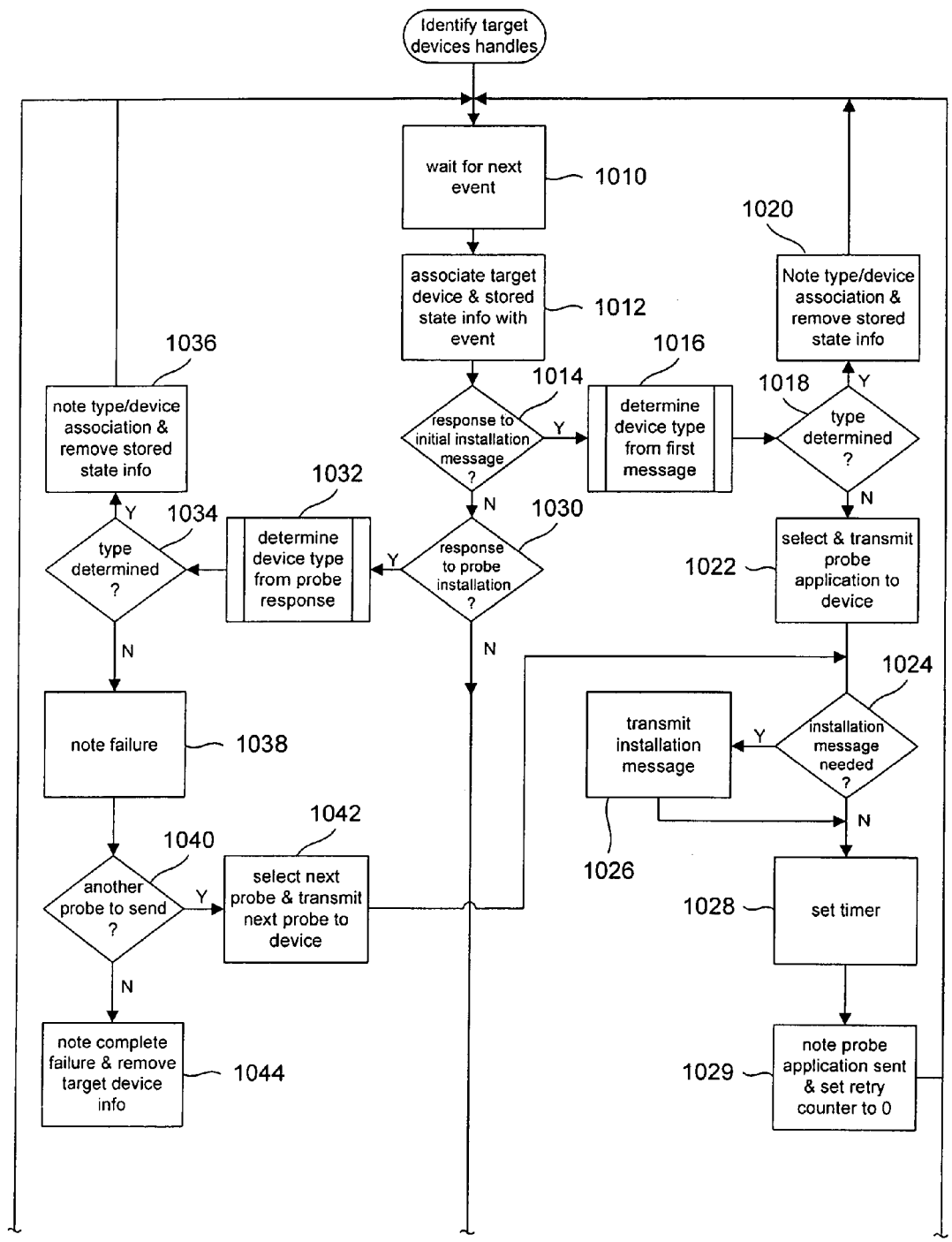
Figure 10C:
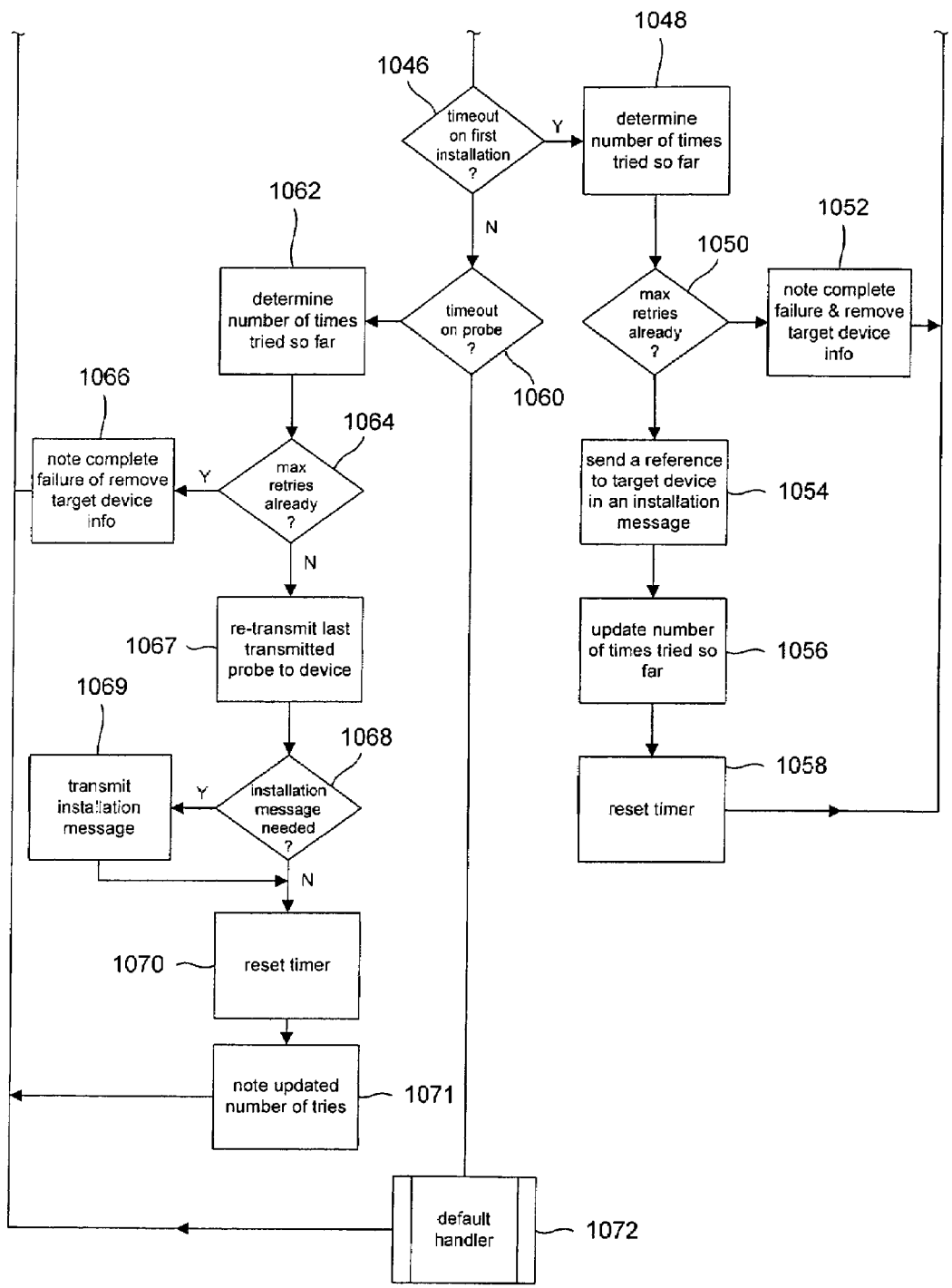

FIGS. 10B-C show a control-flow diagram for a handler that continuously executes on the server to handle events associated with the above-described routine "identifyTargetDevices." In step 1010, the handler waits for a next event. When a next event occurs, the handler awakens and, in step 1012, associates a particular target device and stored state information related to that target device with the event. If the event is a response to an installation message sent in step 1004 of FIG. 10A, as determined in step 1014, then, in step 1016, the handler invokes a routine to determine the type of device and characterize the device from the request/response message sent by the target device in response to the installation message. If the device type can be determined and the device fully characterized from the request/response message, as determined in step 1018, then the device type and device characterization is stored in memory, and the state information associated with the target device is deleted, in step 1020, completing identification and characterization of the target device.

Otherwise, in step 1022, the handler selects a probe application for the device and transmits the probe application to the target device. A probe application is selected based on the best guess as to the type of device that can be made based on the response/request message received from the device and any other device information previously accessed and associated with the target device. If, in addition to sending the probe application, a separate installation message or signal needs to be sent by the handler in order to launch or invoke the probe application on the target device, as determined in step 1024, then, in step 1026, the handler transmits the installation message or signal to the target device following a sufficient period of time for the transmitted probe application to be received and processed by the target device. Rather than waiting for the needed period of time, the handler may simply transmit the probe application, in step 1022, and then set a timer to subsequently reawaken the handler for transmitting the installation message or signal. Next, in step 1028, the handler sets a timer associated with deployment of the probe application to the target device and, in step 1029, records the fact that the probe application was sent to the target device and sets a retry counter to 0, in step 1029. If the event that awakened the handler is a response to a probe installation, as determined in step 1030, then, in step 1032, the handler invokes a routine to determine the type of the target device and characterize the target device based on a message received from the executing probe application. If, as determined in step 1034, the type of device is fully determined and the device sufficiently characterized based on the probe-application message, then, in step 1036, the device type and characterization is stored in memory, and state information associated with the target device is deleted. Otherwise, in step 1038, the failure to identity the device from the probe information is noted in memory. If, as determined in step 1040, there is another probe application that may be sent to the target device to attempt to identify the type of the target device, the next probe application is selected and transmitted to the target device in step 1042, and control flows to previously described step 1024 for installation of the transmitted probe application and setting of a timer associated with transmission of the probe application. If no additional probe application can be sent to the target device, then, in step 1044, the failure to identify or characterize the target device is recorded, and target device information is removed from the user/target list to prevent additional service-application-deployment steps directed to the target device. Various different types of actions may be taken, upon failure to identify and characterize the target device, in different implementations of the DCA creation and deployment method of the present invention.

If, as determined in step 1046, the event that wakened the handler is an expiration of a timer associated with a transmission of a first installation message, then, in step 1048, the handler determines the number of times that target identification has been tried. If the number of attempts to identify the device exceeds a maximum threshold value, as determined in step 1050, then complete failure to identify and characterize the device is noted in step 1052, and the target device is removed from the user/target list prepared in step 911 in FIG. 9. Otherwise, a new message containing a reference is sent to the target device in a new installation message, in step 1054, the retry counter is incremented in step 1056, and the timer for the installation message is reset in step 1058. If the event that awakened the handler is expiration of a timer associated with a probe application, as determined in step 1060, then in step 1062, the handler determines the number of times that probe application has been tried on a target device. If the number of times that the probe application has been tried exceeds a maximum threshold value, as determined in step 1064, then a complete failure is noted, and the target-device information is removed from the user/target list in step 1066. Otherwise, the last transmitted probe application is retransmitted to the target device, in step 1066, and additional steps for launching the probe application, resetting of the probe-application-related timer and updating the retry counter are carried out in steps 1068-1071. Otherwise, any other event that awakened the handler is handled in a default handler routine of step 1072. In all cases, following handling of the event that awakened the handler, control returns to step 1010, where the handler waits for a next event.

The handler implementation is somewhat simplified, in FIGS. 10B-C, to facilitate description of the present invention. In general, handlers may be designed to handle multiple events that may occur concurrently while the handler is active, rather than being explicitly invoked for each separate event. However, general construction and implementation of handlers is well known, and such details would serve only to obscure the essence of the present invention.

Figure 10D:
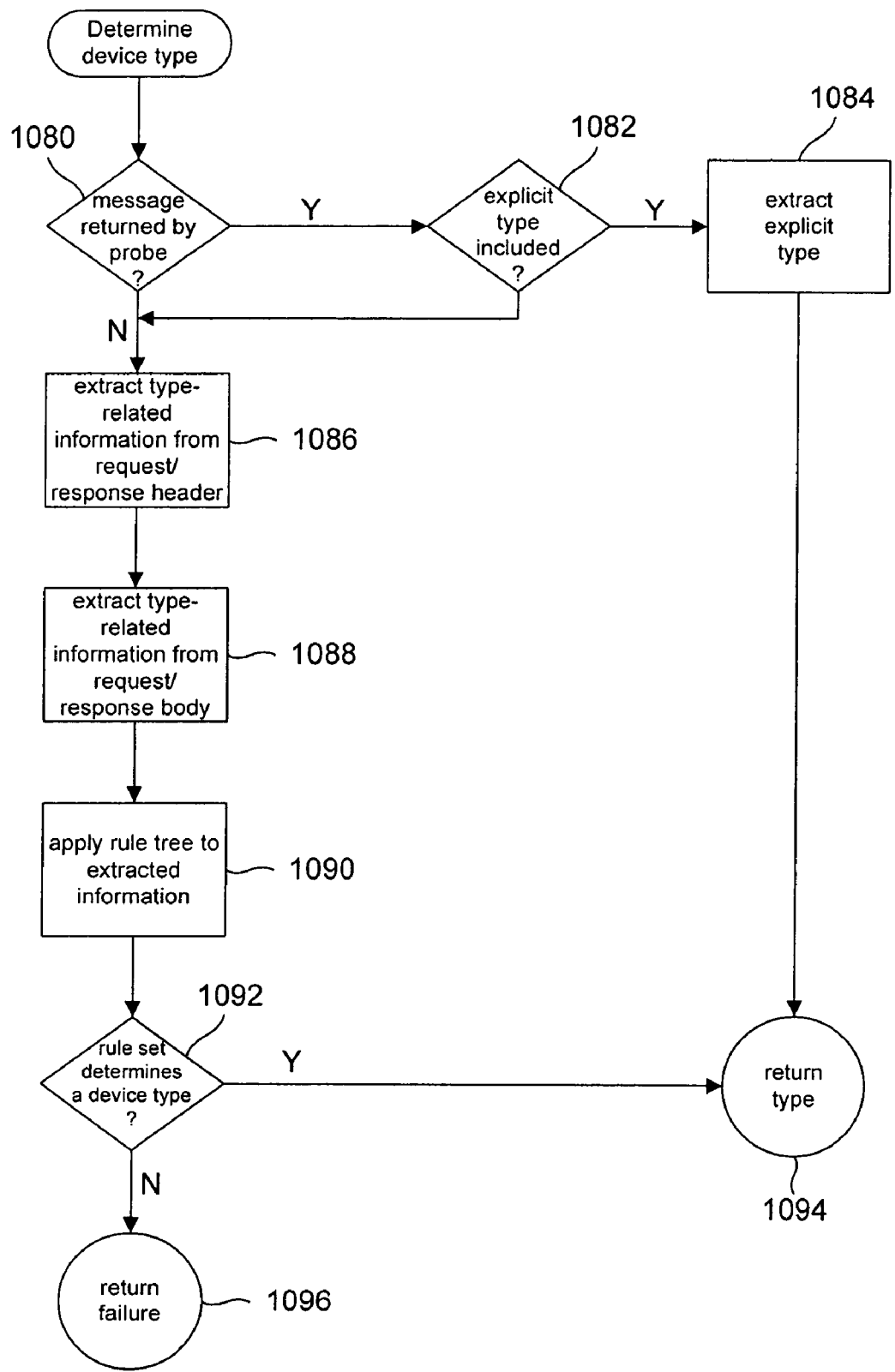

FIG. 10D is a control-flow diagram that generally describes identification and characterization of a target device from a request/response message received from an initial installation message or from a probe application, in steps 1016 and 1032 of FIG. 10B. In certain embodiments of the present invention, separate device-identification routines may be implemented for steps 1016 and 1032 of FIG. 10B, while in alternative embodiments, a common device-identification routine may be invoked from either of steps 1016 and 1032. In step 1080, the routine "determineDeviceType" determines whether the request/response message was returned by a probe application. If so, then in step 1082, the routine "determineDeviceType" determines whether an explicit type was included in the message received from the probe application. If so, then in step 1084, the explicit device type is returned, along with any additional information related to characterization of the device. Certain types of probe applications may invoke functions on the target device to determine the device type. Alternatively, probe applications may access various functions and features of a target device and determine the type of the target device based on the behavior of the target device. However, if the message is not returned by a probe, or does not include explicit type information, then, in step 1086, the routine "determineDeviceType" extracts type-related information from the request/response message header or headers. Often, headers in messages sent from a target device include sufficient information to infer the type of the target device. In step 1088, when necessary, the routine "determineDeviceType" extracts any type-related information that can be gleaned from the request/response message body. Then, in step 1090, the routine "determineDeviceType" applies a set of rules to the information extracted in steps 1086 and 1088 to determine and characterize the target device based on the extracted information. If application of the rules to the extracted information unambiguously determines a device type, and further characterizes the device, as determined in step 1092, then the device type and additional characterization is returned in step 1094. Otherwise, failure to determine the device type is determined in step 1096.

Figure 11:
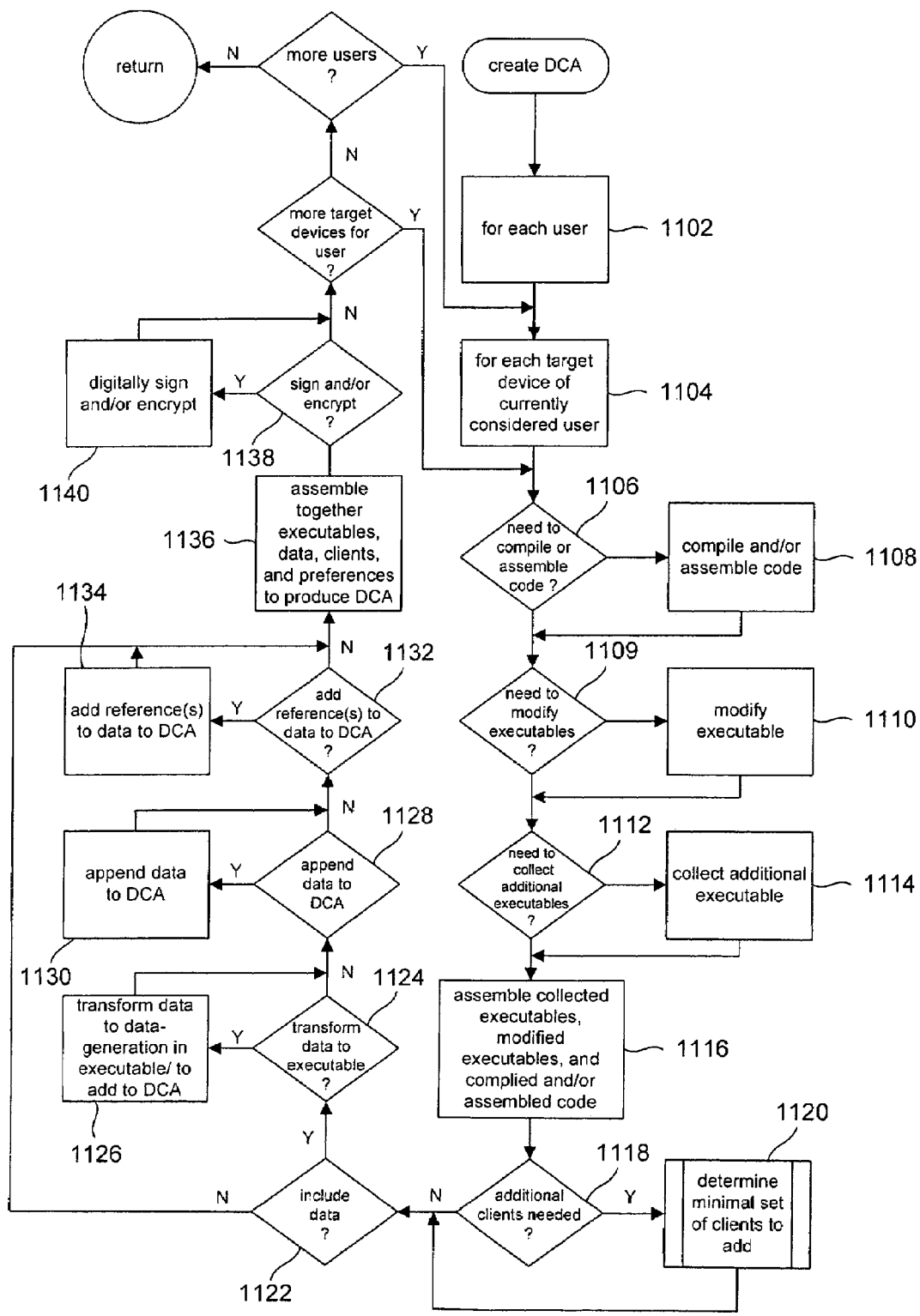
FIG. 11 is a control-flow diagram illustrating the routine "createDCA" called from step 808 of FIG. 8.

FIG. 11 is a control-flow diagram illustrating the routine "createDCA" called from step 808 of FIG. 8. The routine "createDCA" is essentially two nested for-loops, beginning in steps 1102 and 1104, in which a DCA is created for each target device for each user described in the user/target list prepared in step 911 of FIG. 9. If source code needs to be compiled or assembly code assembled for the DCA, as determined in step 1106, then the source code is compiled and/or assembly code assembled in step 1108. Thus, dynamic creation of a service application may involve on-the-fly compilation or assembly, to enable particular source code or assembly code suitable for the target device to be collected and compiled and/or assembled with particular compiler flags and assembler flags and parameters suitable for the target device. If, as determined in step 1109, existing executables need to be modified to create a DCA tailored for the target device, as determined in step 1109, then the executables are accordingly modified in step 1110. Modifications may include renaming the executables, or it may include altering data sections contained in the executables, changing headers of the executables, or other such modifications. If, as determined in step 1112, additional executables need to be identified and collected in order to prepare a DCA specifically targeted to the currently considered target device, as determined in step 1112, then the additional executables are located and collected in step 1114. The executables, modified executables, and on-the-fly compiled and/or assembled executable code obtained in steps 1108, 1110, and 1114 are assembled together to produce an executable service application tailored for the currently considered target device in step 1116. The product of step 1116 may be a single executable, a single executable with additional library routines, a set of executables, or other forms of executable service applications suitable for the currently considered target device.

Next, in step 1118, the routine "createDCA" determines whether additional clients need to be activated for provision of particular functions on the target device, transmitted to, and installed on, the target device, or otherwise invoked on the target device. Clients are executables or libraries that provide a set of well-defined functions that can be called by one or more service applications, and may be separate entities or embedded in service applications. If additional clients need to be transmitted to, or activated on, the target device, then, in step 1120, the minimal set of clients that need to be transmitted to, or activated on, the target device is determined. The clients may be included in the DCA or separately transmitted to, and installed on, the target device.

Next, in step 1122, the routine "createDCA" determines whether additional data needs to be included in the DCA. If so, then, in step 1124, the routine "createDCA" determines whether any of the additional data needs to be transformed into executable code. If so, then that portion of the additional data that needs to be transformed into executable code is so transformed in step 1126. For example, the DCA may need to access data describing a screen layout or menu that forms part of a user interface for the service application on the target device. The data may be explicitly included in the DCA, or executable code may be included in a DCA to generate the data when executable code is executed on the target device. In step 1128, the routine "createDCA" determines whether any additional data needs to be appended to the DCA. If so, then that additional data is appended to the DCA in step 1130. In step 1132, the routine "createDCA" determines whether the DCA requires references, such as URLs, to data stored remotely from the target device. If so, then those references to remotely stored data are added to the DCA in step 1134. Thus, data needed by the service application on the target device may be transmitted for storage on the target device, generated by executables running on the target device, or accessed by the service application from remote data sources during execution of the service application on the target device. In step 1136, the assembled executables generated in step 1116 are packaged together with the added references, data, and data-generating executables produced in steps 1126, 1130, and 1134 to produce a final DCA. If the DCA needs to be signed and/or encrypted, as determined in step 1138, then the DCA is digitally signed and/or encrypted in step 1140. A wide variety of different digital signing and encryption techniques, including public/private encryption key-based techniques, can be employed to ensure that a DCA created and tailored to a particular target device cannot be intercepted and used by another device.

Figure 12A:
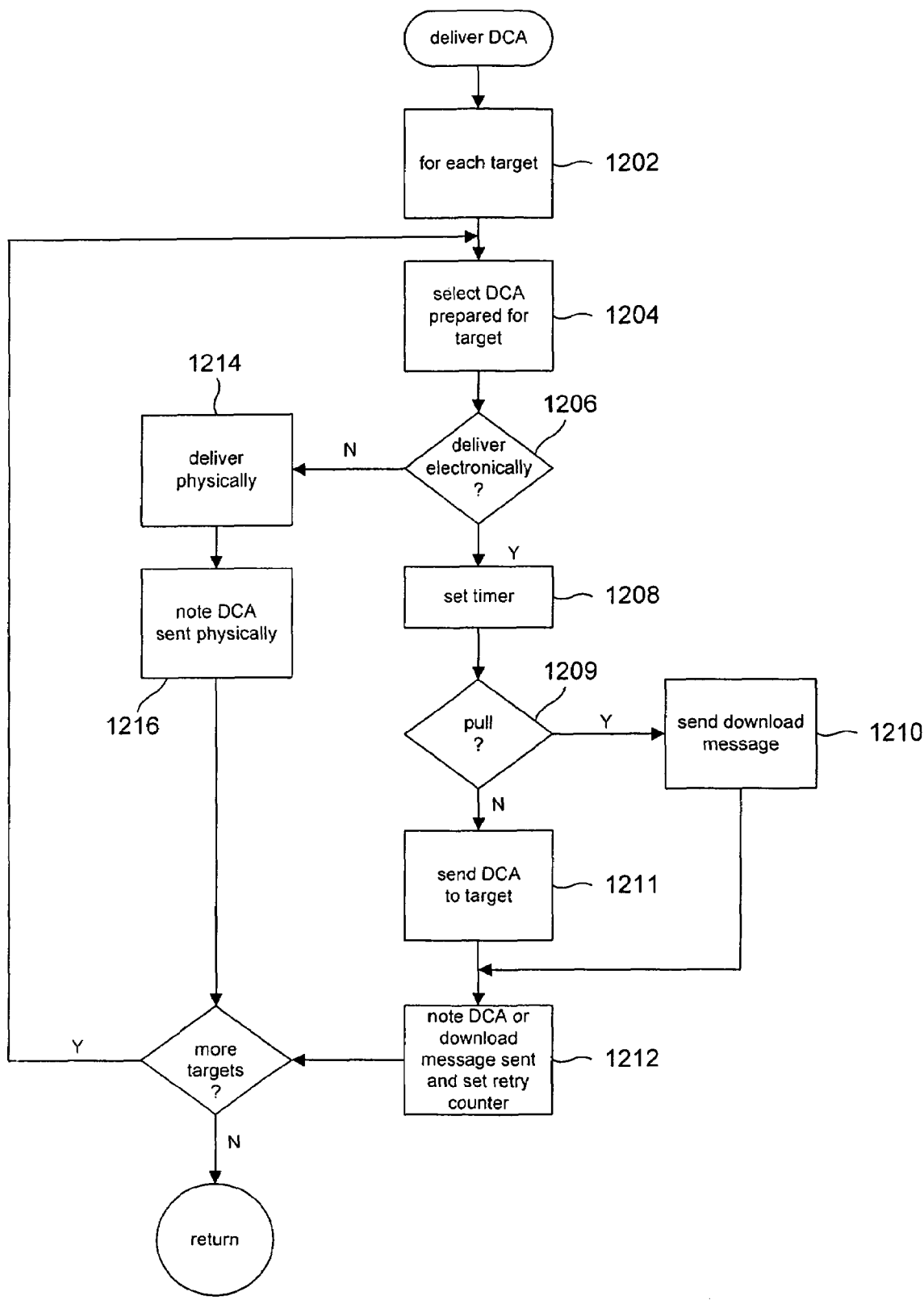
FIGS. 12A-B include control-flow diagrams that describe the delivery of DCAs to target devices invoked in step 810 of FIG. 8.
Figure 12B:
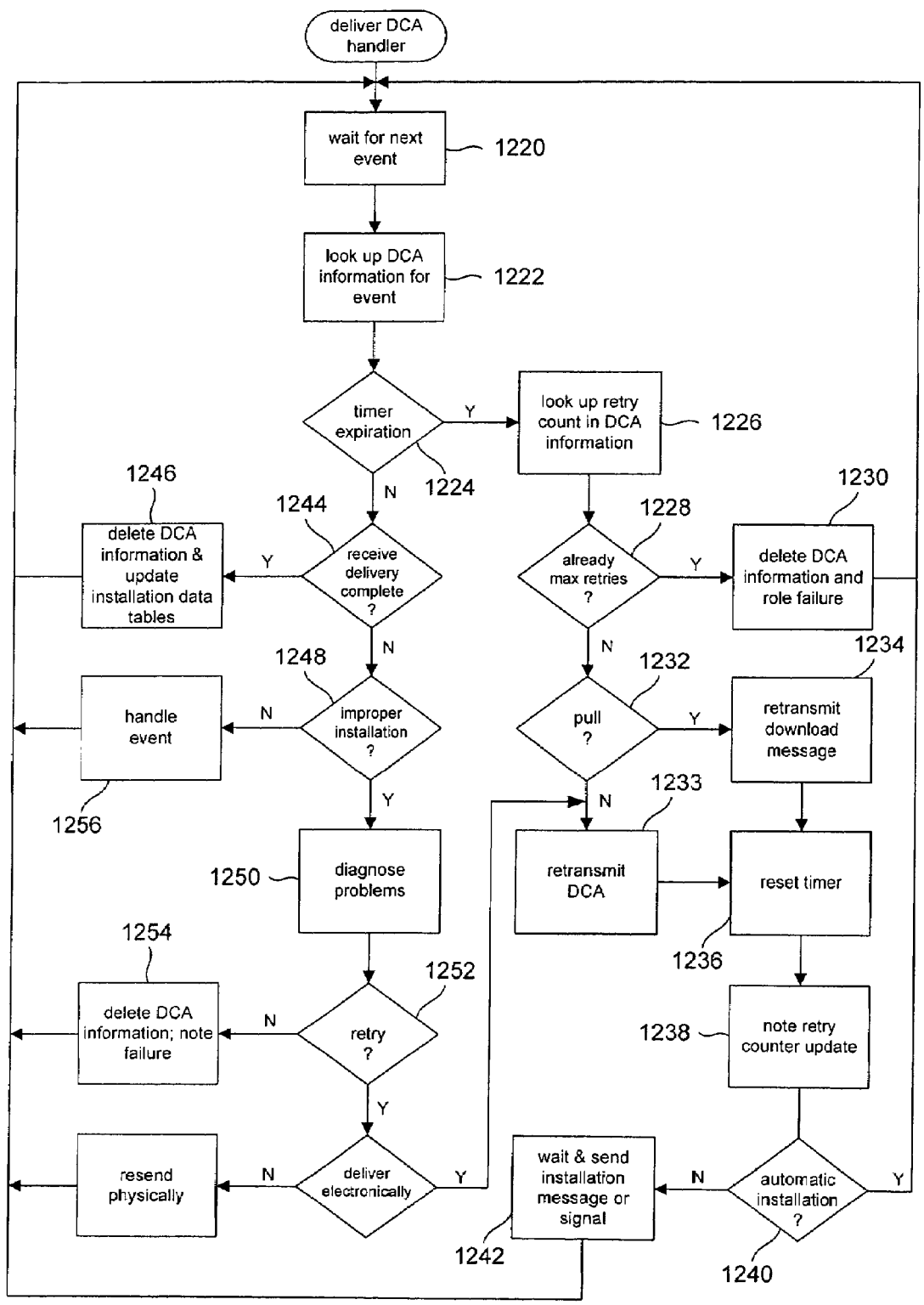

FIGS. 12A-B include control-flow diagrams that describe the delivery of DCAs to target devices invoked in step 810 of FIG. 8. FIG. 12A shows a control-flow diagram for a routine "deliverDCA." The routine "deliverDCA" is a for-loop, beginning with step 1202, that delivers the DCA prepared for each target to its corresponding target device. Note that, in the described embodiment, all DCAs are prepared for target devices prior to delivery of the DCA to their respective target devices, although in alternative embodiments, steps 808 and 810 of FIG. 8 may be interleaved so that the DCA is immediately delivered to its target device prior to preparation of subsequent DCAs for subsequent target devices. In step 1204, the DCA prepared for the currently considered target device is selected. If the DCA is to be delivered electronically, as determined in step 1206, then, in steps 1208-1212, a download message is sent to the target device to direct the target device to download the DCA from the server, in step 1210, in the case that a pull paradigm is appropriate for the target device, or, otherwise, the DCA is sent in one or more messages to the target device in step 1211 and, in either case, download or transmission of the DCA is noted, in memory in step 1212. If the DCA is not delivered electronically, then the DCA may be physically delivered, in step 1214, with physical delivery of the DCA noted in memory in step 1216. Determination of whether or not to electronically deliver the DCA, in step 1206, may be made based on characteristics of the target device, pre-collected user preferences, or other such information. Electronic delivery may occur through the phone network, the Internet and the phone network, or through cables or other direct connections between the target device and the server or a PC in communication with the server. Physical delivery of the DCA may occur by encoding the DCA on a data storage medium, such as a CD, DVD, memory stick, or other such data-storage medium, and physically transporting the data-storage medium to a user of the target device via mail or package-delivery services.

FIG. 12B shows a handler associated with the routine "deliverDCA." In step 1220, the handler waits for a next event associated with DCA delivery. When that event occurs, the handler looks up DCA information related to that event in step 1222. If the event is a timer expiration, as determined in step 1224, then the handler accesses retry counter information in the DCA information associated with the event, in step 1126. If delivery has already been tried a maximum number of times, as determined in step 1228, then the DCA information is deleted from the server, and failure to deliver is noted, in step 1230. Otherwise, the DCA is retransmitted to the target device, in steps 1232-1234, the timer is reset in step 1236, and the retry counter is updated in step 1238. If installation is not automatic, as determined in step 1240, then in step 1242, the handler sends an appropriate installation message or signal to the target device. In alternative embodiments, sending of installation messages and signals occur in response to an additional event, such as expiration of a timer, set by the handler, rather than a handler waiting for delivery of the DCA. If the event is a reception of a delivery-complete message, as determined in step 1244, then the DCA information associated with the event is deleted from server memory, and installation data tables are updated to reflect successful deployment of the DCA to the target device, in step 1246.

If the event corresponds to reception of an improper installation message, as determined in step 1248, then the improper installation problem is diagnosed, in step 1250. In certain cases, as determined in step 1252, installation may be retried, while in other cases, DCA deployment is considered to have failed, and the DCA information associated with the event is deleted from memory and the failure noted, in step 1254. Any other events are handled by a default event handler in step 1256. In the described embodiment, the handler waits to receive a delivery-complete message from the target device for considering the DCA to be successfully deployed. In alternate embodiments, the "deliverDCA" routine may explicitly inquire, via messaging or other means, whether the target device has received and successfully deployed the DCA.

Figure 13:
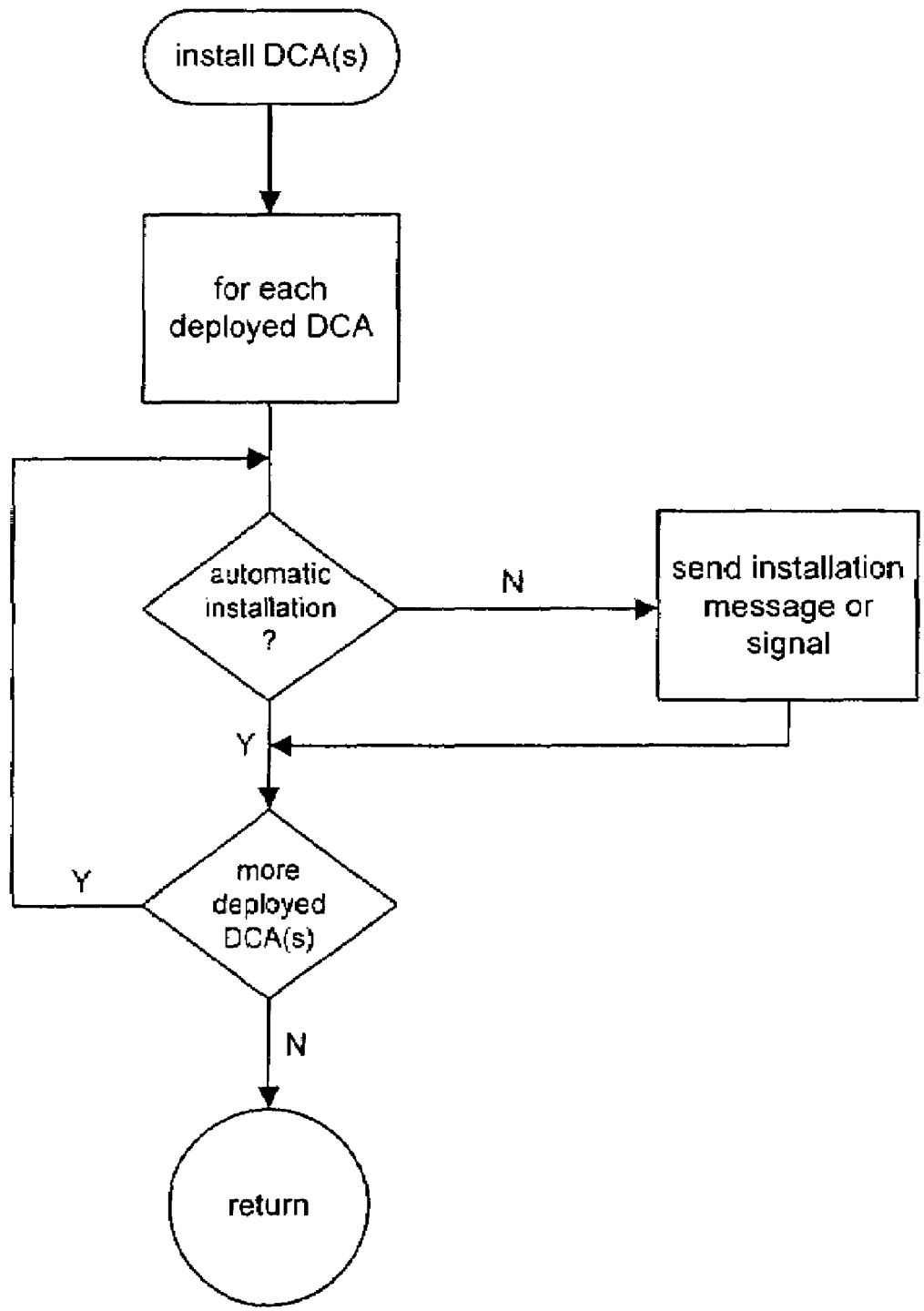
FIG. 13 shows a control-flow diagram for the routine "installDCAs" invoked in step 812 of FIG. 8.

FIG. 13 shows a control-flow diagram for the routine "installDCAs" invoked in step 812 of FIG. 8. This routine sends an explicit installation message or signal to target devices that require installation messages or signals to invoke installation of a deployed DCA. The installation messages or signals may alternatively be sent by the routine "deliverDCA" shown in FIG. 12A, or may be sent from the DCA handler, as shown in FIG. 12B, following expiration of a timer set by the routine "deliverDCA" to allow for a reasonable amount of time between transmission of the DCA to the target device and installation.

Figure 14:
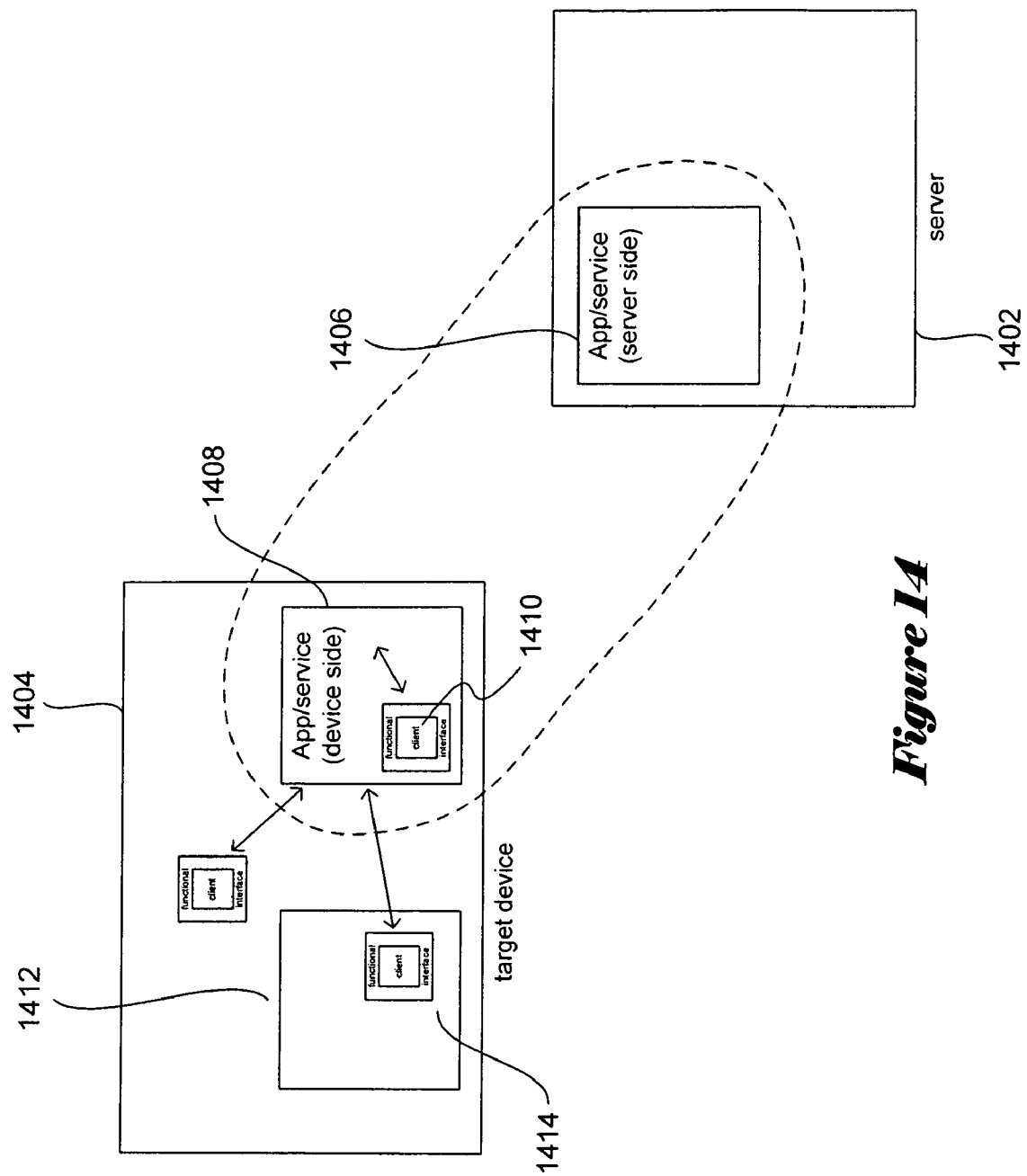
FIG. 14 illustrates the meaning of the terms "service application," "client," and "function" with respect to embodiments of the present invention.

Next, the method for determining the minimal set of clients to add to a DCA, a routine for which is invoked in step 1120 of FIG. 11, is described with reference to FIGS. 14 and 15, exemplary SQL-like pseudocode, and two control-flow diagrams provided in FIGS. 16 and 17. FIG. 14 illustrates the meaning of the terms "service application," "client," and "function" with respect to embodiments of the present invention. In FIG. 14, a server 1402 and target device 1404 are shown as blocks. A service application that provides for a service accessed from the target device can be considered to be distributed between the server and target device, with a server-side service-application portion 1406 executing on a server and a device-side service-application portion 1408 executing on the target device. The device-side service application may invoke functions provided by one or more clients that execute on the target device. A client may be embedded within a service application, such as embedded client 1410, may be independent executable entities that run on the target device, such as client 1412, or may be embedded in a different service application from the service application that invokes functions provided by the client, such as embedded client 1414 in FIG. 14. Clients are analogous to shared library routines accessed by programs executing on a personal computer.

Many hand-held electronic devices have limited memories and limited computational capacities. In these devices, it is important to install only as many clients as needed by the services currently deployed to the target device and by the native target-device control program and application. Thus, when a DCA is deployed to a target device, method and system embodiments of the present invention endeavor, in step 1120 of FIG. 11, to deploy and activate a minimal set of clients needed for deployment of a service application to the target device.

There are many different ways to monitor deployment and activation of clients and functions provided by clients on target devices, and to determine a minimum set of additional clients and function activations needed for deployment of a particular service application. In one embodiment, information related to deployment of service applications and clients to target devices is maintained in a set of relational-database tables on a server, which are used in order to determine a minimal set of client deployments and client-function activations needed during deployment of a service application, in step 1120 of FIG. 11.

Figure 15:
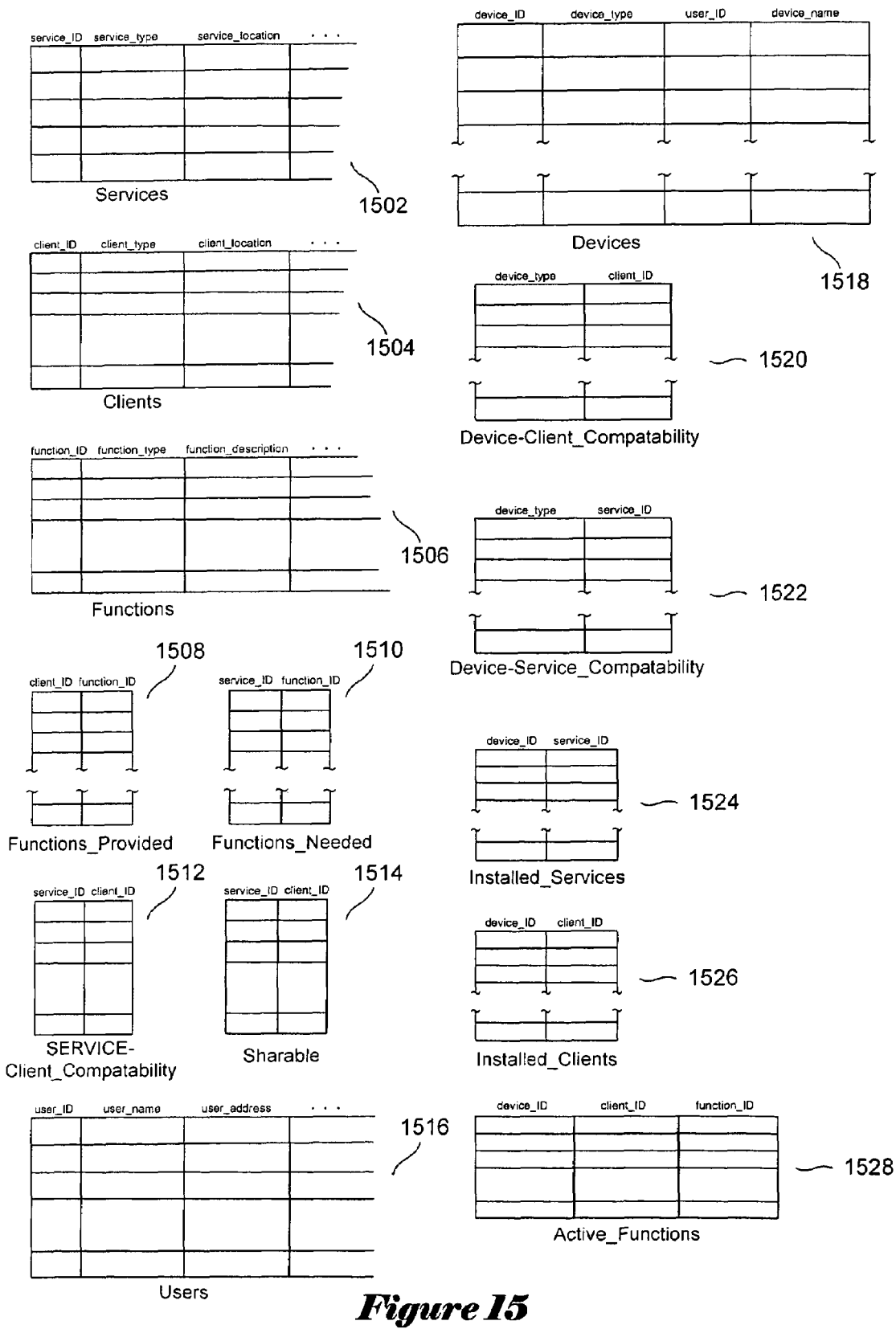
FIG. 15 illustrates a set of relational tables that may be used to store information related to service-application and client deployment installation on target devices according to one embodiment of the present invention.

FIG. 15 illustrates a set of relational tables that may be used to store information related to service-application and client deployment installation on target devices according to one embodiment of the present invention. The table Services 1502 stores information related to services deployed on target devices, including a service_ID, service_type, and service_location field for each deployed service application. Similarly, the table Clients 1504 and the table Functions 1506 store information regarding deployed clients and functions provided by clients. The table Functions_Provided 1508 stores client_ID/function_ID pairs indicating those functions provided by each client, and the table Functions_Needed 1510 stores service_ID/function_ID pairs that indicate the particular functions needed by each different service application. The table Service_Client_Compatibility 1512 stores service_ID/client_ID pairs that indicate which clients are compatible with which service applications, and the table Sharable 1514 stores service_ID/client_ID pairs that indicate clients that may be sharable with respect to particular service applications. The table Users 1516 includes information about each different user, including a user_ID, user_name, and additional user information fields. The table Devices 1518 describes each device controlled or owned by users known to the system. The table Device_Client_Compatibility 1520 stores device_type/client_ID pairs that indicate which clients are compatible with which device types, and the table Device_Service_Compatibility 1522 stores device_type/service_ID pairs that each indicates that a service is compatible with a device type. The table Installed_Services 1524 includes device_ID/service_ID pairs that describe which service applications are installed on which devices, the table Installed_Clients 1526 stores device_ID/client_ID pairs that describe which clients are installed on the various devices known to the system. Finally, the table Active_Functions 1528 stores device_ID/client_ID/function_ID triples that describe functions activated for each client on each target device.

Figure 16:
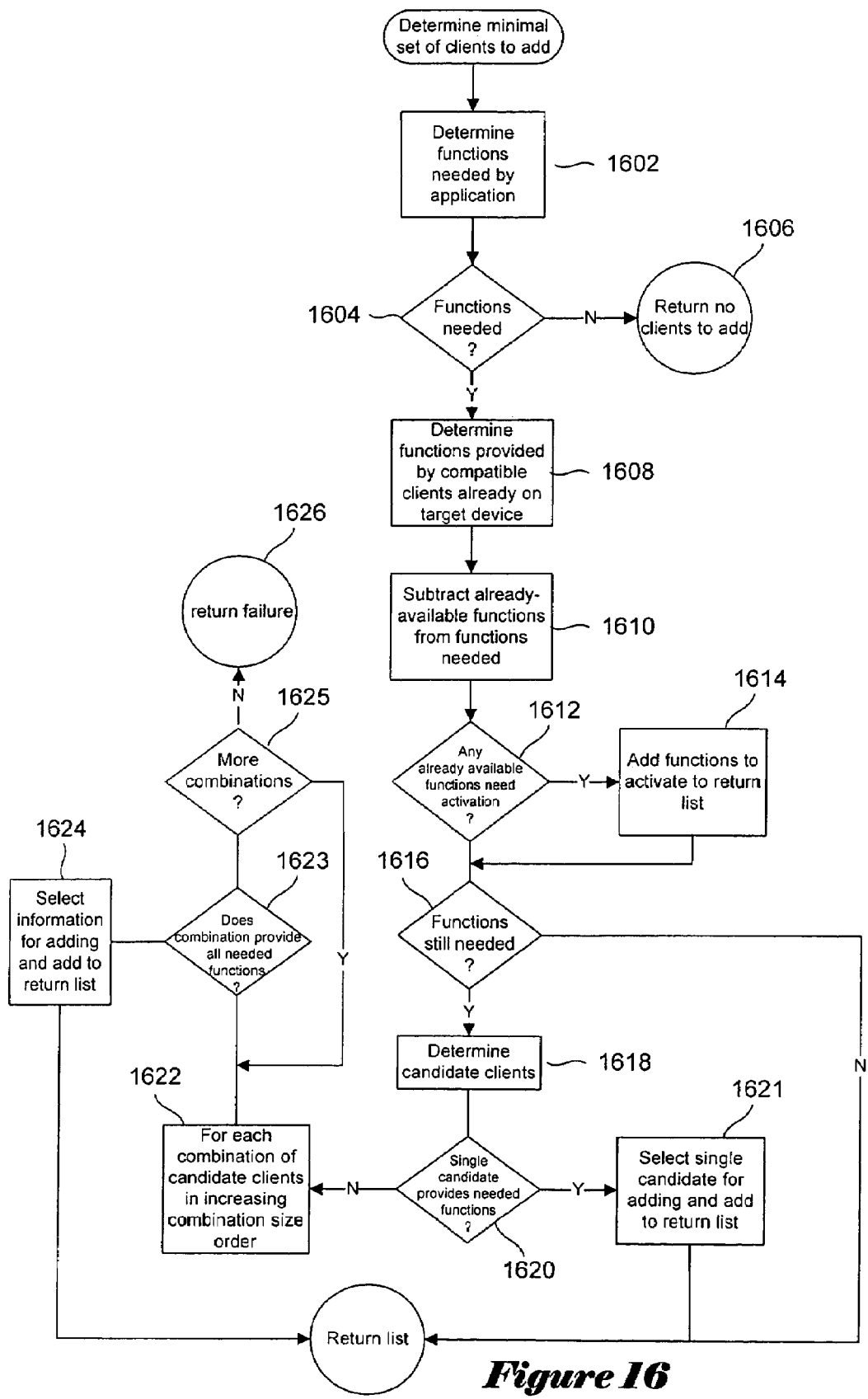
FIG. 16 is a control-flow diagram illustrating a routine that determines the minimal set of clients to add to a target device in the course of deploying a service application, called in step 1120 of the routine "createDCA" described in FIG. 11.
Figure 17:
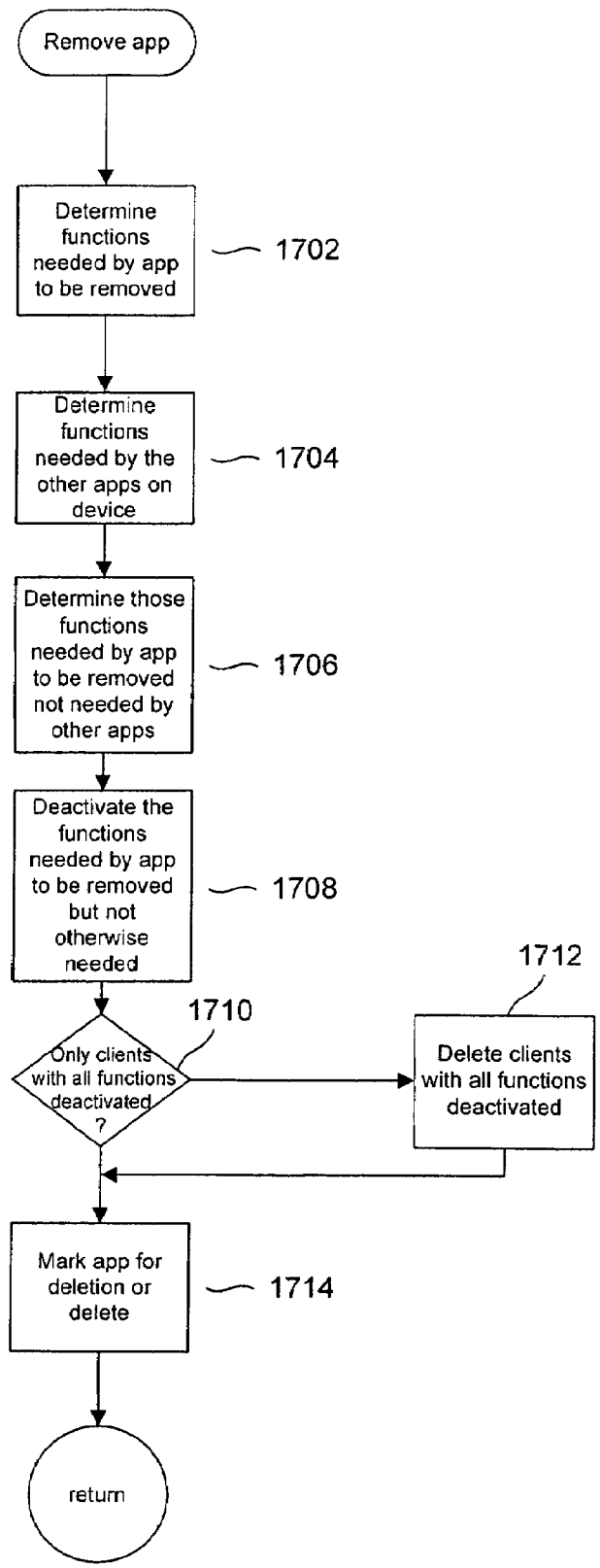
FIG. 17 provides a control-flow diagram for a remove-service-application routine.

FIG. 16 is a control-flow diagram illustrating a routine that determines the minimal set of clients to add to a target device in the course of deploying a service application, called in step 1120 of the routine "createDCA" described in FIG. 11. Various steps in FIG. 16 are illustrated with SQL-like pseudocode. In the SQL-like pseudocode, the variables S and T are defined as follows: TABLE-US-00001 S=service_ID of service to be installed T=device_ID of target device.

First, in step 1602, the routine determines the functions that are needed by the service application to be deployed. SQL-like pseudocode for this step, using the relational tables shown in FIG. 15, is next provided: TABLE-US-00002 CREATE TABLE F (function_ID INTEGER); INSERT INTO F SELECT DISTINCT function_ID FROM Functions_Needed WHERE service_ID=S.

If there are no functions needed, as determined in step 1604, then an indication that no clients need to be added is returned, in step 1606. Next, in step 1608, the routine determines which of the needed functions are provided by compatible clients already installed on the target device. SQL-like pseudocode for this step is next provided: TABLE-US-00003 CREATE TABLE A (function_ID INTERGER); INSERT INTO A SELECT Client_ID, function_ID FROM Installed_clients I, Functions_Provided P, Service_Client_Compatibility C, Sharable SB, F WHERE I.client_ID=P.client_ID AND I.device_ID=T AND C.service_ID=S AND C.client_ID=P.client_ID AND SB.service_ID=S AND SB.client_ID=P.client_ID AND Plunction_ID IN (SELECT function_ID FROM F) GROUP BY function_ID.

In step 1610, the functions already provided by compatible clients, determined in step 1608, are subtracted from the functions needed by the service application, determined in 1602, to produce a final list of functions needed on the target device for the service application. SQL-like pseudocode for this step is next provided: TABLE-US-00004 DELETE FROM F WHERE function_ID IN (SELECT DISTINCT function_ID FROM A).

Next, in step 1612, the routine determines whether any of the already-available functions, determined in step 1608, need activation. Those functions needing activation are noted in a list of needed function activations in step 1614 that are eventually returned to the routine "createDCA." SQL-like pseudocode for determining functions that need activation is next provided: TABLE-US-00005 DELETE FROM A WHERE function_ID IN (SELECT DISTINCT function_ID FROM Active Function WHERE device_ID=T AND client_ID IN (SELECT DISTINCT client_ID FROM A).

If functions are still needed on the target device, as determined in step 1616, then, in step 1618, the routine determines a set of candidate clients that provide the needed functions. SQL-like pseudocode for this step is next provided: TABLE-US-00006 CREATE TABLE CANDIDATES (client_ID INTEGER, function_ID INTEGER); INSERT INTO CANDIDATES SELECT DISTINCT client_ID, function_ID FROM Functions_Provided P, Service_Client_Compatibility C, Device_Client_Compatibility D, Devices DS, Sharable SB, F WHERE P.client_ID=C.client_ID AND C.service_ID=S AND D.device_type=DS.device_type AND D.client_ID=P.client_ID AND DS.device_ID=T AND P.client_ID=SB.client_ID AND SB.service_ID=S AND P.function_ID IN (SELECT function_ID FROM F) GROUP BY client_ID DESC.

If a single candidate client can provide all the needed functions, as determined in step 1620, then a single candidate client is selected from all candidate clients that provide all the needed functions in step 1622 and added to the return list. SQL-like pseudocode for obtaining a list of candidate clients that provide all of the needed functions is next provided: TABLE-US-00007 SELECT COUNT (*) FROM F INTO Z; SELECT CD.client_ID FROM CANDIDATES CD WHERE Z=(SELECT COUNT (DISTINCT function_ID) FROM CANDIDATES CT WHERE CT.client_ID=CD.client_ID).

Otherwise, in the for-loop of steps 1622-1625, possible combinations of two, three, and greater numbers of candidate clients are considered to determine the minimal number of candidate clients necessary to provide all the needed functions. Once a suitable candidate combination is found, that client combination is returned in step 1624. If no combination of clients can be found to provide the needed functions, then failure is returned in step 1626. The list returned by the routine to the routine "createDCA" can then be used by the routine "createDCA" to include clients and instructions for function activation of existing clients into the DCA, to undertake explicit function-activation steps with respect to the target device, and/or other steps in order to ensure that the minimal set of clients as needed by the service application is installed on the target device and that the needed functions are activated.

In certain embodiments of the present invention, a user may invoke a method for removing a service application from a target device, or the method may alternatively be automatically invoked by the user's PC or the server under certain circumstances. FIG. 17 provides a control-flow diagram for a remove-service-application routine. In step 1702, the routine determines those functions needed by the service application that is to be removed. In step 1704, the routine determines which of those functions needed by the service application to be removed are needed by other applications that remain on the target device. Using this information, the routine determines, in step 1706, the functions that are no longer needed on the target device once the service application to be removed is removed from the target device and, in step 1708, deactivates those unneeded functions by whatever techniques are appropriate for deactivating functions on the target device. If, as determined in step 1710, any clients on the target device have all functions provided by the clients deactivated, and are therefore unneeded on the target device, then those clients are deleted from the target device in step 1712. Finally, in step 1714, the service application is marked for deletion or deleted from the target device. Thus, by maintaining only a minimal set of clients on a target device needed by the service applications currently deployed to that target device, the present invention minimizes the memory and computational resources devoted to service applications on target devices so that target-device performance is minimally impacted by the service applications, and so that a maximum number of service applications may be deployed to the target device.

Link-Based Inter-Device Communication

Figure 18:
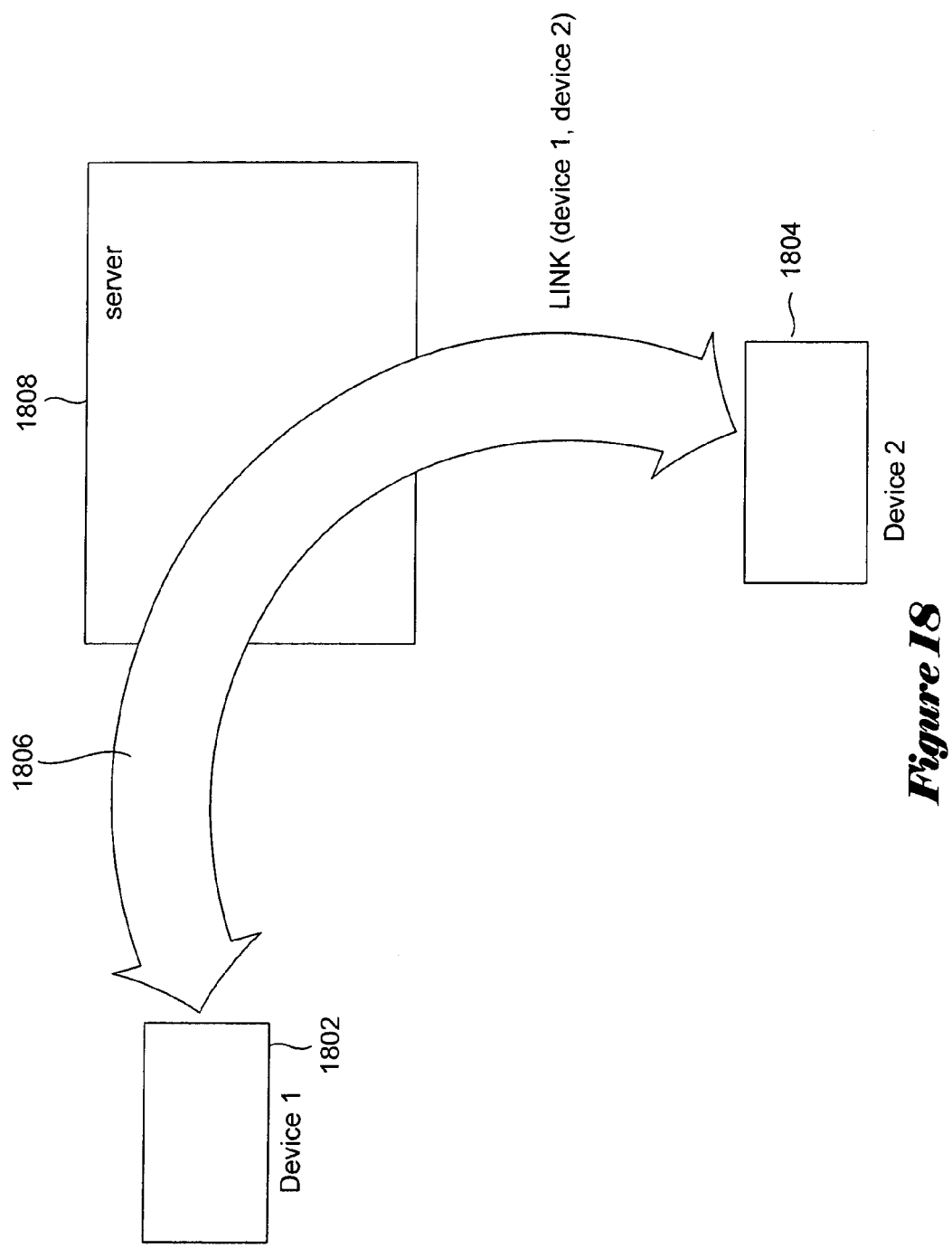
FIG. 18 illustrates the concept of a link.
Figure 19:
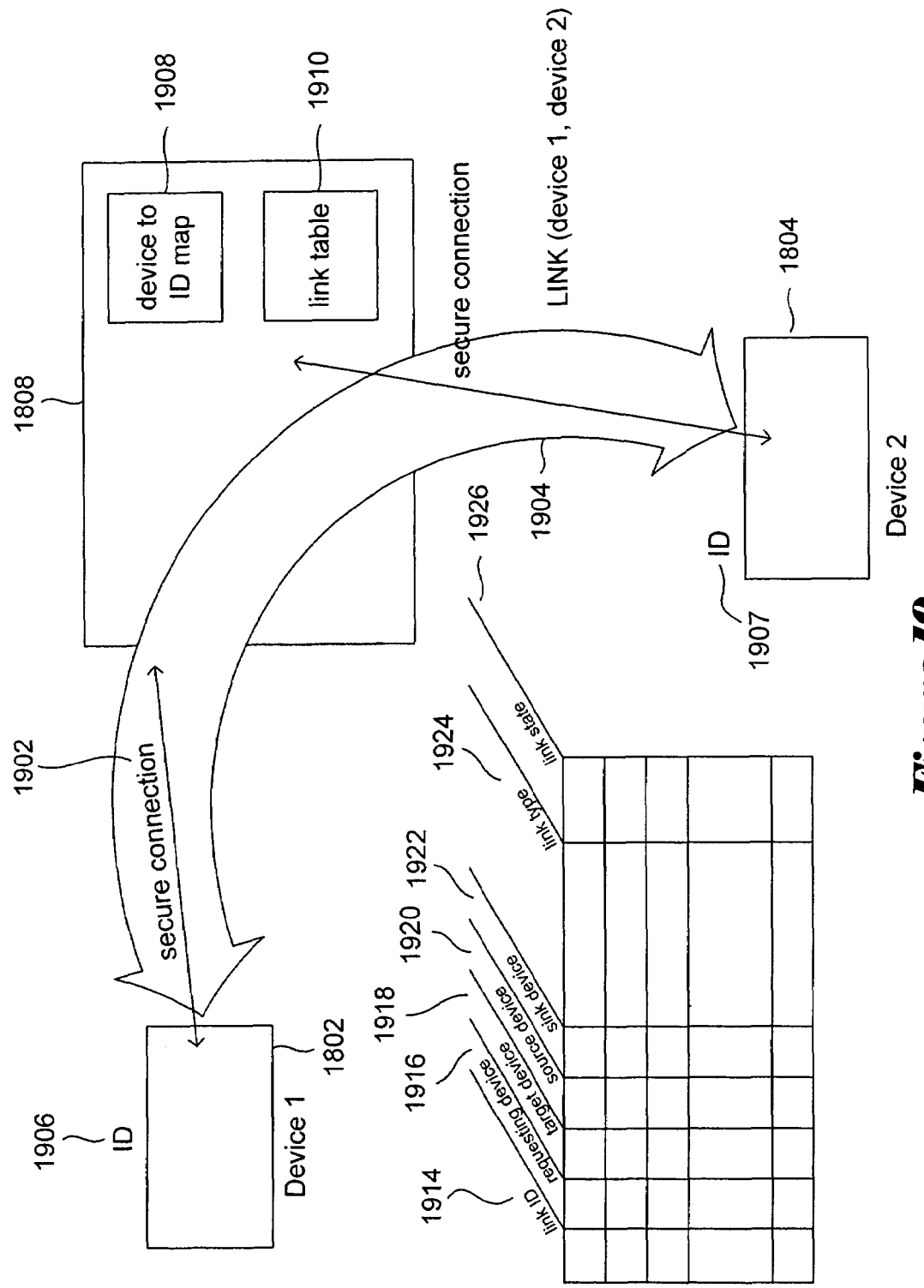
FIG. 19 illustrates implementation of the link shown in FIG. 18.

As discussed in previous subsections, with particular reference to FIG. 6, method and system embodiments of the present invention provide a virtual communications medium and network that allows electronic hand-held devices, servers, and PCs to intercommunicate securely and relatively seamlessly, from the standpoint of users. This intercommunication, however, is implemented within the currently existing environment, such as the communications environment illustrated in FIG. 1. The virtual communications medium and network provided by method and system embodiments of the present invention is based on the establishment of links between devices. FIG. 18 illustrates the concept of a link. In FIG. 18, a first device 1802 communicates with a second device 1804 via a link 1806. The link is shown traversing the server 1808, since, as discussed above, the server, or servers in multiple-server systems, acts as a switch for routing messages and, data between devices. FIG. 19 illustrates implementation of the link shown in FIG. 18. The link is composed of a first two-way secure connection 1902 between the first device 1802 and the server 1808 and a second secure connection 1904 between a second device 1804 and the server 1808. The link is a logical entity, and may persist logically despite destruction and re-establishment of secure connections. Each device is associated with a global, unique ID 1906 and 1907 that allows devices to identify themselves to the server and to other devices. The server maintains a mapping of devices to IDs 1908 as well as a link table 1910 that describes all currently active links within the system. In FIG. 19, one embodiment of the link table 1912 is shown as a relational table, although any of a variety of different table implementations is possible. Each active link is described by a row in the table, and each row includes the following fields: (1) a link ID that uniquely identifies the link 1914; (2) the ID of the device that initially requests the link 1916; (3) the ID of the device that is the target for the request 1918; (4) the ID of the device that serves as the source of information during link operation 1920; (5) the ID of the device that serves as a sink for information during operation of the link 1922; (6) an indication of the type of link 1924 that, in turn, specifies the operations that may occur over the link; and (7) an indication of the state of the link 1926, described below. Although, in this discussion, links are generally considered unidirectional, the may also be bidirectional. In image-transfer applications, for example, information may be returned by a PC to a cell-phone to alter the rate, timing, and type of images subsequently sent to the PC by the cell phone over a link.

Figure 20:
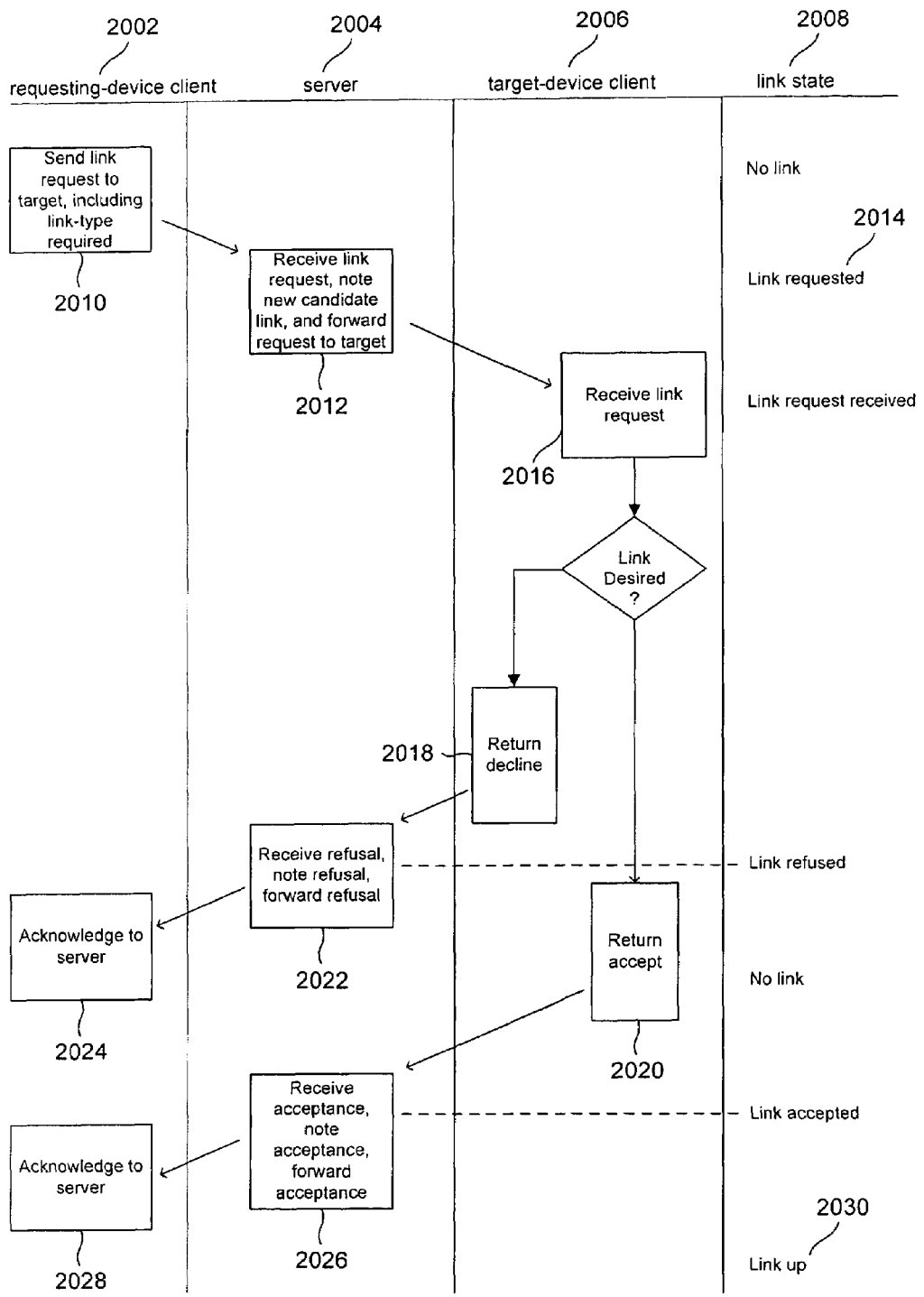
FIG. 20 illustrates establishment of a link according to method and system embodiments of the present invention.

FIG. 20 illustrates establishment of a link according to method and system embodiments of the present invention. In FIG. 20, actions for the link-requesting device are shown in a first column 2002, actions associated with a link carried out by the server shown in a second column 2004, actions associated with the target of the link request are shown in a third column 2006, and the current state of the link is shown in column 2008. In a first step, the requesting device sends a link request to the server indicating the target device for the link request as well as the type of link requested 2010. Upon receiving the link request, the server enters a new entry into the link table and forwards the link request to the target device 2012. At this point, the state of the link is "link requested" 2014. When the target device receives the link request 2016, the target device may either return a message to the server indicating that the target device declines their request 2018 or may return a message to the server indicating that the target device accepts the link request 2020. When the target device declines the link request, the server receives the refusal and updates the link table entry for the link request to indicate that the link has been refused 2022, then forwarding the refusal to the requesting device. The requesting device 2024 receives that refusal, and acknowledges receipt of the link refusal, at which point the state of the link becomes "no link." At an appropriate point in time, the entry for the link in the link table is deleted. On the other hand, when the target device accepts the link, the server receives the acceptance, updates the link table entry for the link, and forwards the acceptance to the requesting device 2026. At this point, the state of the link is "link accepted." The requesting device receives the acceptance and acknowledges the acceptance to the server 2028, upon which the server updates the link status to "link up" 2030. Thus, each link between devices must be requested by a device, and the link request must be accepted by the target device before the link is established. Messages and data are sent over the link in a two-part process. The source device sends messages and data to the server by whatever communications medium interconnects the source device to the server, and the server forwards the messages and data to the sink device by whatever communications medium and method is used to transfer messages and data between the server and the sink device. The link is therefore a virtual communications link implemented using several underlying, dissimilar communications media and methods and message and data routing by the server.

Figure 21:
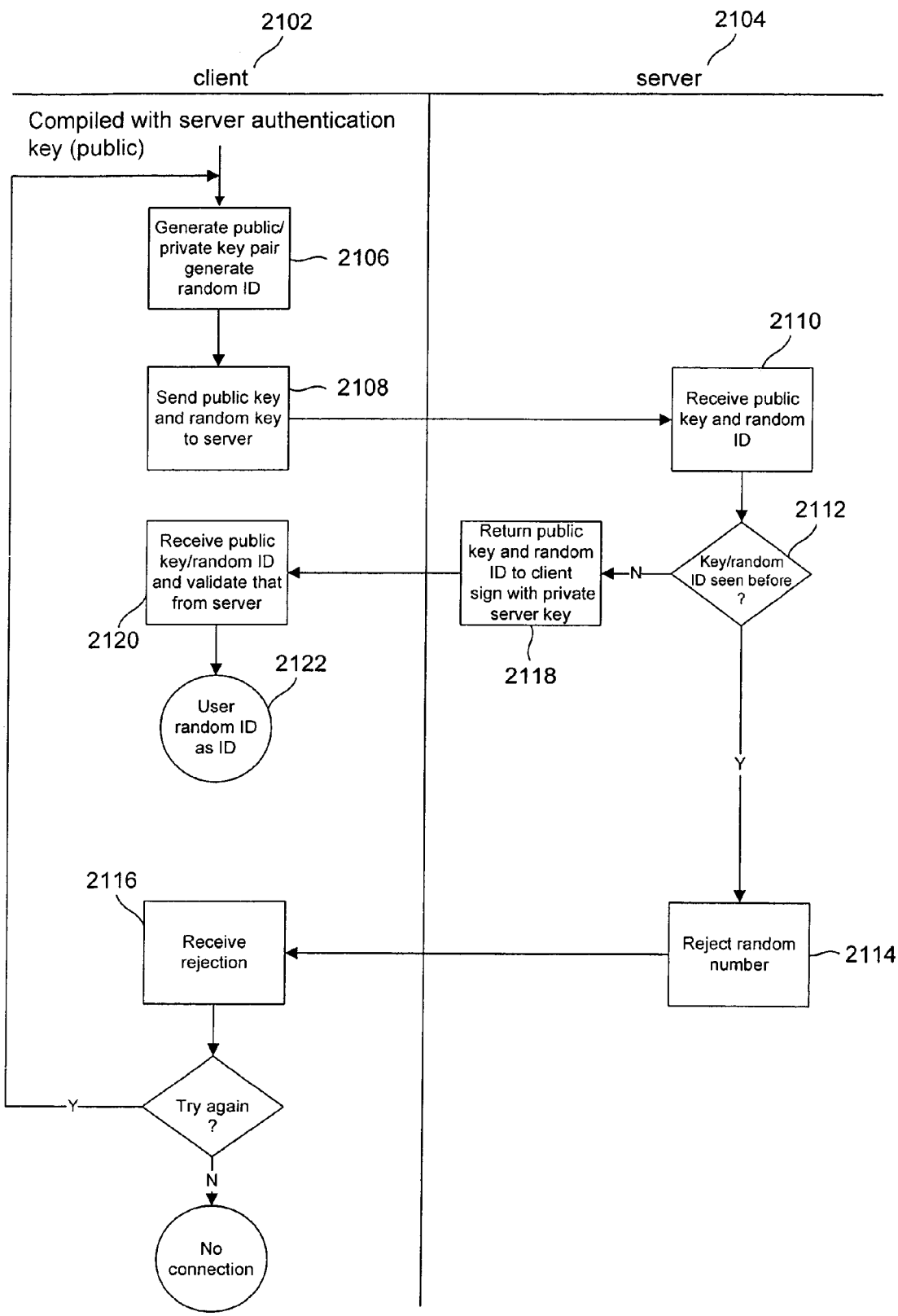
FIG. 21 illustrates establishment of a secure link between a client running on a device and a server according to one embodiment of the present invention.

The secure connections between devices and the server are implemented by clients deployed to the device. FIG. 21 illustrates establishment of a secure link between a client running on a device and a server according to one embodiment of the present invention. In FIG. 21, client actions are shown in a first column 2102 and service actions are shown in a second column 2104. In one embodiment, the client is compiled with a server authentication key, or, in other words, a public encryption key. In a first step, the client generates a public/private encryption-key pair as well as a random ID 2106. In step 2108, the client sends the public key of the encryption-key pair and the random ID to the server, encrypted using the server public key included in the client. In step 2110, the server receives the encrypted public key and random ID and decrypts the public key and random ID. If the server has seen the public key/random ID pair in the past, as determined in step 2112, then the server rejects the random ID generated by the client by sending a rejection message in step 2114. When the client receives the rejection message in 2116, the client can either retry secure-connection establishment or can consider establishment of the secure connection to the server to have failed. When the public key/random ID pair has not been previously observed by the server, as determined in step 2112, the server returns the public key and random ID pair to the client, in step 2118, signing the message with the server's private server key. In step 2120, the client receives the public key/random ID pair from the server and verifies that the server digitally signed the message using the server authentication key that was compiled with the client. The client can then use the random ID as the ID for the client in future communications, in step 2122. In further communications with the server, the client can encrypt messages and data using the client's private key, and the server can decrypt the communications and data using the public key transferred from the client to the server. Thus, communications over a secure connection between the device and the server cannot be intercepted or used by other devices, including even other devices to which the device is linked by a virtual link discussed above with reference to FIGS. 18 and 19.

Establishment of a Multi-Tasking Environment on an Electronic, Hand-Held Device

As discussed above, many electronic hand-held devices, including many cell phones, lack the hardware and software to provide a robust, multi-tasking environment for execution of service applications. In general, service applications need to continuously or intermittently execute on an electronic device, in order to field and respond to a variety of events associated with service provision, just as an operating system needs to continually execute on a personal computer in order to respond to user commands, incoming communications, and various interrupts and device-related events. On a single-processor system, continuous execution is simulated by running concurrently executing processes for small periods of time, or time slices, and interleaving the time slices of different processes to provide the illusion that all executing processes are executing simultaneously. In other words, process execution is time-multiplexed on the processor. Method and system embodiments of the present invention establish a robust, multi-tasking computing environment on electronic hand-held devices prior to deployment of, or as part of the process of deploying, service applications to the electronic, hand-held devices. When the devices are sufficiently sophisticated to offer a robust, multi-tasking environment, method and system embodiments of the present invention avail themselves of that functionality. However, in the more common case that a robust, multi-tasking environment is not provided by the electronic, hand-held device, method and system embodiments of the present invention use whatever tools that are available within the electronic, hand-held device, the network interconnecting the electronic, hand-held device with a server, and the server to establish a computational environment in which service applications can be deployed to, and execute on, the electronic, hand-held device.

Figure 22:
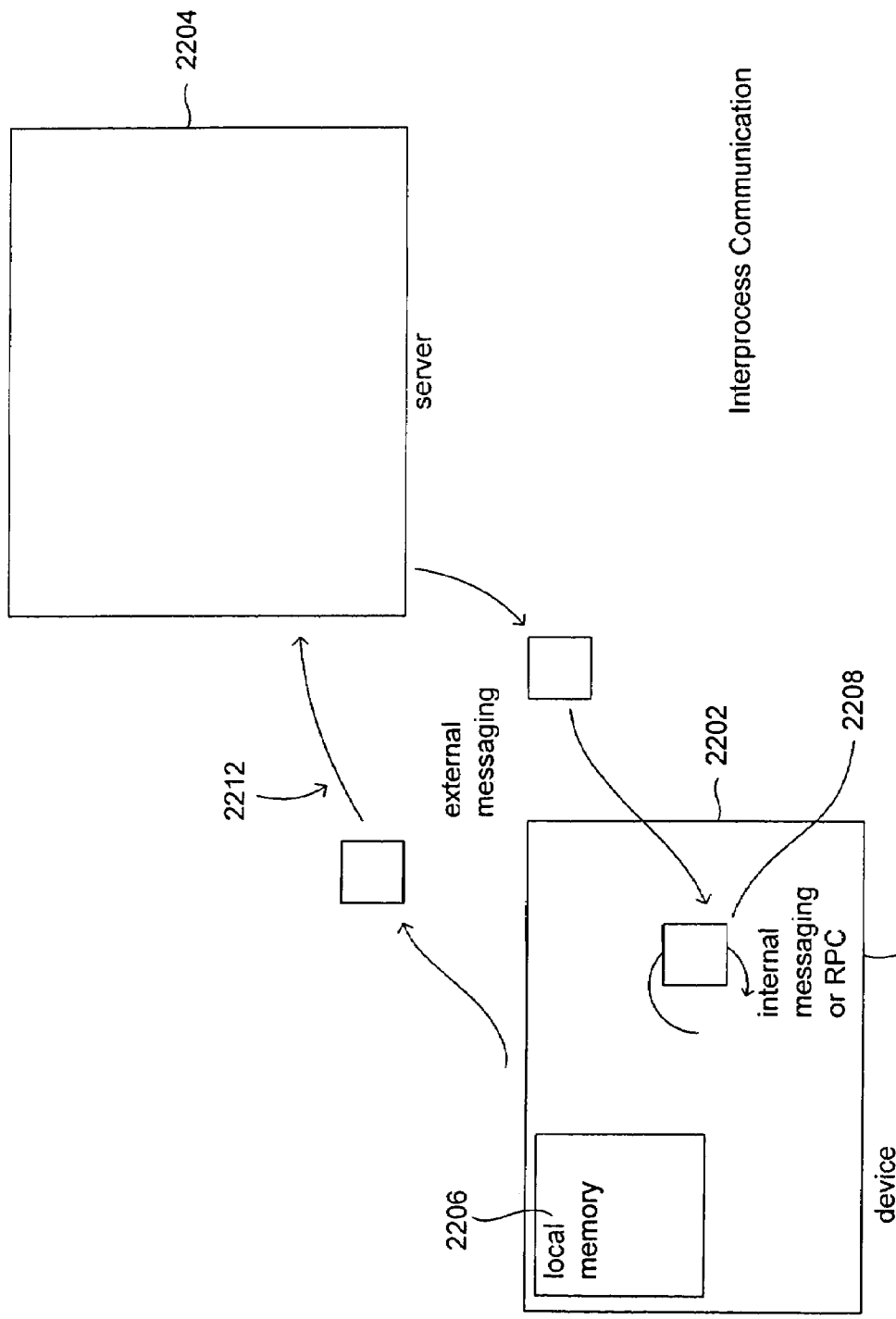
FIG. 22 illustrates a number of the possible methods by which interprocess communication can be implemented in an electronic, hand-held device in communication with a server when the electronic, hand-held device does not offer native interprocess communications, according to method and system embodiments of the present invention.

Applications running in multi-tasking environments commonly need a mechanism for interprocess communication. In computer systems, interprocess communication is commonly implemented using shared memory and/or interprocess messaging facilities. FIG. 22 illustrates a number of the possible methods by which interprocess communication can be implemented in an electronic, hand-held device in communication with a server when the electronic, hand-held device does not offer native interprocess communications, according to method and system embodiments of the present invention. In FIG. 22, the electronic, hand-held device is shown as a first block 2202 and the server is shown as a second block 2204. One way to achieve interprocess communication is to use local memory 2206 within the device for storing messages and data forwarded by one process to another. For example, queues or mailboxes may be implemented within the local memory to allow messages and data to be stored for subsequent delivery to other processes. Alternatively, in certain devices, facilities may be provided for general transmission and reception of messages. Those facilities may be used for transmitting messages internally, between processes, when different processes can be identified and addressed. For example, in certain systems, processes may register to receive messages and notification of incoming-message events. Alternatively, certain devices provide for remote procedure calls ("RPCs"), which can be used to transfer data and messages between processes. When no such facilities are provided by the device, external messaging through the communications medium connecting the device to the server may be employed for sending messages between processes running on the device. For example, a process may run on the server for receiving messages from the device and forwarding the received messages back to target processes on the device. Although relatively inefficient, this latter technique is nonetheless commonly available for most cell phones and other communications devices.

Figure 23:
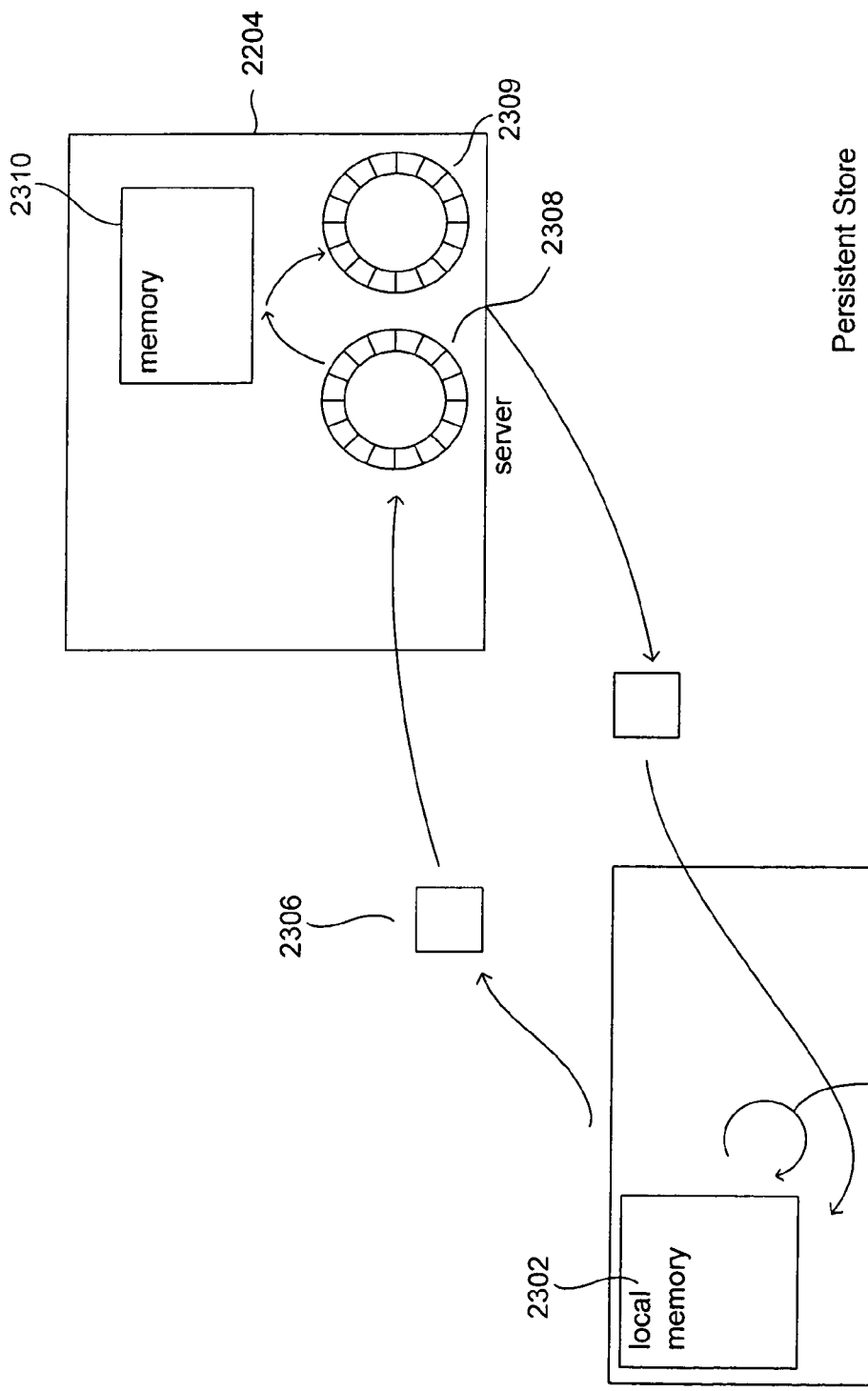
FIG. 23 displays various methods for implementing persistent data storage on an electronic, hand-held device, when persistent data storage facilities are not explicitly provided by the device according to method and system embodiments of the present invention.

Processes running in multi-tasking environments generally need to be able to persistently store data, so that the process can continue to work on a task over a number of time slices and periods of quiescence. FIG. 23 displays various methods for implementing persistent data storage on an electronic, hand-held device, when persistent data storage facilities are not explicitly provided by the device according to method and system embodiments of the present invention. First, local memory 2302 within the device can be partitioned among processes by memory allocation or by convention. Alternatively, internal messaging facilities 2304 may be used by a process to send messages to itself that include data, for subsequent access, that the process may need to access during subsequent time slices. In other words, a process may include the data needed to be persistently stored in the message and send the message to itself. The internal messaging service receives the message and queues the message for delivery to the process. The process may enter a quiescent state due, for example, to the process relinquishing control of processing facilities to another process upon expiration of the process's time slice. Later, when the process reawakens, the process may access the queued message to recover the data. When internal messaging facilities are not provided on the device, a process may use external messaging 2306 to store data within the server 2204. The data may be stored within messaging queues 2308-2309, or may be stored in memory areas 2310 apart from messaging queues.

Figure 24:
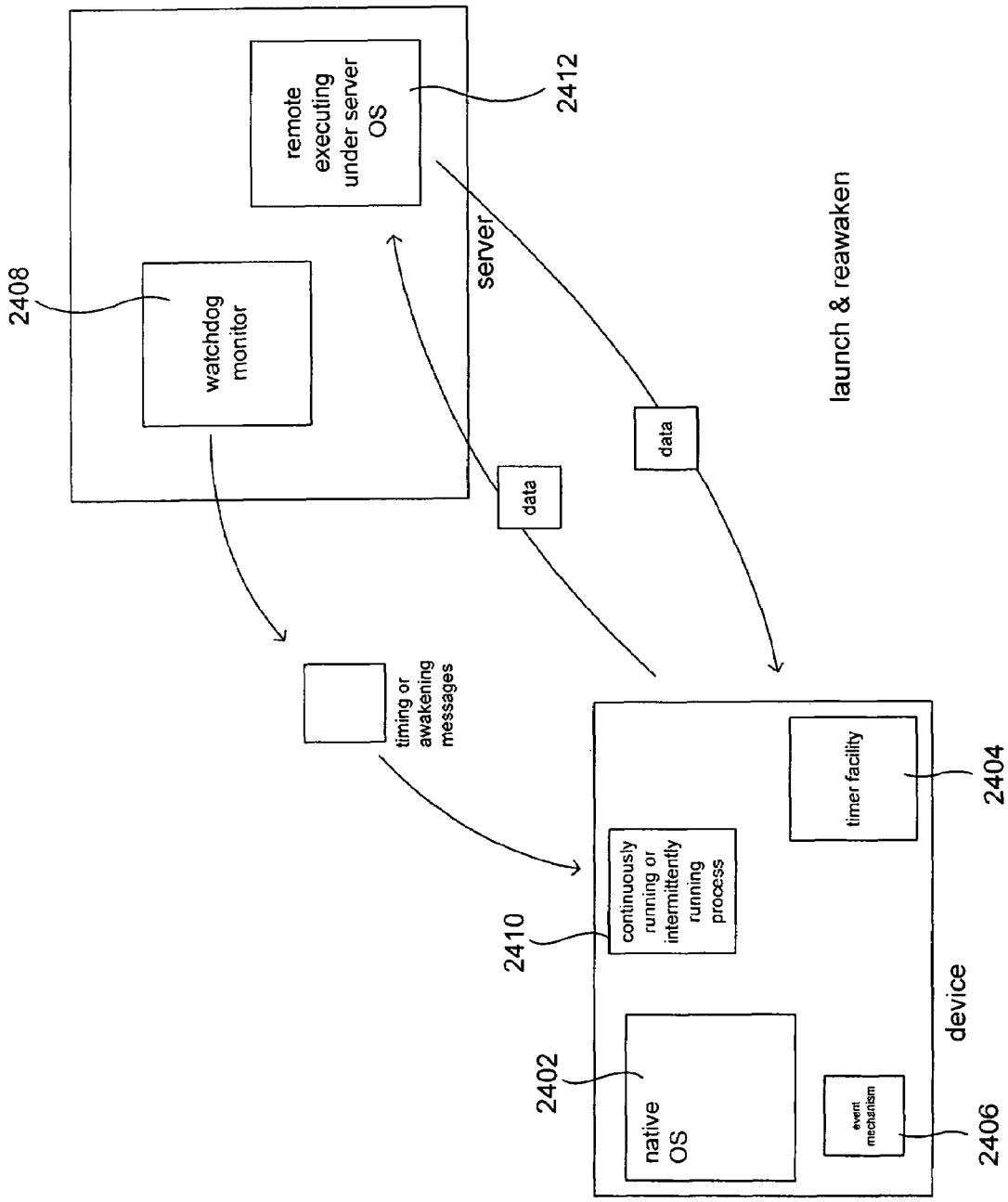
FIG. 24 illustrates a number of mechanisms that can be used for launching and reawakening processes within an electronic, hand-held device according to method and system embodiments of the present invention.

Processes running within multi-tasking systems in a single-processor environment need to be able to quiesce, or relinquish the processor, and then be automatically reawakened at a later time to continue processing tasks. FIG. 24 illustrates a number of mechanisms that can be used for launching and reawakening processes within an electronic, hand-held device according to method and system embodiments of the present invention. First, the device may include a native operating system or control program 2402 that provides a multi-tasking environment, including the ability to quiesce and reawaken processes in order to provide concurrent processing for a number of processes within the device. When the device does not include such a native operating system or control program, the device may include a timer facility 2404 that allows a process to set a timer that, upon expiration, generates an event that awakens or reawakens the process. Processes can cooperate to implement a multi-tasking environment by setting timers at the beginning of a current execution to a reasonable time-slice value. When the timer expires, the process is notified, and relinquishes control of the processor to another process. Alternatively, the process can set a timer to a more distant, future time corresponding to the beginning of a reasonable next time slice for the process, so that other processes may execute in the interim until the process is reawakened by expiration of the timer. Thus, timers can be used in many different ways to implement a multi-tasking environment among cooperating processes. Similarly, a device may provide for event mechanisms 2406 that allow processes to be awakened or reawakened on occurrence of different types of events. Thus, a process may register to be awakened by an event elicited by reception by the device of a particular type of message from the server, and the server can implement multi-tasking by continuously reawakening processes at reasonable intervals. This can be implemented in a watchdog or monitor program 2408 running within the server. Another technique may be to modify an existing application native to the device 2410 to launch processes at particular times using an event mechanism or timer facility, or a special scheduling client or application may be installed on the device in order to launch and quiesce processes in order to implement a multi-tasking environment. When no other alternative is available, processes may execute on the server 2412 in the server's multi-tasking environment and exchange data with a device through the communications medium connecting the device of the server in order to simulate a multitasking environment on the device.

Figure 25:
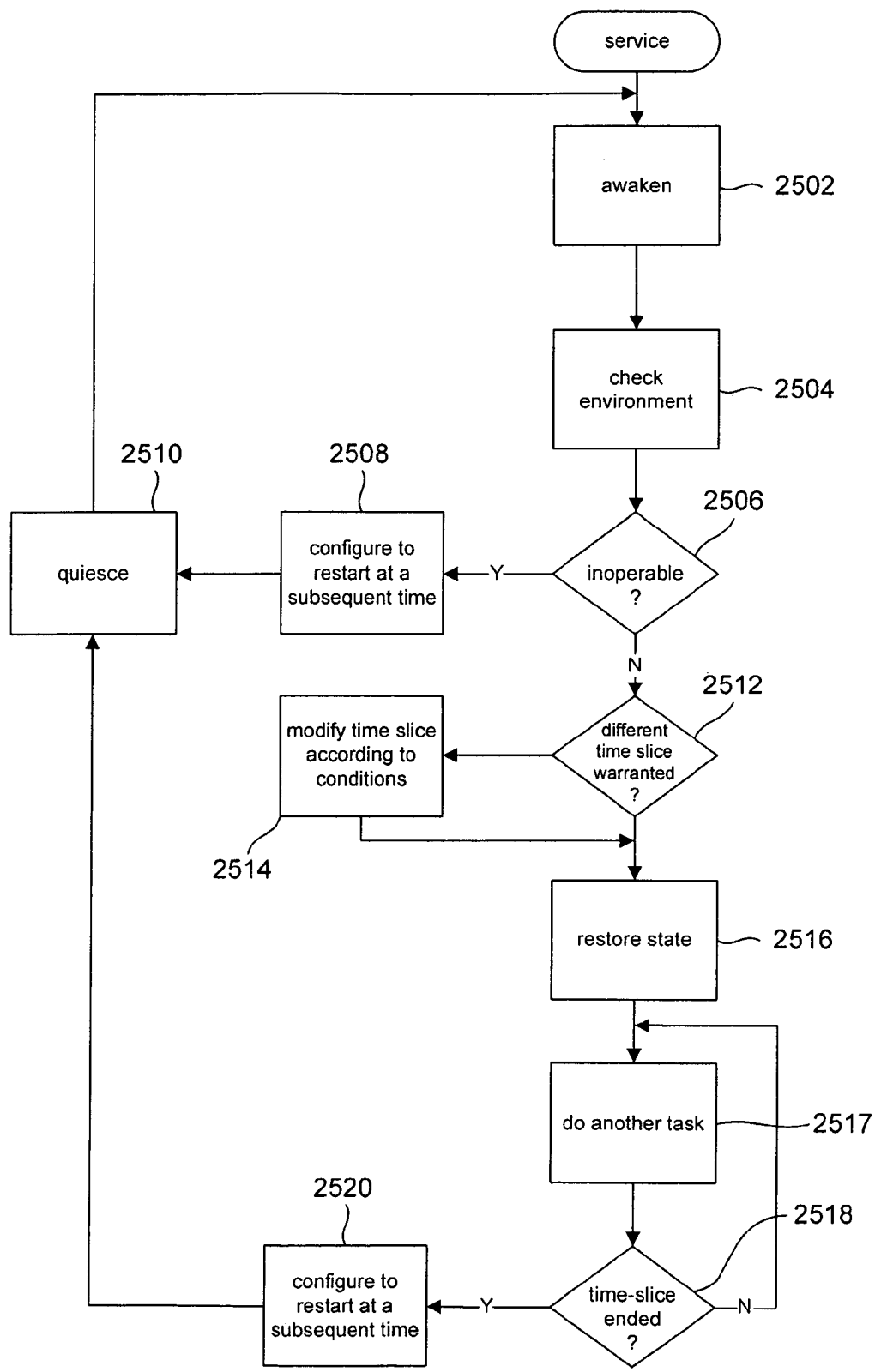
FIG. 25 is a control-flow diagram illustrating process behavior on an electronic, hand-held device for processes that cooperate to implement a robust, multi-tasking environment according to method and system embodiments of the present invention.

FIG. 25 is a control-flow diagram illustrating process behavior on an electronic, hand-held device for processes that cooperate to implement a robust, multi-tasking environment according to method and system embodiments of the present invention. FIG. 25 illustrates process activities during a single time slice of process operation. In step 2502, the process awakens by any of the methods described above with reference to FIG. 24. In step 2504, the process employs any of a variety of techniques to monitor the physical environment of the hand-held device to determine whether or not the process should continue operating, or operate at a reduced level of resource usage. In certain systems, the process may use device-supplied functions for determining, for example, the power level of the device, communications state of the device, and other such device states and operational characteristics. Alternatively, a process may indirectly detect power states and communication states by monitoring the rate at which tasks are executed, noting various features currently available to processes running on the device, and other such characteristics of the device. If, as determined in step 2506, the current state of the device is not conducive for process execution, the process may configure the device, server, or device and server for reawakening the process at a later time, in step 2508, and then quiesce, or relinquish control of the processor within the device, in step 2510. Otherwise, if the state of the device is such that the process needs to use fewer computational resources, or if the state of the device is such that the process may safely use additional computational resources, as determined in step 2512, then the process may modify the length of the current time slice according to the detected device state in step 2514. Next, in step 2516, the process recovers persistent data needed by the process to continue execution by any of the methods discussed above with reference to FIG. 23. The process can then undertake execution of tasks in the loop of steps 2517-2518 until either a timer expires or the process detects, by other means, that its current time slice has ended. When the time slice has ended, the process configures the device, the device and the server, or the server to restart the process at a subsequent time, in step 2520, by any of the methods discussed above with reference to FIG. 24, and then quiesces, in step 2510. Thus, by executing for a reasonable amount of time, and then relinquishing the processor, processes running within an electronic, hand-held device can cooperate to achieve a multi-tasking environment in which processes can continue to execute for long periods of time by interleaving their execution with other processes. Moreover, processes can detect certain device states or characteristics that require processes to relinquish the processor prior to the default time-out period, such as low power conditions, or, in the case of cell phones, incoming or outgoing voice communications.

Figure 26:
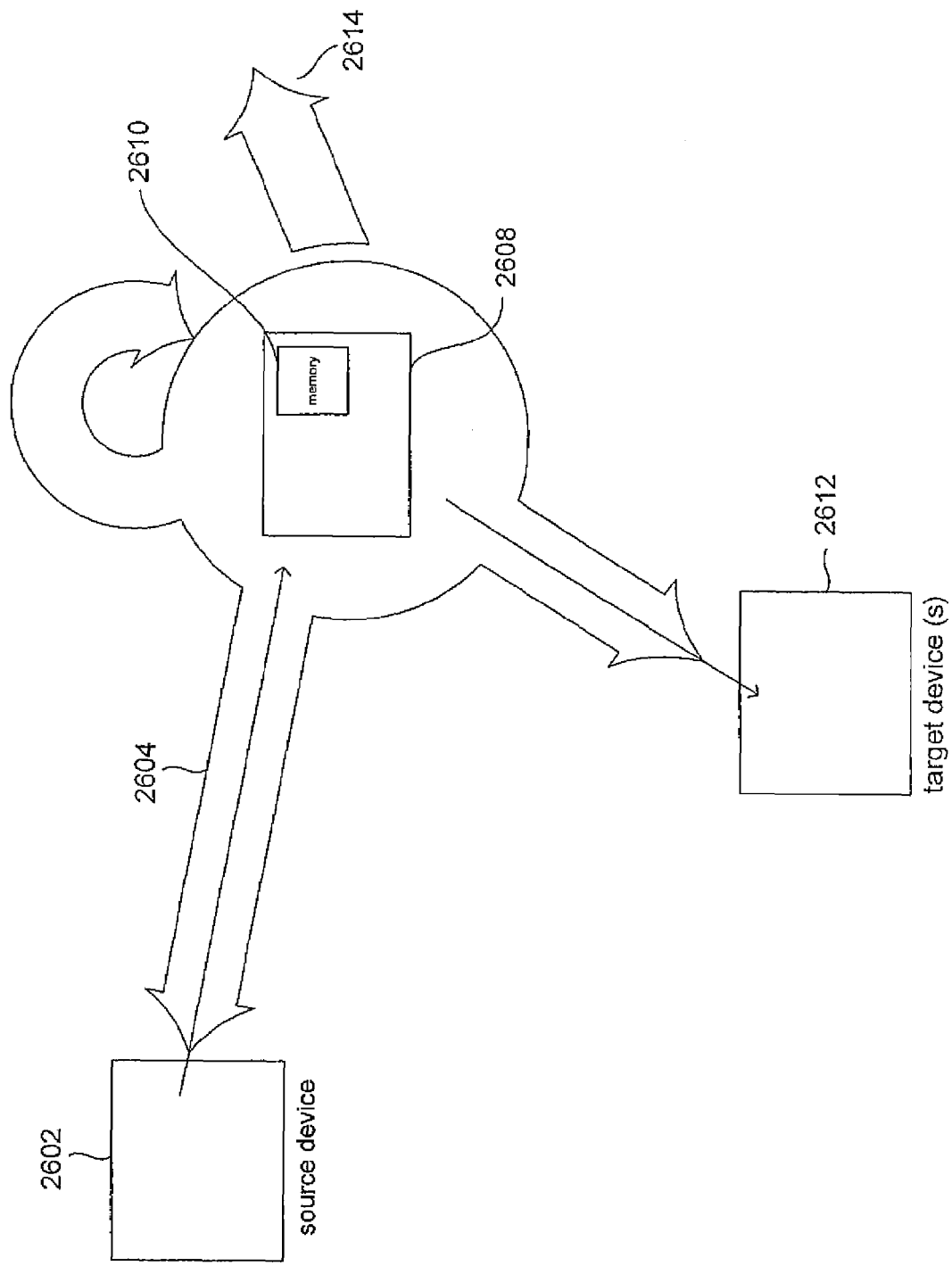
FIG. 26 illustrates a digital-image-transfer service application that represents one embodiment of the present invention.
Figure 27:
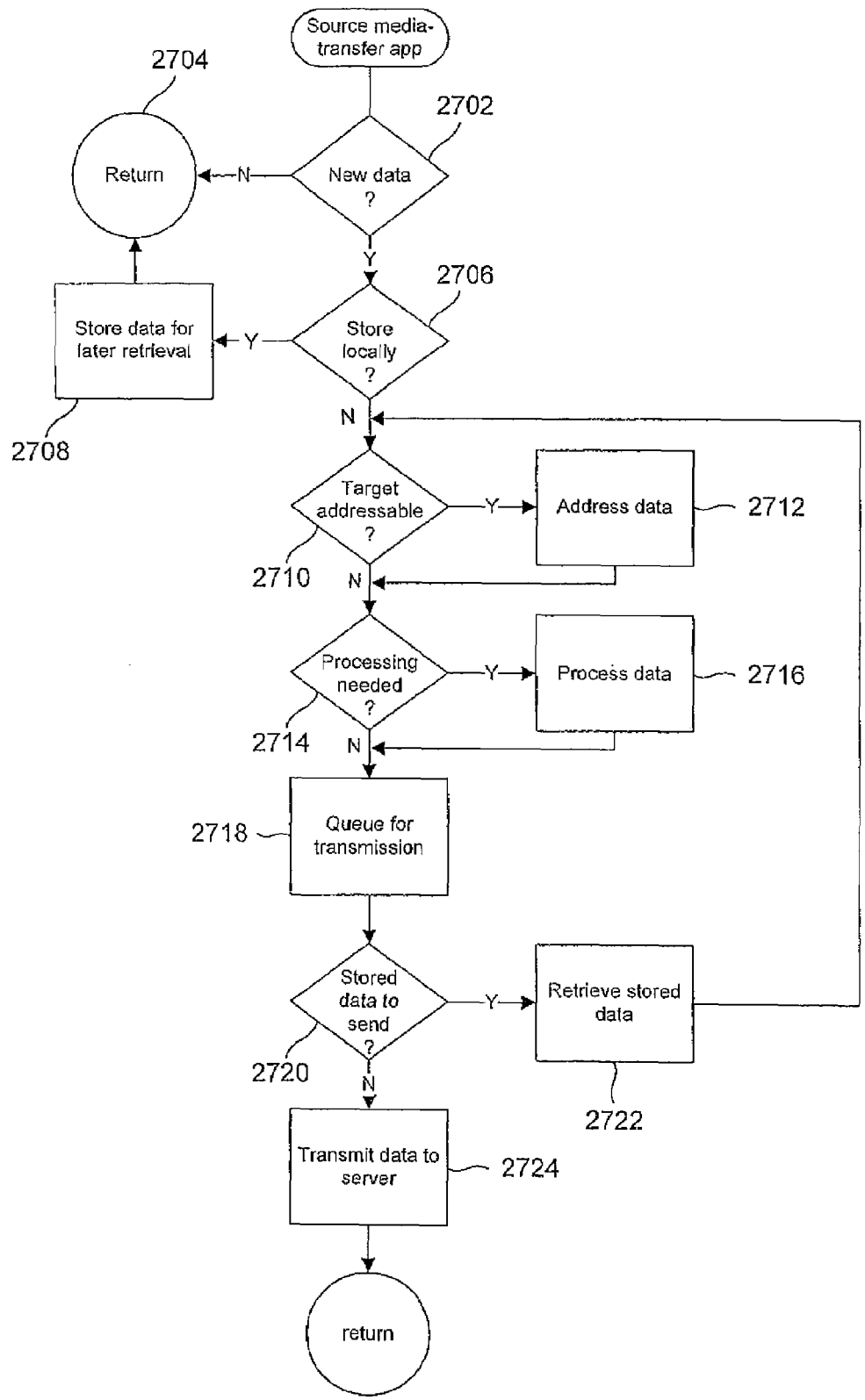
FIG. 27 is a control-flow diagram illustrating operation of the source-device portion of the digital-image-transfer service application that represents one embodiment of the present invention.

A Digital-Image Service Application that Represents One Embodiment of the Present Invention One exemplary service application that can be deployed and executed using the above-described component methods and systems of the present invention is next described. The exemplary service application allows for digital images captured by cell phone to be easily, securely, and seamlessly transferred from the cell phone to the cell phone user's personal computer, other personal computers, or third party systems. FIG. 26 illustrates a digital-image-transfer service application that represents one embodiment of the present invention. As shown in FIG. 26, digital images captured and stored on a source device 2602 are transferred via the virtual communications medium or network 2604 provided by method and system embodiments of the present invention to a server 2608, where the digital images may be stored in server memory 2610 and/or forwarded to any of various target devices 2612 or to other, remote entities 2614. The digital-image-transfer service application can be considered to be distributed across the source device 2602, the server 2608, and the target device 2612. FIG. 27 is a control-flow diagram illustrating operation of the source-device portion of the digital-image-transfer service application. The service application runs continuously or intermittently on the source device using the multi-tasking environment discussed above in the previous subsection. In step 2702, the service application determines whether any new data, such as a digital image, is available for transfer. If not, the application can return, or quiesce in step 2704. Otherwise, in step 2706, the application determines whether the newly available data should be stored locally or transferred to the server. If the data should be stored locally, then the application stores the data for later retrieval, in step 2708, and quiesces. Otherwise, in step 2710, the application determines whether or not the data can and should be specifically addressed to one or more target devices. If so, then in step 2712, the application includes target addresses by, for example, listing the target addresses in a message header. Next, in step 2714, the application determines whether any additional processing may be needed and, if so, processes the data in step 2716. For example, in the case of digital images, the application may crop the image, decrease the resolution of the image, quantize the image, decrease the number of colors used in the image, or compress the image. Then, in step 2718, the application queues the image for transmission to the server. In step 2720, the application determines whether any previously stored data should also be sent to the server and, if so, retrieves the stored data in step 2722 and returns to step 2710 to send the retrieved data. Finally, in step 2724, the service application undertakes transmission of data to the server.

Figure 28:
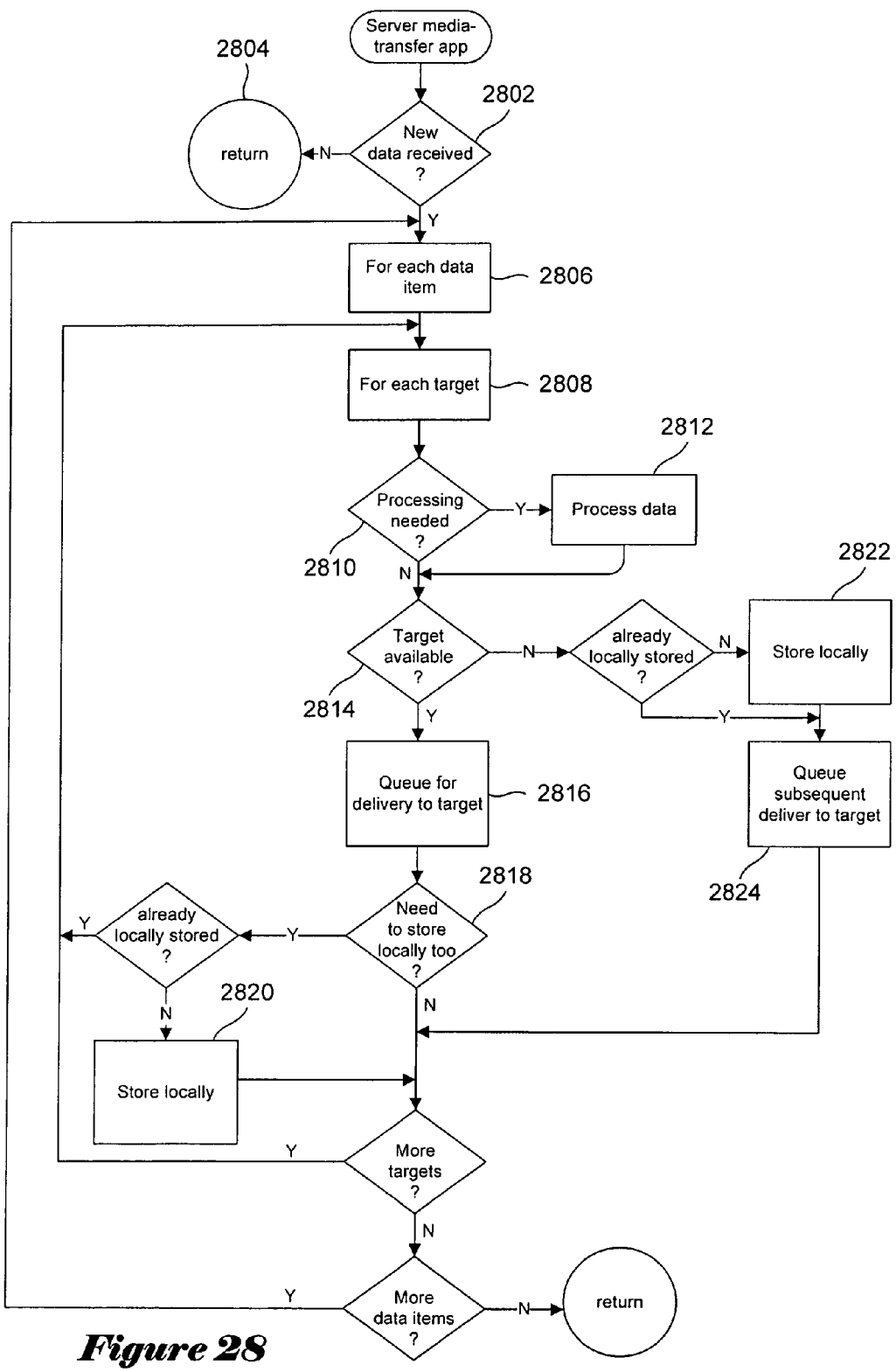
FIGS. 28 and 29 illustrate the server portion of the digital-image transfer service that represents one embodiment of the present invention.
Figure 29:
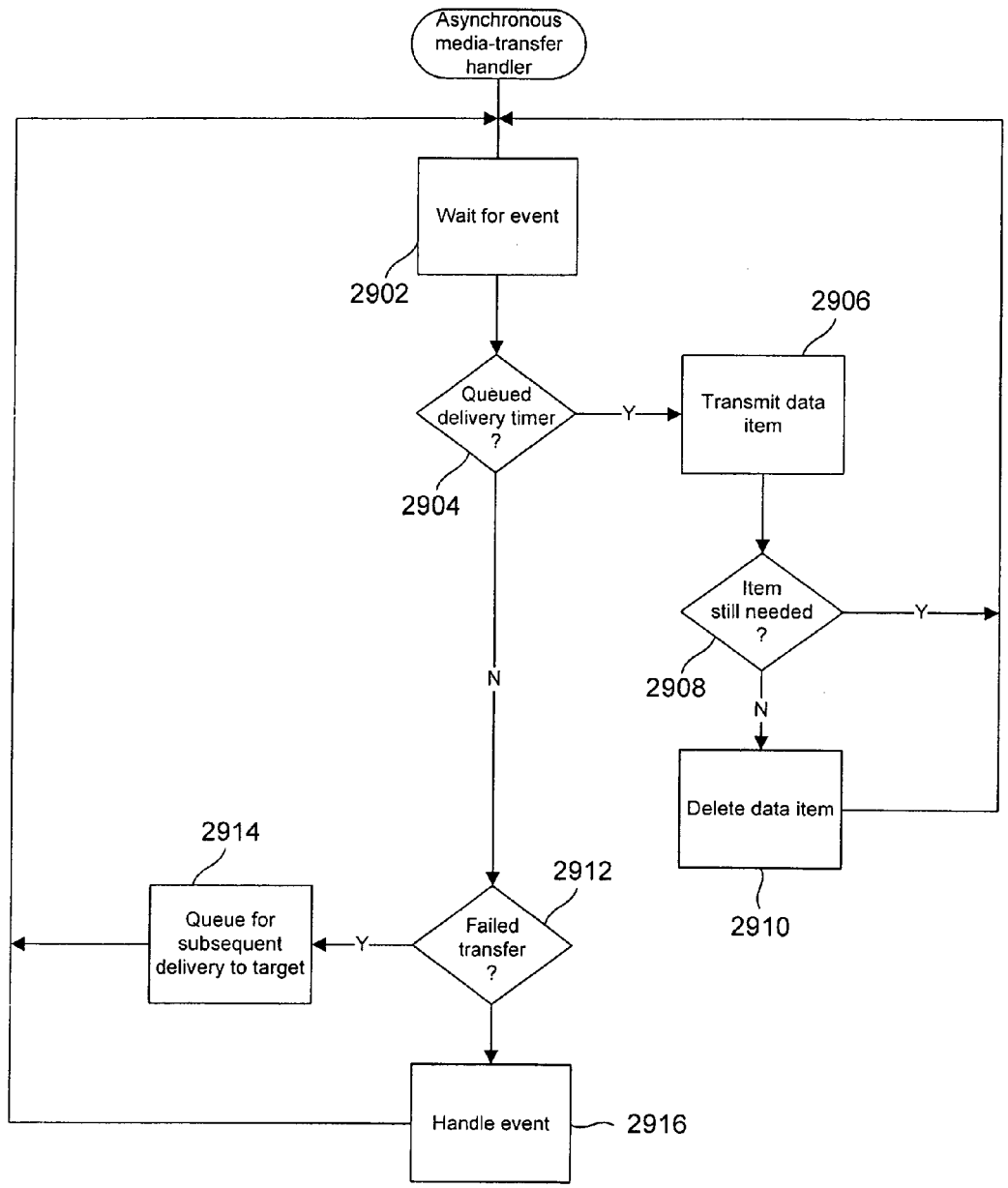

FIGS. 28 and 29 illustrate the server portion of the digital-image transfer service that represents one embodiment of the present invention. In step 2802, the application determines whether any new data has been received from source devices. If not, the application can quiesce, in step 2804. Otherwise in nested for-loops that begin with steps 2806 and 2808, the server-side application processes each received data item with respect to each target device listed for the data item. In step 2810, the application determines whether any processing is needed for the data item and, if so, processes the data item in step 2812. As discussed above, this processing may involve cropping, pressing, or otherwise changing and manipulating the digital image for efficient transfer or for compatibility with target-device capabilities. If the target device is currently available, as determined in step 2814, then the data or digital-image is queued for delivery to the target in step 2816. If the digital image needs to also be locally stored within the server for a period of time, as determined in step 2818, then if the digital image is not already locally stored, the application stores the digital image in step 2820. If the target is not available, as determined in step 2814, the digital image is locally stored in step 2822, if it is not already locally stored, and a task is queued to a local queue within the server, in step 2824, to direct subsequent delivery of the data to the target at a later time. Queuing of the data may involve setting a timer.

FIG. 29 illustrates a handler associated with the server-side digital-image transfer application. The handler waits, in step 2902, for a next event to occur. If the next event is expiration of a queued delivery timer, as determined in step 2904, then the handler identifies the data associated with the timer and transmits the data to the target device, in step 2906, when possible. If the item is no longer needed, as determined in step 2908, then the handler deletes the data item, such as a digital image, from local storage in step 2910. Otherwise, if a failed transfer has been detected, in step 2912, such as by a message sent from a target device to the server indicating failed transfer, then, in step 2914, the handler can queue the data item for subsequent transfer to the target. A default handler 2916 handles additional types of events.

Figure 30:
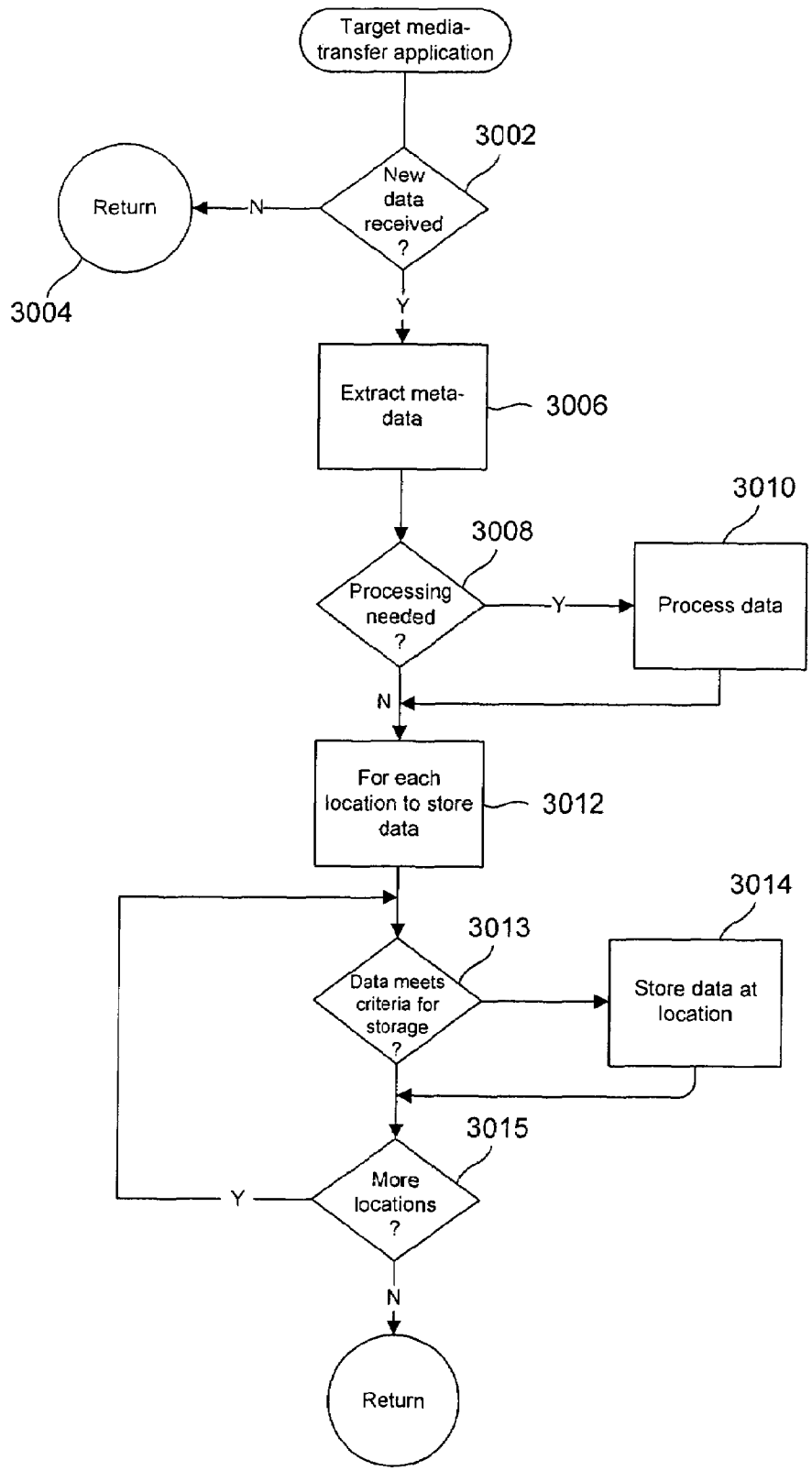
FIG. 30 is a control-flow diagram illustrating the target-device portion of the digital-image transfer service application that represents one embodiment of the present invention.

FIG. 30 is a control-flow diagram illustrating the target-device portion of the digital-image transfer service application that represents one embodiment of the present invention. In step 3002, the application determines whether new data, such as a digital image, has been received. If not, then the process can return or quiesce, in step 3004. Otherwise, the application extracts metadata from the received data-bearing message or messages, in step 3006. If processing of the received data is needed, as determined in step 3008, the data is processed in step 3010. Otherwise, in the for-loop comprising steps 3012-3015, the application stores the data at target locations within the target device, when the data meets any of various criteria for storage. Thus, for example, the target may elect to store only certain images, rather than all images received from the source device depending on the frequency of reception of images, time of day, or other such criteria.

Although the present invention has been described in terms of particular embodiments, it is not intended that the invention be limited to these embodiments. Modifications within the spirit of the invention will be apparent to those skilled in the art. For example, any of a huge number of different types of service applications can be implemented according to the method and system embodiments of the present invention. Service applications may be used for transferring data, collecting data, launching display-generating applications, conducting periodic tasks of a wide variety of natures, and many other such types of tasks and activities. Such applications may be implemented using any of a wide variety of different programming languages, control structures, modular organizations, data structures, variables, and other such programming characteristics. The component method and system embodiments of the present invention can be tailored to any particular device and server embodiment, including a wide variety of different types of communications media, protocols, and systems by which devices interact with each other and communicate with the server. Implementation of the virtual communications medium or network can be tailored to any of a large number of different types of devices, servers, and device/server interconnection environments. In certain systems, user interfaces may be presented by deployed service applications to allow users to control, acknowledge, and grant permission for operation of the service applications. Service applications may additionally be controlled by out-of-band messages exchanged between devices, such as between cell phones through the phone network. Although multitasking environments are favored for service-application execution, service applications may, when it is not possible to create multitasking environments on particular device, nevertheless be executed, at worst by repeatedly retransmitting the service application to device, as needed.

Upon installation on the phone, the image-transfer phone software is generally configured with the address of the fileserver, plus any additional configuration parameters necessary for the image-transfer phone software to operate. The image-transfer software may come with a set of options predefined, including the location of the fileserver as well as an FTP account and password for that user.

The image-transfer phone software may be automatically started when the user powers on the phone. After turning on the phone, the user can generate an image, for example by taking a picture with the camera-equipped phone. When the picture is taken, it is usually written to the file system located on the phone's internal persistent memory (internal or on a memory card). The image-transfer phone software running on the camera becomes aware of the new image, for example by regularly polling the file system on the camera-equipped phone looking for new images. When a new image is detected, the Photosync Phone Client software opens its connection to the fileserver over one of the network access systems available on the phone.

After opening the connection, for example via FTP, the image-transfer phone software transfers the image onto the fileserver. The file may be stored in a directory named by the camera-equipped phone's phone number (by storing the images in a unique directory, there are no collisions between the files uploaded by one camera-equipped phone and the files uploaded by another camera-equipped phone). When the transfer is complete, the file may be deleted from the camera-equipped phone, leaving room for more images, Images uploaded onto the server may be persisted until deleted by the PC client software.

On both the server and the client, unique filenames can prevent collisions or race conditions resulting in data loss. To provide this, the image-transfer phone software can upload the image file with a new name. The file name of the new file created on the fileserver can be created by concatenating the following text strings:

The original image file name as recorded on the phone

The precise date and time of the photo's creation,

An additional index (like a "(2)" or "_2") to account for existing duplicate files The string ".transfer"

The final suffix string ".transfer" may be used to indicate to any other clients on the fileserver that the file is still being uploaded by the client. When the file is completely uploaded, the file may be renamed on the file server by the image-transfer phone software to remove the ".transfer" suffix.

The personal-computer image-transfer software is then able to download the files. The personal-computer image-transfer software may be started when the PC is powered on, or when the user is logged into the PC. To download the files, the personal-computer image-transfer software connects to the fileserver, for example via FTP. The personal-computer image-transfer software need not be running simultaneously with the arrival of the photos on the server, but it can be. The personal-computer image-transfer software typically polls the fileserver (FIG. 1, "B") periodically, checking for new images in its configured directory, named by the camera-equipped phone's phone number.

When the FTP file upload from the image-transfer phone software is complete, and the file renamed to remove the ".transfer" suffix, the personal-computer image-transfer software can assert the file has completed transfer to the file server and can begin download of the file to the PC. The personal-computer image-transfer software may download the file using standard binary FTP protocol (FIG. 1, "C"), and then place it in a known spot on the user's hard drive, for example the user's My Pictures folder. It may then delete it from the fileserver.

The above describes only one possible implementation. Many alternative implementations are possible:

Data files other than images can be transferred by this system. In any case in this document in which images are described, data other than photos may be substituted. Examples include videos, text notes, or address book records. Note that in this document "photos", "images", etc. may be described, but any type of file may be used.

Image transfer may be in made in either direction. The PC can upload photos to 30 the fileserver, and the image-transfer phone software can download them.

Consequently, any time a image-transfer phone software and personal-computer image-transfer software are specified in this document, the scenario may be reversed. Additionally, transfers may be made from personal-computer image-transfer software to personal-computer image-transfer software or image-transfer phone software to image-transfer phone software. Consequently, the personal-computer image-transfer software and image-transfer phone software are interchangeable.

There are different ways the linkage between the image-transfer phone software and personal-computer image-transfer software can be configured or declared by the user. For example, the pairing between the image-transfer phone software and the personal-computer image-transfer software could be contingent on the user entering a passcode into both the phone and the client, thereby proving that they have physical access to both.

The linkage between the image-transfer phone software and personal-computer image-transfer software may be automatically configured without specific action from the user. Instead of forcing the user to indicate the pairing between the image-transfer phone software and personal-computer image-transfer software, the user may download software for the phone and client that have been paired before delivery. For example, the user might enter their phone number on a website. The website would then add the user's phone number to the phone software installer and then send it directly to the phone, ready for use. Likewise, it would add the user's phone number to the client software installer and then initiate a download of it.

The file to be transferred may be generated from different programs or hardware. The standard camera-equipped phone software may be used to generate an image, or the image-transfer phone software might cause the onboard camera to take a picture to generate an image, or a third party program may generate an image from code or from the camera or another hardware device. Files may come from any conceivable source, including user input, additional hardware, or transfers from other devices.

The file might not be written to persistent storage on the phone. For example, pictures may be transferred directly from the camera chip to the server, and never written to local phone storage.

Polling may be replaced with notification. Instead of requiring the image-transfer phone software to poll the phone's file system to detect a new image, for example, an event, interrupt, or message may be generated by the software that creates the file (e.g. the onboard camera application). This would trigger the file transfer to begin.

The image-transfer phone software or personal-computer image-transfer software may be turned on or off by a variety of means. It could be controlled by the phone's ringing profile, explicit request by the user, or any other method that is used to control software startup/ending.

The image-transfer phone software, personal-computer image-transfer software, and fileserver may delete files according to any policy. For example, the image-transfer phone software may delete pictures as soon as they are taken, or leave them on the phone. The personal-computer image-transfer software may delete files smaller/larger than a certain size. The server may delete photos after the personal-computer image-transfer software has downloaded them, or it may wait for a deletion instruction from the personal-computer image-transfer software, or it may leave them in place for 30 days so a user could view them with a web browser in the interim.

The image-transfer phone software may store files on different storage media. For example, the camera-equipped phone may be physically attached to a third party storage device, or may be mapping a remote network storage device as local phone storage. In either event, the files could still be uploaded to the fileserver. Alternately, the device might act as the fileserver.

The image-transfer phone software might be connected to the fileserver through alternate means. For example, the phone might be connected by USB cable or by an 802.11 network connection, instead of by the phone data network.

The fileserver might not write the files to disk. For example, the files may be kept in memory in part, transfer parts of the file to the client as is possible, or may be kept in memory wholly, with the system functioning identically as before.

The usage of a unique directory may be made transparent to the software. This may be accomplished by configuring the FTP user login to use a specific directory as its root.

Multiple clients can transfer images to each other. One or more image-transfer phone softwares belonging to one or more users may transfer images to one or more personal-computer image-transfer softwares belong to one or more users (which may or may not be the same set of users as the first).

Multiple servers may be used. A variety of servers can accomplish load balancing, enhanced security, and other goals. All servers may serve a single transaction, or each transaction may be assigned to one or more servers, or any other such combination. Servers may be assigned based on any criteria, such as geographical proximity, network proximity, type of file being transferred, or identity of user.

Transfers could be only file metadata, not the entire file. The image-transfer phone software may upload information about files (e.g. filenames) to the fileserver instead of the actual files. The personal-computer image-transfer software can then select pictures to download, either programmatically or with end-user input.

The personal-computer image-transfer software may deposit the files in one or more different locations on the PC. For example, it might both place them in the My Pictures folder and archive them to tape backup.

The personal-computer image-transfer software may signal the arrival of files to the user. An icon on the screen may change appearance, a dialog box may display a thumbnail of the file, or a sound may be played, for example.

A variety of coping strategies exist when the fileserver goes offline. The image-transfer phone software may resend later, store the files without resending them, or delete the files, for example. The personal-computer image-transfer software may notify the user or not, retry download or not, or fail over to another server, for example.

A variety of coping strategies exist when the personal-computer image-transfer software goes offline. The server may hold the files indefinitely or for a finite length of time before deleting them. The server may transfer them to an alternate client. The server may notify the user.

Roundtrip confirmation is possible. The image-transfer phone software may receive acknowledgement of a successful transaction. For example, when the file has been successfully written the personal-computer image-transfer software and its checksum verified, the personal-computer image-transfer software may inform the fileserver, which would in turn notify the image-transfer phone software. The image-transfer phone software could then choose to, for example, delete the file, knowing it had been safely transferred.

Files may be transferred to a third party server instead of the fileserver or the personal-computer image-transfer software. For example, photos might be transferred to an internet-based third-party photo hosting service. The transfer could occur directly from the phone, bypassing the fileserver; it could occur from the fileserver, bypassing the personal-computer image-transfer software, or it could occur once the files had been sent to the personal-computer image-transfer software, as examples.

Any part of the system can configure any other. For example, a user could configure the image-transfer phone software, fileserver, or personal-computer image-transfer software behavior from the image-transfer phone software, the fileserver (via, for example, a web page), or from the personal-computer image-transfer software. This would allow the user to, for example, indicate from her phone that she intends the files to be stored in the "My Pictures" folder on her PC.

Files transferred may be routed selectively. For example, the files can be routed to different locations based on the file type as determined by the three letter file extension, MIME type, or other metadata. This can happen at the image-transfer phone software, fileserver, or personal-computer image-transfer software level.

Files may be acted on immediately. Files may be routed to specific applications for immediate handling, instead of being saved to disk. For example, a sound might be routed to a media player for immediate playback when it is received at the personal-computer image-transfer software.

Different mechanisms may be used to track the state of the transfer. Instead of changing the file name to indicate the state of the file transfer, a secondary file may record the state of the transfer process, or an altogether separate communication channel using the Phone, fileserver, and/or personal-computer image-transfer software may be used to send transfer status. It is also possible to not record transfer status at all, and have the PC transfer whatever is available immediately, or to have the personal-computer image-transfer software infer when transfer is done (for example when less bits are transferred than the stated JPG image size, the file is not complete).

File transfer may occur before the file has completely arrived at the phone or file server. For example, a video might be streamed over the network instead of storing it locally, or it might be stored in part locally, possibly with the local data deleted as it is sent off to the fileserver I personal-computer image-transfer software.

The system may transfer files in discrete parts. The image-transfer phone software may transfer an image file in segments, to be reassembled into the complete image file, either on the file server or on the personal-computer image-transfer software.

The fileserver may push the images to the client without being requested. The personal-computer image-transfer software may maintain a connection to the file server, over which the fileserver pushes files as they arrive on the system. For example, the personal-computer image-transfer software's drive might simply be mapped to the fileserver so it can write the files to it using standard network protocols.

The image-transfer phone software may be polled by the file server to request photos. The Photo PC may maintain an open connection to the file server, over which the file server may send the request to send photos present on the phone.

The image-transfer phone software may send photos to the fileserver which were created before the image-transfer phone software was started. Before the image-transfer phone software is initialized/installed, files may be created (e.g. pictures taken) by the user. These are stored in the normal fashion. When the image-transfer phone software is installed/initialized, these files can be transferred. Similarly, files queued up on the fileserver may be transferred to a new or newly-active personal-computer image-transfer software.

Different network protocols and systems may be used to transmit the data. The server may use something other than FTP as the file transfer protocol for transmitting files to the client. Any protocol that allows the transfer of files would be sufficient. For example, the phone may send the picture via the MMS protocol. In this case, the server would receive the MMS message, decode the attachment, and then proceed as if it had been conventionally uploaded. Or, the files may be sent as E-mail, in which case the server can receive and forward email as per a standard e-mail server.

A proprietary piece of software may serve as the file server. The server may be running specialized software that does not allow the client or the phone to have direct access to its file system, as FTP does. It may have specialized software that supports any of the following features:

It can recognize authorized image-transfer phone softwares, for example 20 using a proprietary interface to retrieve a unique identifier from the phone and verifying the validity of the identifier against a master lookup table It can recognize authorized software, for example by exchanging secret keys that are stored in the program When new image-transfer phone softwares or personal-computer image-transfer softwares connect to the server, it may create a new user-account for the user of these devices and/or prompt for an existing user account (including username and password) to properly associate the devices When the personal-computer image-transfer software first attempts to specify the image-transfer phone software that it wishes to be "paired" with, the fileserver may issue a verification request to the image-transfer phone software, and only allow the pairing if the request is successful. For example, it may transmit a message to the image-transfer phone software via SMS asking the user to agree to the pairing. The user agrees by opening a link contained in the SMS message in the phone's browser. That link leads the phone back to the fileserver, verifying for the server that the pairing will be allowed.

The server may "pass through" the data directly to the client, without ever storing it.

The connection may be additionally secured. The image-transfer phone software software may allow the user to specify a password, which the fileserver software would require of any personal-computer image-transfer softwares before allowing a successful connection. Various security and cryptographic systems may be used to secure the connection further.

A fee may be charged for some or all aspects of this service. Fees could be monthly, per-kb, or using any other pricing scheme. Additional fees may be charged by service providers, for example bandwidth charges billed through the phone carrier.

Files on the server may be accessible through other means. The user may be able to access the photos while they reside on the server using an alternate means, such as a web browser.

Data may be transformed at any point in the transfer process. The image-transfer phone software, fileserver, or personal-computer image-transfer software may encode, decode, or otherwise modify the file automatically. For example, the image-transfer phone software might lower the resolution of the picture before transferring it to the fileserver, and the fileserver might re-encode the picture to a file format compatible with the personal-computer image-transfer software before transferring it to the personal-computer image-transfer software.

Additional actions may occur as a result of the file transfers. For example, the file 15 server may record how often files are delivered by a user, how often they are downloaded by the client, or how large the image are.

The image-transfer phone software and personal-computer image-transfer softwares may send diagnostic information to the fileservers. If a client on either device encounters an error or exception, it may send a message to the fileserver (in the form a file in the image directory, or by an altogether separate communication mechanism).

The image-transfer phone software, fileserver, and personal-computer image-transfer software may update themselves. For example, the image-transfer phone software might poll the fileserver to find a new version of itself, and if found, download and install it.

The user may configure which personal-computer image-transfer softwares receive files. For example, a user might indicate to the image-transfer phone software software that a particular file is to go to a home PC instead of the default work PC.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. An application for use on an electronic device, said application comprising:
   code embodied on a non-transitory computer readable medium included in said electronic device for establishing a communication connection from said electronic device to one or more intermediary servers, said server arranged for simultaneous connection to a plurality of electronic devices,
   code embodied on the non-transitory computer readable medium included in said electronic device for selecting particular media files created on said electronic device for delivery to a pre-identified destination location, said pre-identified destination location being established prior to creation of said particular media files; and
   code embodied on the non-transitory computer readable medium included in said electronic device for sending said selected media files over said established communication connection to said intermediary server for subsequent delivery to said pre-identified destination location under control of said intermediary server, wherein said establishing, said selecting and said sending occur without user involvement at a time of said establishing, selecting or sending, and wherein said establishing and said sending require credentials to accomplish at least one of authorization and authentication, said credentials supplied to at least one of said electronic device and said intermediary server prior to a time when said particular images are created.

2. The application of claim 1 further comprising:
   code embodied on the non-transitory computer readable medium for receiving confirmation at said electronic device that a sent image has been successfully received at said identified destination location.

3. The application set forth in claim 2 further comprising:
   code embodied on a computer readable medium for deleting in said electronic device said certain media files based upon whether or not a confirmation of an attempted previous transfer of said certain media files has been received by said electronic device.

4. The application set forth in claim 2 further comprising:
   code embodied on the non-transitory computer readable medium for re-selecting said certain media files based upon whether or not a confirmation of an attempted previous transfer of said certain media files has been received by said electronic device.

5. The application of claim 1 wherein said code for establishing, said code for identifying, said code for sending, said code for receiving and said code for selecting are downloaded to said electronic device from a location remote from said electronic device upon direction of a user of said electronic device.

6. The application of claim 5 wherein said remote location is said intermediary server.

7. The application of claim 1 wherein said identified destination location is dependent upon a particular instance of an electronic device.

8. A method for copying media files from a plurality of wireless electronic devices, said devices owned by third parties independent from each other, said method comprising:
   establishing a communication connection from a specific one of said electronic devices to one or more intermediary servers common to said plurality of devices, said establishing occurring subsequent to a determination by said specific device that at least one media file resident on said specific device has been identified for sending to said one or more intermediary servers, said determination not requiring interaction from a user of said specific device at the time of said determination; and without user intervention sending, from said device, identified ones of said media files over said established communication connection to said one or more intermediary servers for subsequent delivery from said one or more intermediary servers to a first destination location which is pre-identified and uniquely specified for said specific device, wherein said first destination location is separate from said intermediary server, and wherein said first destination is identified prior to said media file becoming identified, said media having associated therewith credentials for at least one of authorization and authentication that are specific for each said electronic device said credentials supplied to at least one of said electronic device and said intermediary server prior to a time when said media files are created.

9. The method of claim 8 further comprising:
receiving a reply at said specific device that includes the results of a delivery attempt to said pre-identified first destination location; and
removing at said specific device media files that are available for sending to said intermediary server, said removing being responsive to received results.

10. The method of claim 8 further comprising:
establishing a communication connection from a second specific one of said electronic devices to said one or more pre-identified intermediary servers, said establishing occurring in response to a determination by said second specific device that at least one media file resident on said specific device has been identified for sending to said pre-identified intermediary server, said determination being made without interaction from a user of said second specific device at the time of said determination; and
automatically sending, by said device, available ones of said media files over said established communication connection to said one or more intermediary servers for subsequent delivery from said one or more intermediary servers to a second destination location which is pre-identified and uniquely specified for said second specific device, wherein said second destination location is separate from said intermediary server wherein said sending and said subsequent delivery is controlled at least in part by at least one of authorization and authentication credentials and at least partially controlled by said one or more intermediary servers.

11. The method of claim 8 wherein said credentials are supplied by said device.

12. The method of claim 8 wherein said credentials are supplied by said server.

13. An electronic device comprising:
means for establishing, by said electronic device, a communication connection from said electronic device to one or more intermediary servers,
means for selecting, by said electronic device, particular media files resident on said electronic device for delivery to a unique destination location identified at a time prior to creation of said particular media files; and
means for sending, by said electronic device, said selected media files over said established communication connection to said one or more intermediary servers for subsequent delivery to said pre-identified destination location wherein said establishing, said selecting and said sending occur without user involvement at a time of said establishing, selecting or sending, said selected media files further configured to be communicated from said electronic device and from said intermediary server pursuant to the utilization of at least one of authorization and authentication credentials, said credentials having been determined prior to said images being identified for transmission.

14. The device of claim 13 further comprising:
means for receiving confirmation at said electronic device that a sent image has been successfully received at said identified destination location.

15. The device set forth in claim 14 further comprising:
means for re-selecting said certain media files based upon whether or not a confirmation of an attempted previous transfer of said certain media files has been received by said electronic device.

16. The device of claim 15 wherein said temporarily establishing means, said identifying means, said sending means, said receiving means and said selecting means are downloaded to said electronic device from a location remote from said electronic device upon direction of a user of said electronic device.

17. The device of claim 16 wherein said remote location is said intermediary server.

18. The device set forth in claim 14 further comprising:
means for deleting from said electronic device said certain media files based upon whether or not a confirmation of an attempted previous transfer of said certain media files has been received by said electronic device.

19. The device of claim 13 wherein said intermediary server is available for connections from a plurality of different electronic devices and wherein said identified destination location is dependant upon a particular electronic device.

20. The device of claim 13 wherein said control is at least particularly augmented by said intermediary server.

21. A method for transferring an image captured on any one of a plurality of cameras; to a user-specific location external to said cameras, said method comprising:
identifying by each said camera without user intervention which images are to be transferred;
sending without user intervention to a server from each said camera said determined images said server independent from, and common to, said plurality of cameras said images having associated therewith credentials for at least one of authorization and authentication, said credentials being determined prior to said images being identified for transfer and defined separately for each said camera; and
determining for each received image from a particular camera of said plurality of cameras at least one pre-identified forwarding location specific to said particular camera said determining comprising using said credentials defined separately for each said camera; and
forwarding by said server each said received image to said pre-identified forwarding location.

22. The method of claim 21 further comprising: receiving a reply at said particular camera that includes the results of a delivery attempt to said pre-identified destination location.

23. The method of claim 22 further comprising re-selecting said images based upon whether or not a confirmation of an attempted previous transfer of said images has been received by said electronic camera.

24. The method of claim 21 further comprising:
establishing said relationship in a communication between a user of said particular camera and said server at a time prior to creation of said image on said particular camera.

25. A server for managing data from a mobile device, said server comprising:

means for accepting data from a plurality of mobile devices, said data having been gathered for sending to said server at each said mobile device without user involvement at a at time of said gatherings, said data having associated therewith pre-established at least one of authorization and authentication credentials for use by said server, said credentials determined prior to said data being gathered for transmission and defined separately for each said mobile device;

means for maintaining pre-identified relationships between particular mobile devices and delivery locations specific to said particular mobile devices, said relationships including utilization by said server of said at least one of authorization and authentication credentials; and means operative upon receipt of data from a particular mobile device for delivering said data for storage in one or more specific locations according to pre-identified relationships between said particular mobile device and said specific locations.

26. The server of claim 25 wherein said data from said mobile device is communicated to said server using a first protocol appropriate for communications from said mobile device; and wherein said data from said server to said destination is communicated to said destination using a second protocol appropriate for communications between said server and each said destination, said first and second protocols not necessarily being the same.

27. A method for copying media files from a plurality of wireless electronic devices, said devices owned by third parties independent from each other, said method comprising:

establishing a communication connection from a specific one of said electronic devices to one or more servers common to said plurality of devices, said establishing occurring in response to a determination by at least one of said specific device and server that at least one media file resident on said specific device has been identified for transmission to said pre-identified server, said determination not requiring interaction from a user of said specific device; and without user intervention, transmitting from said device identified ones of said media files over said established communication connection to said server for storage, at a location being determined prior to said media file being identified for transmission, said media files having associated therewith credentials for at least one of authorization and authentication, said credentials being determined prior to said media file being identified for transmission and defined separately for each said electronic device.

28. The method of claim 27 further comprising:

receiving a reply at said specific device that includes the results of a delivery attempt to said storage location; and removing at said specific device media files that are delivered to said storage, said removing being responsive to received reply.

29. A mobile electronic device comprising:

means for selecting, by said mobile electronic device without involvement of a user at a time of said selecting, particular media files resident on said mobile electronic device for delivery to a server pre-identified at a time prior to selection of said particular media files;

means under control of said mobile electronic device for establishing, without user involvement at a time of said establishing, a communication connection from said mobile electronic device to said pre-identified server; and means for sending said selected media files over said established communication connection to said intermediary server for storage under control of said server at a destination location identified prior to selection of said particular images, said media files being communicated from said mobile electronic device to said server controlled by at least one of authorization and authentication credentials supplied to at least one of said electronic device and said intermediary server prior to said selection of said particular images.

30. The device of claim 29 further comprising:

means for receiving confirmation at said mobile device that a sent image has been successfully stored at said destination location.

31. The device set forth in claim 30 further comprising:

means for re-selecting certain media files based upon whether or not a confirmation of an attempted previous storage of said certain media files has been received by said electronic device.

32. The device set forth in claim 30 further comprising:

means for deleting certain media files from said electronic device based upon whether or not a confirmation of an attempted previous storage of said certain media files has been received by said electronic device.

* * * * *

UNITED STATES PATENT AND TRADEMARK OFFICE
CERTIFICATE OF CORRECTION

| | | |
|---|---|---|
| PATENT NO. | : 7,698,392 B2 | Page 1 of 1 |
| APPLICATION NO. | : 11/540497 | |
| DATED | : April 13, 2010 | |
| INVENTOR(S) | : Charles B. Zapata et al. | |

It is certified that error appears in the above-identified patent and that said Letters Patent is hereby corrected as shown below:

In the Specification:

Column 5, Line 10, delete the portion of text reading "described, below" and replace with --described below--.

Column 5, Line 49, delete the portion of text reading "image" and replace with --image 401--.

Column 6, Line 12, delete the portion of text reading "302" and replace with --302 of Fig. 3,--.

In the Claims:

Column 31, Line 14, Claim 8, delete the portion of text reading "device" and replace with --device,--.

Column 31, Line 64, Claim 13, delete the portion of text reading "location wherein" and replace with --location, wherein--.

Signed and Sealed this

Thirteenth Day of July, 2010

David J. Kappos
*Director of the United States Patent and Trademark Office*